US012666002B2

(12) United States Patent
Hollis et al.

(10) Patent No.: US 12,666,002 B2
(45) Date of Patent: Jun. 23, 2026

(54) SYSTEM AND METHOD TO REMOTELY CONTROL AND TEST MEDIA PLAYER DEVICES

(71) Applicant: Disney Enterprises, Inc., Burbank, CA (US)

(72) Inventors: Jeffrey Hollis, Burbank, CA (US); Roman Bediner, Burbank, CA (US); Jeffrey Eggert, Burbank, CA (US); Taylor White, Burbank, CA (US); Gavin Haynes, Burbank, CA (US); Andrew Pritykin, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 67 days.

(21) Appl. No.: 18/678,423

(22) Filed: May 30, 2024

(65) Prior Publication Data

US 2025/0373782 A1      Dec. 4, 2025

(51) Int. Cl.
*H04N 17/00* (2006.01)
*H04N 21/422* (2011.01)
*H04N 21/4227* (2011.01)

(52) U.S. Cl.
CPC ..... *H04N 17/004* (2013.01); *H04N 21/42204* (2013.01); *H04N 21/4227* (2013.01)

(58) Field of Classification Search
None
See application file for complete search history.

(56) References Cited

U.S. PATENT DOCUMENTS

2019/0394516 A1 * 12/2019 Kim ........................ G08C 17/02

* cited by examiner

*Primary Examiner* — Samira Monshi
(74) *Attorney, Agent, or Firm* — McCormick, Paulding & Huber PLLC

(57) ABSTRACT

A system and method for controlling and testing at least one remote media player device using a corresponding remote testing device and at least one user device not collocated with the remote testing device includes receiving from a user a selection of an available remote testing device, displaying on the user device a remote-control image or a list of automated tests, receiving from the user a selection of one of a remote-control command or an automated test as the selected remote command, sending the selected remote command to the selected remote testing device, receiving from the selected remote testing device a video output signal indicative of a medial player video output signal from the media player device in response to the selected remote command, and displaying the received video output signal on the user device simultaneously with the displaying of the remote-control image, while simultaneously performing the receiving and the sending of the selected remote commands.

39 Claims, 37 Drawing Sheets

Fig. 2B

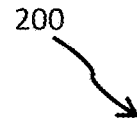
200

| Remote Cntrl Command | Command Code | STB Makes/ Models |
|---|---|---|
| back | Hex Code 1 | Look-up table |
| blue | Hex Code 2 | Look-up table |
| chan_down | Hex Code 3 | Look-up table |
| chan_up | Hex Code 4 | Look-up table |
| clear | Hex Code 5 | Look-up table |
| dot | Hex Code 6 | Look-up table |
| down | Hex Code 7 | Look-up table |
| eight | Hex Code 8 | Look-up table |
| exit | Hex Code 9 | Look-up table |
| fast_forward | Hex Code 10 | Look-up table |
| five | Hex Code 11 | Look-up table |
| four | Hex Code 12 | Look-up table |
| green | Hex Code 13 | Look-up table |
| guide | Hex Code 14 | Look-up table |
| home | Hex Code 15 | Look-up table |
| info | Hex Code 16 | Look-up table |
| left | Hex Code 17 | Look-up table |
| menu | Hex Code 18 | Look-up table |
| next | Hex Code 19 | Look-up table |
| nine | Hex Code 20 | Look-up table |
| one | Hex Code 21 | Look-up table |
| pause | Hex Code 22 | Look-up table |
| play | Hex Code 23 | Look-up table |
| play_pause | Hex Code 24 | Look-up table |
| power | Hex Code 25 | Look-up table |
| prev | Hex Code 26 | Look-up table |
| red | Hex Code 27 | Look-up table |
| return | Hex Code 28 | Look-up table |
| rewind | Hex Code 29 | Look-up table |
| right | Hex Code 30 | Look-up table |
| select | Hex Code 31 | Look-up table |
| seven | Hex Code 32 | Look-up table |
| six | Hex Code 33 | Look-up table |
| stop | Hex Code 34 | Look-up table |
| three | Hex Code 35 | Look-up table |
| two | Hex Code 36 | Look-up table |
| up | Hex Code 37 | Look-up table |
| vol_down | Hex Code 38 | Look-up table |
| vol_up | Hex Code 39 | Look-up table |
| yellow | Hex Code 40 | Look-up table |
| zero | Hex Code 41 | Look-up table |

Fig. 2C

Remote Testing (RT) App/UI Logic – Per User

Fig. 4B

RT Service Logic – All users

430

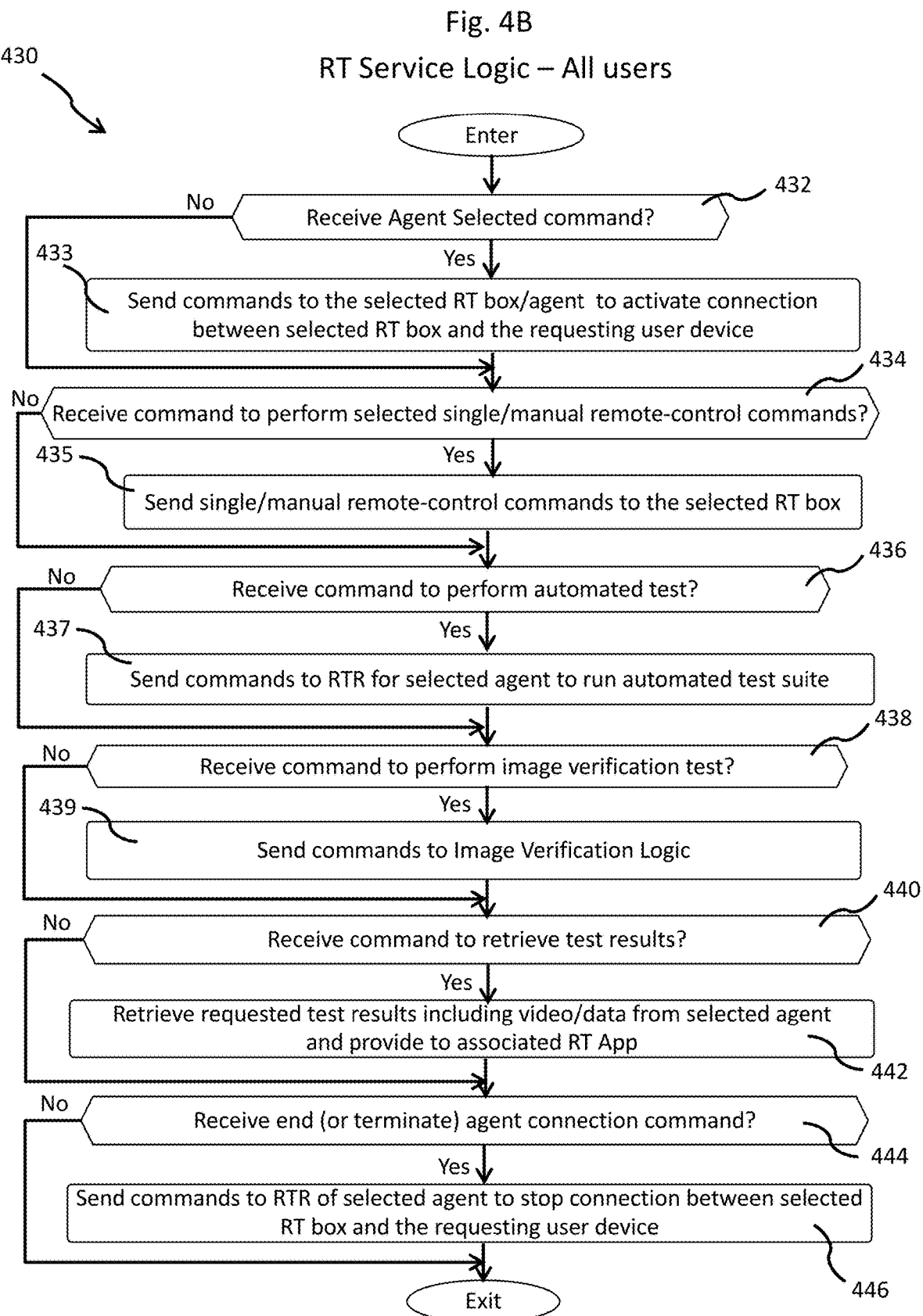

Enter

432
No — Receive Agent Selected command?

Yes

433
Send commands to the selected RT box/agent to activate connection between selected RT box and the requesting user device 434
No — Receive command to perform selected single/manual remote-control commands?

Yes

435
Send single/manual remote-control commands to the selected RT box

436
No — Receive command to perform automated test?

Yes

437
Send commands to RTR for selected agent to run automated test suite

438
No — Receive command to perform image verification test?

Yes

439
Send commands to Image Verification Logic

440
No — Receive command to retrieve test results?

Yes

Retrieve requested test results including video/data from selected agent and provide to associated RT App

442

444
No — Receive end (or terminate) agent connection command?

Yes

Send commands to RTR of selected agent to stop connection between selected RT box and the requesting user device

446

Exit

Retransmission & Routing (RTR) Logic – Single Commands

Fig. 4D

Retransmission & Routing (RTR) Logic – Automated Test

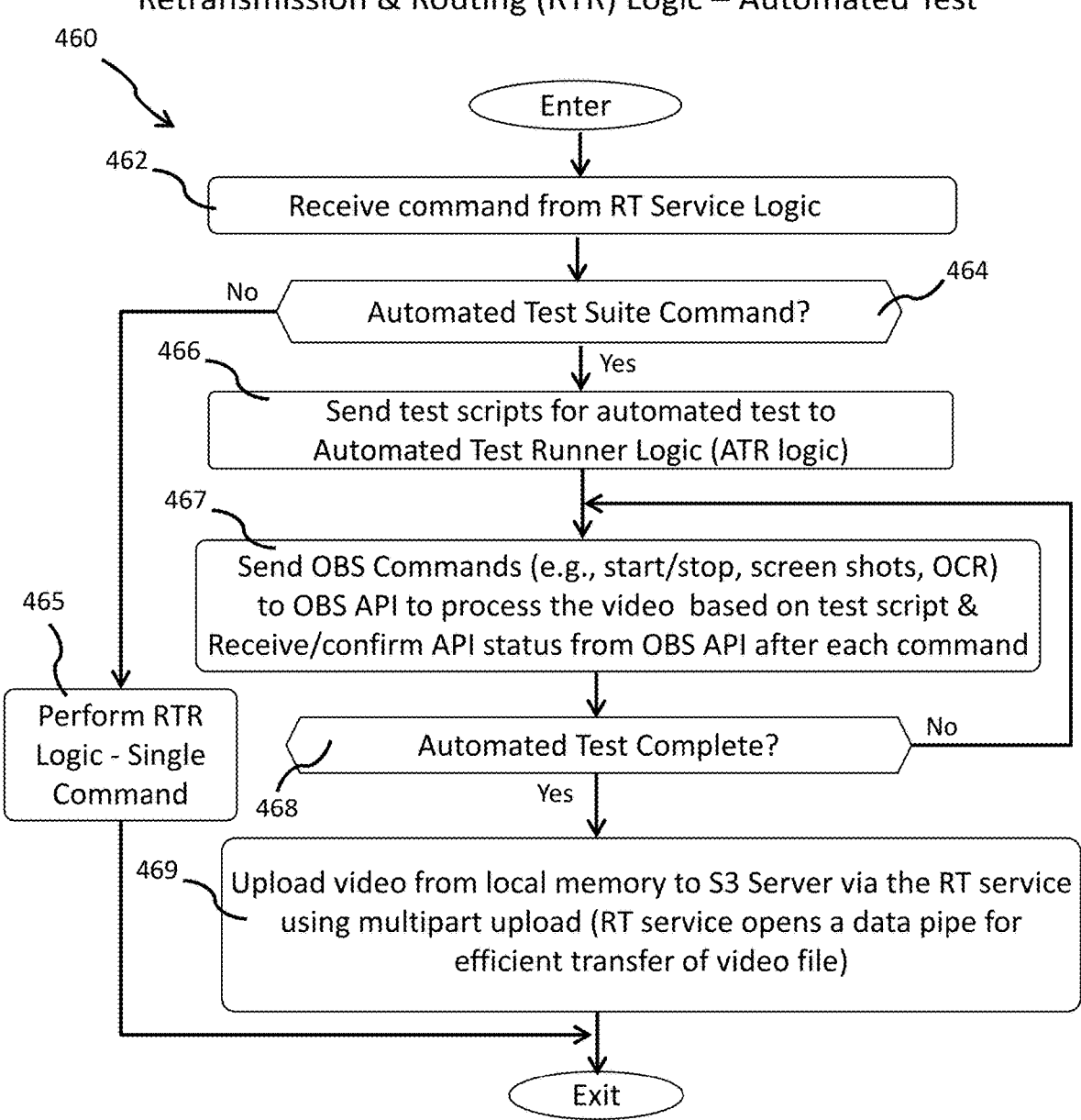

460

Enter

462
Receive command from RT Service Logic

464
Automated Test Suite Command?    No

466    Yes
Send test scripts for automated test to
Automated Test Runner Logic (ATR logic)

467
Send OBS Commands (e.g., start/stop, screen shots, OCR)
to OBS API to process the video based on test script &
Receive/confirm API status from OBS API after each command 465
Perform RTR
Logic - Single
Command 468
Automated Test Complete?    No Yes 469
Upload video from local memory to S3 Server via the RT service
using multipart upload (RT service opens a data pipe for
efficient transfer of video file)

Exit

Fig. 4E

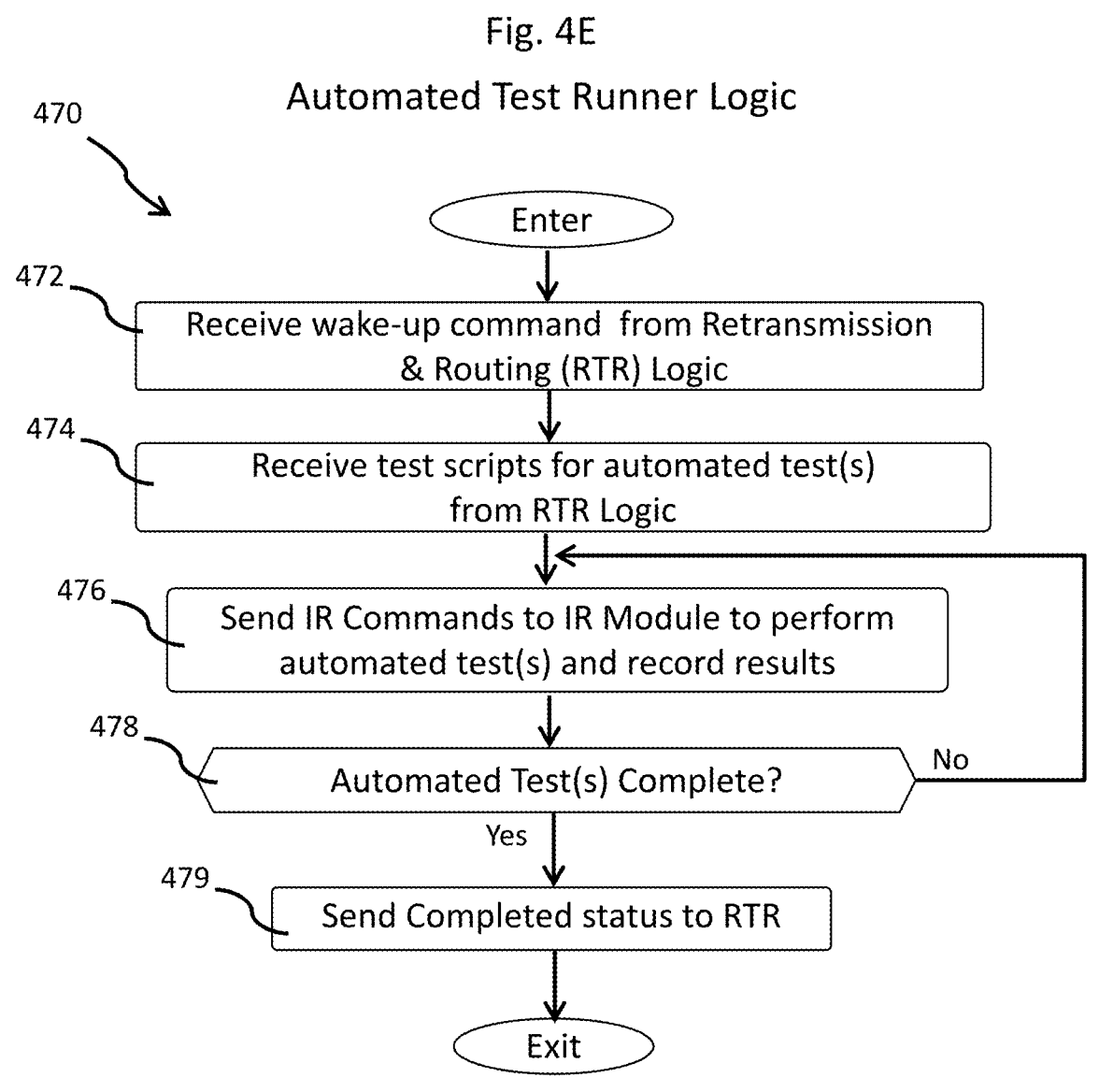

Automated Test Runner Logic

470

```
                    ┌─────────────┐
                    │    Enter    │
                    └─────────────┘
                           │
                           ▼
472  ┌──────────────────────────────────────────────────┐
     │  Receive wake-up command  from Retransmission     │
     │           & Routing (RTR) Logic                   │
     └──────────────────────────────────────────────────┘
                           │
                           ▼
474  ┌──────────────────────────────────────────────────┐
     │     Receive test scripts for automated test(s)    │
     │                 from RTR Logic                    │
     └──────────────────────────────────────────────────┘
                           │
                           ▼
476  ┌──────────────────────────────────────────────────┐
     │   Send IR Commands to IR Module to perform        │
     │      automated test(s) and record results         │
     └──────────────────────────────────────────────────┘
                           │
                           ▼
478  ╱──────────────────────────────────────────────╲    No
     ╲         Automated Test(s) Complete?           ╱
                           │
                          Yes
                           │
                           ▼
479  ┌──────────────────────────────────────────────────┐
     │          Send Completed status to RTR             │
     └──────────────────────────────────────────────────┘
                           │
                           ▼
                    ┌─────────────┐
                    │    Exit     │
                    └─────────────┘
```

Fig. 4F

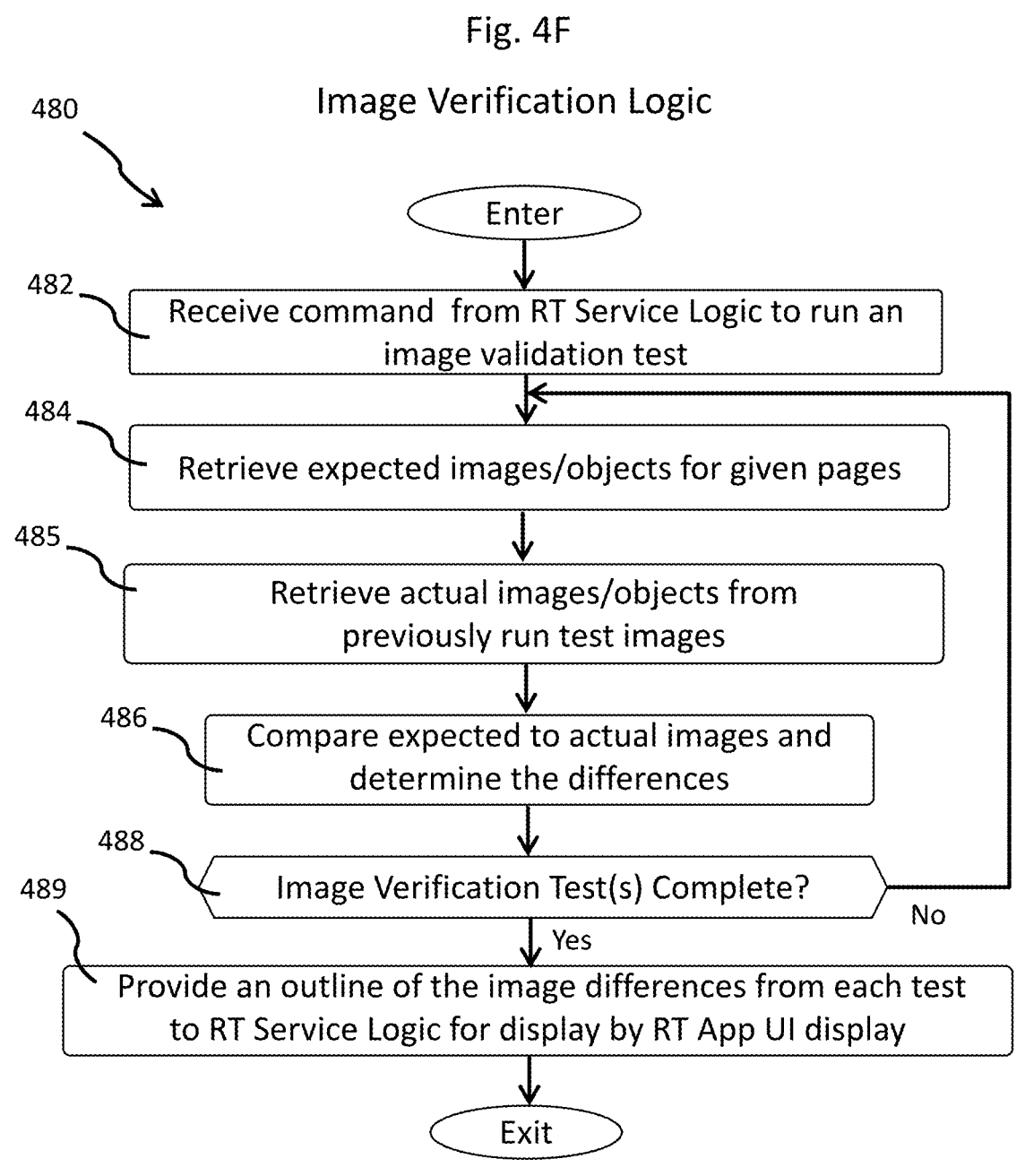

Image Verification Logic

480

( Enter )

482 — Receive command from RT Service Logic to run an image validation test

484 — Retrieve expected images/objects for given pages

485 — Retrieve actual images/objects from previously run test images

486 — Compare expected to actual images and determine the differences

488 — Image Verification Test(s) Complete?

No

Yes

489 — Provide an outline of the image differences from each test to RT Service Logic for display by RT App UI display ( Exit )

830C

Home / Agents / RT box 5 —832

| AGENT | ATR | RUNNER |

836  838

840

( info ) ( error ) ( debug ) ( main ) ( agent ) ( itach ) ( ATR ) ( serial ) ( files ) ( obs ) ( tftp ) ( update ) ( socket )

834C

—848

[9/26/2023, 4:24:16 PM][info][serial] Connecting to serial
[9/26/2023, 4:24:17 PM][info][serial] Serial Ports [object Object],[object Object],[object Object]
[9/26/2023, 4:24:18 PM][info][serial] Serial Port opened true
[9/26/2023, 4:24:18 PM][info][serial] Writing to serial port cat shield_runtime/shield_agent_data/tools-bootstrap.ini
[9/27/2023, 3:11:15 PM][info][ATR]Downloading Script CertScripts/Video Playback/Audio Track Switching During Playback.yaml C:\Users\qegep\Geppetto\Scripts
[9/27/2023, 3:11:16 PM][info][ATR]lola path C:\Users\qegep\Desktop\shield_lola.EXE
[9/27/2023, 3:11:16 PM][info][ATR]Starting Merlin
[9/27/2023, 3:11:16 PM][info][serial] Launching merlin
[9/27/2023, 3:11:16 PM][info][ATR] Writing to serial port release/merlin -e ./release/extensions -C
[9/27/2023, 3:11:18 PM][info][ATR]Starting Recording
[9/27/2023, 3:11:19 PM][info][ATR]Starting Lola
[9/27/2023, 3:11:19 PM][info][ATR]2023-09-27T22:11:19Z [INFO] (shield_lola::ws::connector) Connector listening on: 0.0.0.0:8080
[9/27/2023, 3:11:19 PM][info][ATR]2023-09-27T22:11:19Z [INFO] (shield_lola::cli::exec) Waiting up to 30 seconds for connection from device brcm-nuc-h0
[9/27/2023, 3:11:19 PM][info][ATR]2023-09-27T22:11:19Z [INFO] (shield_lola::geppetto) Connected to Geppetto at ws://localhost:3333/ 2023-09-27T22:11:19Z [INFO] (shield_lola::geppetto) Geppetto at ws://localhost:3333/ has version "1.1.2"
[9/27/2023, 3:11:20 PM][info][ATR]2023-09-27T22:11:20Z [INFO] (shield_lola::ws::connector) Connection Type found: Agent
[9/27/2023, 3:11:20 PM][info][ATR]2023-09-27T22:11:20Z [INFO] (shield_lola::ws::connector) Connection Type found: Qa
[9/27/2023, 3:11:20 PM][info][ATR]2023-09-27T22:11:20Z [INFO] (shield_lola::qa) Successfully registered device: brcm-nuc-h0 2023-09-27T22:11:20Z [INFO] (shield_lola::cli::exec) Wait for device brcm-nuc-h0 finished 2023-09-27T22:11:20Z [INFO] (shield_lola::cli::exec) Associating secondary device ws://localhost:3333/ with features EnumSet(Screenshots)
[9/27/2023, 3:11:20 PM][info][ATR]Launching app on brcm-nuc-h0 Launch app command finished 2023-09-27T22:11:20Z [INFO] (shield_lola::cli::exec) Waiting 15 seconds for the app to start   —846
[9/27/2023, 3:11:35 PM][info][ATR]Suite build finished No errors found Running suite on brcm-nuc-h0
[9/27/2023, 3:11:35 PM][info][ATR]2023-09-27T22:11:35Z [INFO] (shield_lola::kree::runner::homing) Homing from whos_watching to search, trying: Action { pre: [Command { instruction: Input(InputCommand { timeout: 30s, commands: [InputCommand { action: StbInput(Up), delay: 500ms, count: 1 }, InputCommand { action: StbInput(Right), delay: 500ms, count: 1 }, InputCommand { action: StbInput(Left), delay: 500ms, count: 1 }, InputCommand { action: StbInput(Select), delay: 500ms, count: 1 }] }), description: None }], expect: [Event { event: PageChanged(PageChanged { check_different: false }), timeout: 30s, description: None }], post: [Command { instruction: Delay(2s), description: None }], repeat: 0, description: Some("Homing from whos_watching to search") } 2023-09-27T22:11:35Z [INFO] (shield_lola::kree::results) Starting results for test C:\Users\qegep\Geppetto\TestResults\brcm-nuc-h0\suites\Test Audio Track Switching_2023-09-27T22-11-35Z\Audio Track Switching During Playback_2023-09-27T22:11:35Z 2023-09-27T22:11:35Z [INFO] (shield_lola::kree::runner) Executing input command [InputCommand { action: StbInput(Up), delay: 500ms, count: 1 }, InputCommand { action: StbInput(Right), delay: 500ms, count: 1 }, InputCommand { action: StbInput(Left), delay: 500ms, count: 1 }, InputCommand { action: StbInput(Select), delay: 500ms, count: 1 }] 2023-09-27T22:11:35Z [INFO] (shield_lola::kree::runner) Currently awaiting PageChanged { check_different: false }
[9/27/2023, 3:11:37 PM][info][ATR]2023-09-27T22:11:37Z [INFO] (shield_lola::kree::runner) Pre commands finished, enforcing timeout, currently 29.9999761s
[9/27/2023, 3:11:39 PM][info][ATR]2023-09-27T22:11:39Z [INFO] (shield_lola::kree::runner) Pausing for 2s
[9/27/2023, 3:11:41 PM][info][ATR]2023-09-27T22:11:41Z [INFO] (shield_lola::kree::runner::homing) Homing from home to search, trying: Action { pre: [Command { instruction: Input(InputCommand { timeout: 30s, commands: [InputCommand { action: StbInput(Right), delay: 500ms, count: 1 }, InputCommand { action: StbInput(Back), delay: 500ms, count: 1 }, InputCommand { action: StbInput(Up), delay: 500ms, count: 1 }, InputCommand { action: StbInput(Select), delay: 500ms, count: 1 }] }), description: None }], expect: [Event { event: PageChanged(PageChanged { check_different: false }), timeout: 30s, description: None }], post: [Command { instruction: Delay(2s), description: None }], repeat: 0, description: Some("Homing from home to search") } 2023-09-27T22:11:41Z [INFO] (shield_lola::kree::runner) Executing input command [InputCommand { action: StbInput(Right), delay: 500ms, count: 1 }, InputCommand { action: StbInput(Back), delay: 500ms, count: 1 }, InputCommand { action: StbInput(Up), delay: 500ms, count: 1 }, InputCommand { action: StbInput(Select), delay: 500ms, count: 1 }]
[9/27/2023, 3:11:41 PM][info][ATR]2023-09-27T22:11:41Z [INFO] (shield_lola::kree::runner) Currently awaiting PageChanged { check_different: false }
[9/27/2023, 3:11:43 PM][info][ATR]2023-09-27T22:11:43Z [INFO] (shield_lola::kree::runner) Pre commands finished, enforcing timeout, currently 29.9999742s
[9/27/2023, 3:11:44 PM][info][ATR]2023-09-27T22:11:44Z [INFO] (shield_lola::kree::runner) Pausing for 2s
[9/27/2023, 3:11:46 PM][info][ATR]2023-09-27T22:11:46Z [INFO] (shield_lola::kree::runner) Pausing for 2s 2023-09-27T22:11:46Z [INFO] (shield_lola::kree::runner) Expected events finished, waiting for one

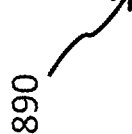

890

| Test Name | Pass/Fail Test Criteria |
|---|---|
| Auto-Test 1 | Pass/Fail Criteria Auto-Test 1 |
| Auto-Test 2 | Pass/Fail Criteria Auto-Test2 |
| Auto-Test 3 | Pass/Fail Criteria Auto-Test3 |
| * * * | * * * |
| Image Verif-Test 1 | Pass/Fail Criteria Image Verif-Test 1 |
| Image Verif-Test 2 | Pass/Fail Criteria Image Verif-Test 2 |
| Image Verif-Test 3 | Pass/Fail Criteria Image Verif-Test 3 |
| * * * | * * * |
| Other-Test 1 | Pass/Fail Criteria Other-Test 1 |
| Other-Test 2 | Pass/Fail Criteria Other-Test 2 |
| Other-Test 3 | Pass/Fail Criteria Other-Test 3 |
| * * * | * * * |

SYSTEM AND METHOD TO REMOTELY CONTROL AND TEST MEDIA PLAYER DEVICES

BACKGROUND

Streaming content providers, such as Disney+®, Hulu®, ESPN+® and other multimedia content applications, are viewed and enjoyed by millions of people on thousands of different types of set top boxes (STBs) and over the top (OTT) devices and other media player devices (collectively, STBs or STB devices or media player devices) around the world. In order to ensure exceptional performance and quality of the streaming content, the operation and performance of the streaming services on these STB devices must be tested periodically for different reasons, such as significant new hardware or software releases or triaging/troubleshooting issues with the hardware, software, or firmware of the STB boxes. Currently, the only way to fully test production content streaming applications on these STB devices for video playback performance, subjectively or otherwise, is to test them in person.

Many of the STB devices tested may be pre-release development hardware or the property of third parties, such as a streaming provider partner. Checking these STB devices in and out of storage and shipping them between testing locations leads to wear and tear on the STB devices and potential loss of STB devices that, in many cases, cannot be replaced.

Currently, quality assurance (QA), Media Experience Performance Engineering (MXPE), operations, and partner certification personnel test STB devices manually, in person. This requires STB devices to be set up at desks in an office, to send a test employee on-site to the location of the STB, or otherwise have the tester and the STB in the same physical location. Due to the large number of different STB devices, such an approach can cause storage issues in shared office spaces, shipping expenses to transport STBs, or travel expenses to transport employees to off-site locations.

Thus, as a result, video streaming product and engineering teams currently have to wait for an STB device shipment from STB partners, maintain an inventory of STB devices, physically access the STB devices, and connect the STB devices to complicated virtual private networks that the streaming provider needs to setup.

Thus, it would be desirable to have a system and method that overcomes the shortcoming of the current approaches and that allows users to remotely control and run tests on STB and OTT devices located in a different location from the tester or user.

BRIEF DESCRIPTION OF THE DRAWINGS

FIG. 2B is a table of remote-control commands, command codes and STB make/model look up tables, in accordance with embodiments of the present disclosure.

FIG. 2C is a block diagram of a portion of FIG. 2A, showing an embodiment controlling a smart TV and using a webcam to provide a video signal input to the RT boxes, in accordance with embodiments of the present disclosure.

FIG. 4B is a flow diagram of an embodiment of a Remote Testing (RT) Service Logic—All Users, which interacts with all user devices in the system, in accordance with embodiments of the present disclosure.

FIG. 4D is a flow diagram of an embodiment of a Retransmission & Routing (RTR) Logic, for handling automated/scripted testing, in accordance with embodiments of the present disclosure.

FIG. 4E is a flow diagram of an embodiment of an Automated Test Runner Logic for performing automated testing, in accordance with embodiments of the present disclosure.

FIG. 4F is a flow diagram of an embodiment of an Image Verification Logic for performing image verification testing, in accordance with embodiments of the present disclosure.

FIGS. 8B and 8C are screen illustrations of a Runner tab from the Automated Test Runner (or ATR) Logic, in accordance with embodiments of the present disclosure.

FIG. 8G is a table showing tests and pass/fail criteria for each test, in accordance with embodiments of the present disclosure.

DETAILED DESCRIPTION

Figure 1:
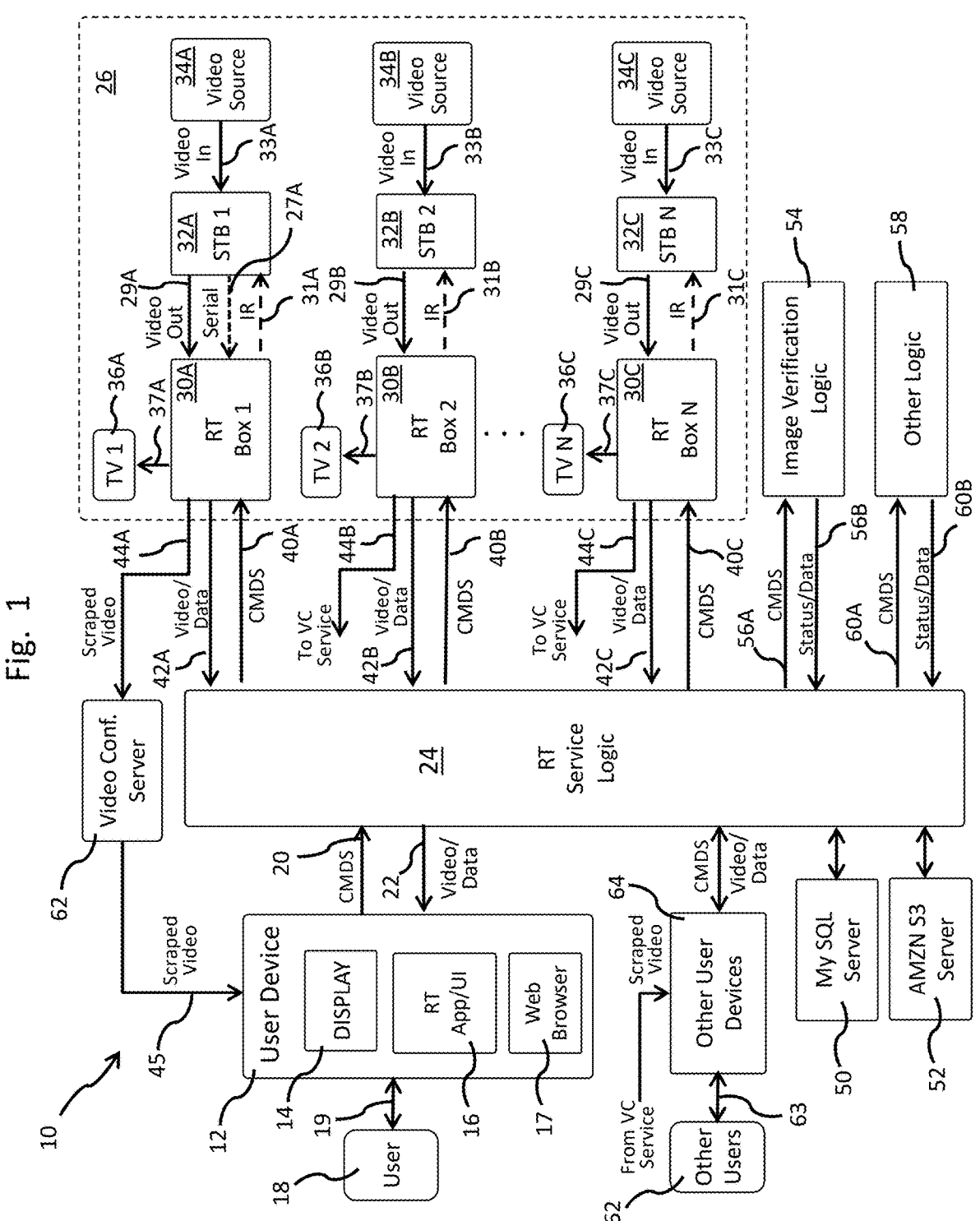
FIG. 1 is a top-level block diagram showing components of a system and method to remotely control and test media player devices such as over the top (OTT) or set-top boxes (STBs) and other living room media player devices, in accordance with embodiments of the present disclosure.

As discussed in more detail below, in some embodiments, the present disclosure is directed to a system and method to remotely control and test media player devices, such as set-top box (STB) devices, over-the-top (OTT) devices and other Living Room Devices (e.g., smart TVs, and the like), which allows full remote-controlled access of any remotely controllable set-top box (STB) device, over-the-top (OTT) box/device and other living room media player devices (collectively, "STB" or media player devices or media players). The system and method of the present disclosure may also include a remote testing app (or RT App) having a user interface or WebUI running on a user device that allows a user (or operator) to control and test a remote STB device (or media player device) by IR (infrared), CEC (Consumer Electronics Control), WIFI, Bluetooth, and the like, and allows the user to see and hear content directly from the STB device being tested, all via a remote testing box (or RT box or "Geppetto" box) which receives commands from and provides content to the RT App user interface (or WebUI or UI). The RT box of the present disclosure may be self-contained and may not require any outside software to perform is main functions, ensuring proper and accurate performance as a stand-alone system.

The system and method of the present disclosure is a framework designed with hardware and software to help streaming product teams and engineering teams verify that various streaming applications meet requirements (e.g., certification or other requirements) set by the streaming provider on partner STB devices or media player devices.

The system and method of the present disclosure eliminates the need for video streaming product and engineering teams to have to: wait for an STB device shipment from STB partners; maintain an inventory of STB devices; physically access the STB devices, and connect STB devices to complicated virtual private networks (VPNs). Also, the system of the present disclosure provides results that match (or mirror) the end customer's experience, thereby reducing the risk of problems in the field and providing enhanced troubleshooting of problems in the field.

With the system and method of the present disclosure, when Media Experience Performance Engineering (MXPE) analysts need to perform certification on an STB device, or a support engineer (SE) needs to reproduce an issue or problem with an STB reported by an STB device partner (e.g., in the field), they can use the system of the present disclosure to remotely access any STB device from any location and remotely run any desired manual automated tests or diagnostics and analyze the results remotely.

The present disclosure is hardware and protocol agnostic and provides a test automation suite that facilitates user testing with result cataloging and pass/fail analysis/determination. The test automation suite may be based on an existing Application Development Kit (ADK) platform and may be expanded to other platforms as well. The automation suite provides for pre-created test cases and test-case creation as well as analytics access and computer vision to measure the success rate of test cases.

Additionally, the system of the present disclosure is agnostic of the STB device and video streaming platform used by the STB device, and is compatible with all set top boxes, and the hardware and software may be easily adapted to additional use cases.

In particular, protocol-agnostic support, includes one or more of the following: dynamic protocol detection, configurable physical communication protocol, protocol-specific spokes, media transformation, configurable API endpoints, and real-time adaptation (discussed more herein). The features and components of the system configuration used for a given application may determine which of the above features may be needed or desired to provide a protocol-agnostic system.

Regarding dynamic protocol detection, a "hub and spokes" model may be used to dynamically detect the media protocol used by incoming content. Based on the detected protocol, the application of the present disclosure can adapt its processing and communication strategies to handle the detected protocol. Regarding configurable physical communication protocol, the transmission of infrared (IR) signals provided by the present disclosure are commonly supported across various STB/OTT devices and hardware. In addition, other protocols supported by the system of the present disclosure include Serial, Bluetooth, HDMI-CEC and USB.

This approach ensures that the system can interface with any device independent of (or agnostic to) its input requirements. Other physical communication protocols may be used if desired with the present disclosure.

Regarding protocol-specific spokes, each spoke in the hub-and-spoke model may be configured to handle specific media protocols or formats. New spokes may be added or existing ones modified to support additional protocols without affecting the overall system. Regarding media transformation, the present disclosure may include modules for media transformation to convert content between different protocols as needed. This allows for seamless integration with diverse media sources and destinations.

Regarding configurable API endpoints, REST and GraphQL APIs can be designed to accept and deliver content in a protocol-agnostic manner. The hub in the hub-and-spoke model can expose configurable endpoints that adapt to the requirements of different media protocols. Regarding Real-time Adaptation, WebRTC can dynamically adapt to the media format and requirements of different protocols during real-time communication. This ensures that the application can provide a responsive and adaptive experience for users consuming media content.

By combining the above-described technologies, the present disclosure provides protocol-agnostic support for any media application, allowing it to seamlessly integrate with diverse media protocols, devices, and content sources. The modular and extensible architecture of the present disclosure ensures that the application suite can evolve to accommodate emerging media standards and user expectations.

The RT (or Remote Testing or "Geppetto") box or device is designed to emulate using a partner STB without the actual use of software emulation. The RT box may include HDCP (high-bandwidth digital content protection) bypass, WebRTC streaming, infrared transmitter hardware (IR Module) and 3D-printed components (e.g., chassis, or other components), all packaged into a compact device interfaced through a React application (JavaScript-based UI development library) that provides a user the ability to control partner devices (Set-top boxes (STBs), Over the top (OTT) devices, TVs, smartphones, and any other media player device, and the like, collectively herein STBs or media player device, from any location in real time. Utilizing a consumer WebRTC (or video conferencing) client technology, such as Zoom®, Skype®, Webex®, Microsoft Teams®, and the like, allows peer-to-peer streaming which removes or minimizes any delay (e.g., less than 500 ms) from the partner device to being displayed on a screen UI for viewing by the end user (or tester).

The system of the present disclosure may run as a "man in the middle" allowing full use of the STB device or media player device, e.g., connected to a TV or smart TV, or other device, while the STB device is being tested by the system. The system may also run "headless" (i.e., without being connected to a TV or the like), allowing the system to be in a rack-mounted environment, e.g., with a plurality of other similar RT boxes, acting as the display panel while not taking up as much room as one. To allow testing of actual television applications, some embodiments of the present disclosure may use a webcam instead of a capture card to obtain video directly from the images and sound provided by a TV screen, and audio may be obtained from analog or optical outputs of the TV, e.g., when there is a smart TV but no set top box.

The system of the present disclosure supports various resolutions, color and dynamic ranges to enable the testing of legacy content, as well as the latest AAA content. The system of the present disclosure is able to access test content through production and may scrape video from an HDMI feed to view remotely. In some embodiments, the present disclosure may be implemented using a known hardware provider, e.g., SimplyNUC. Also, PCM (pulse code modulation) uncompressed audio and bitstream audio, including Dolby 5.1 and Dolby Atmos (surround sound), are supported by the present disclosure, as well as future DTS encoded assets. The system of the present disclosure may be "packaged" hardware which may have a 3D-printed chassis that contains all hardware components attached to an Intel NUC.

STB devices can be accessed remotely by the system of the present disclosure, and therefore outputs and results can be stored centrally (or at multiple locations), thereby creating a "unified device lab" or "single device lab" environment, while still being accessible by employees or users from their desks or from their remote work locations. In addition, the system devices of the present disclosure have the potential to live in a partner's data center on their own network in order to accurately represent users on their service.

Referring to FIG. 1, various components (or devices or logic) of a system 10 are shown for a system and method to remotely control and operate STBs, OTTs and Living Room Devices (collectively, STBs or media player devices or MPDs or media players), which allows full remote-controlled access of a broad range of remotely controllable set-top boxes (STBs) or media player devices. The system includes at least one user device 12, such as a desk top computer, laptop computer, smart phone or other computer-based device, having a client-side remote testing (RT) App 16, e.g., RT Software App or RT App/UI or "Geppetto" App, and a web browser 17 loaded thereon, and a display 18. The user device 12 communicates with and receives input commands from a user 18 (or set top box tester or QA tester), as shown by a line 19. The user device 12 receives commands from the user 18 while the device 12 is running the RT App 16 and provides a user interface (UI) to the display for interaction with the user 18.

The user device 12 also provides output commands (CMDs) on a line 20 to Remote Testing Service Logic (or RT Service Logic) 24 (discussed more hereinafter) and receives requested video and associated data (including video metadata, logs and status) on a line 22 from the RT Service Logic 24 and also from Remote Test boxes (or RT boxes) 30A, 30B,30C (discussed hereinafter). In some embodiments, where a plurality of user devices (and associated users) are connected to the system, the other user devices 64 and other users 62, may also communicate with the RT Service Logic 24.

The RT App 16, RT Service Logic 24, and associated RT boxes 30A,30B,30C, work together to run user-specified tests (through the UI of the RT App 16) on set top boxes (STBs) of various brands, models and releases, while the set top boxes are running a content viewing or streaming service or app, such as Disney+ or any other content streaming platform, interacts with the STBs to accomplish the functions or tests described herein, while not altering the normal performance of the STBs.

The RT Service Logic 24 may be viewed as a central hub for all configurations, updates, and signaling services to and from all deployed RT boxes or RT agent devices (Remote Test boxes or Auto Test boxes) 30A,30B,30C. The RT Service Logic 24 communicates with a plurality 26 of the RT agent devices or RT boxes 30A,30B,30C, e.g., RT box 1, RT box 2, RT box N.

Figure 5A:
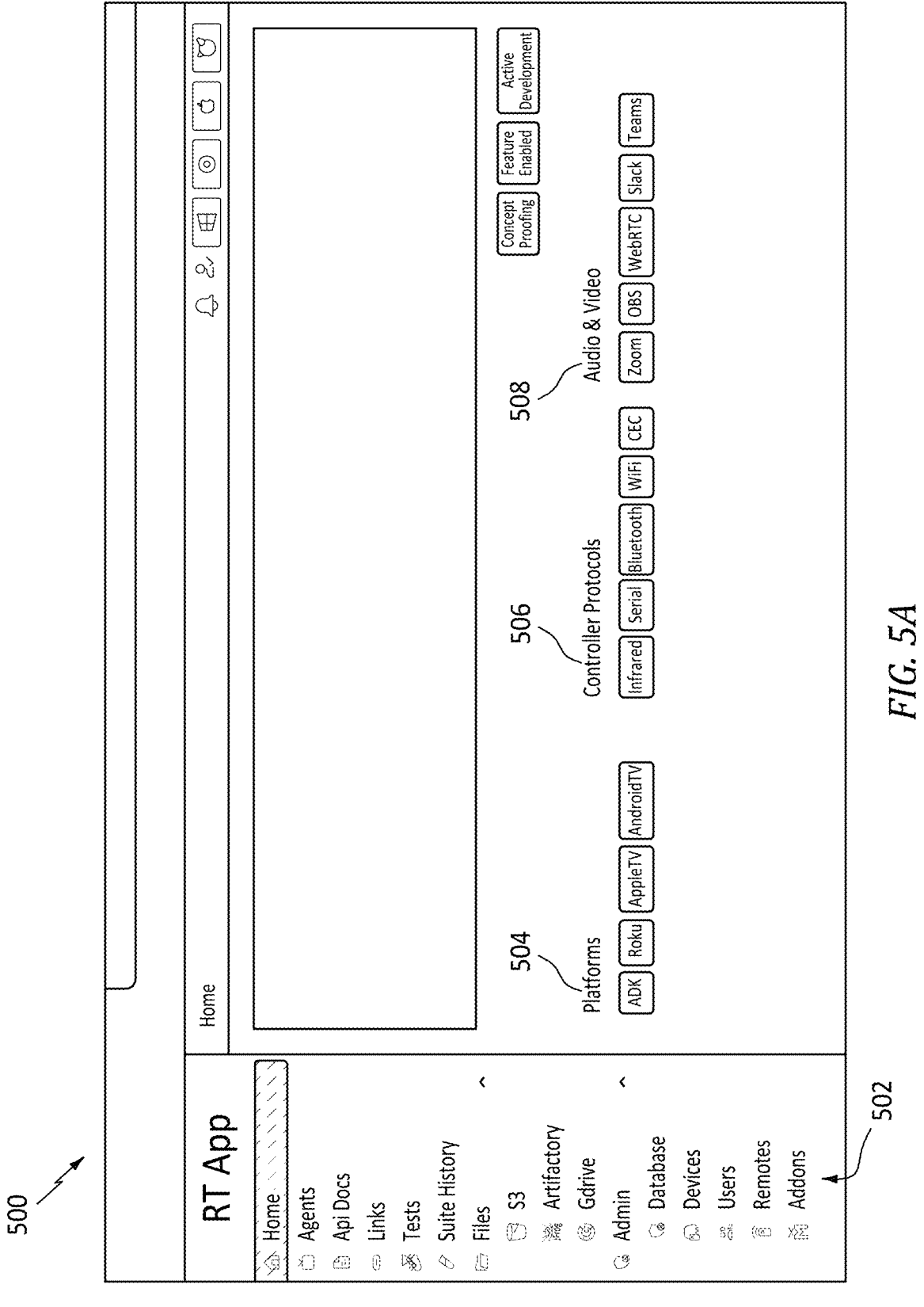
FIG. 5A is a screen illustration of an RT App user interface (UI) home landing page, in accordance with embodiments of the present disclosure.
Figure 5B:
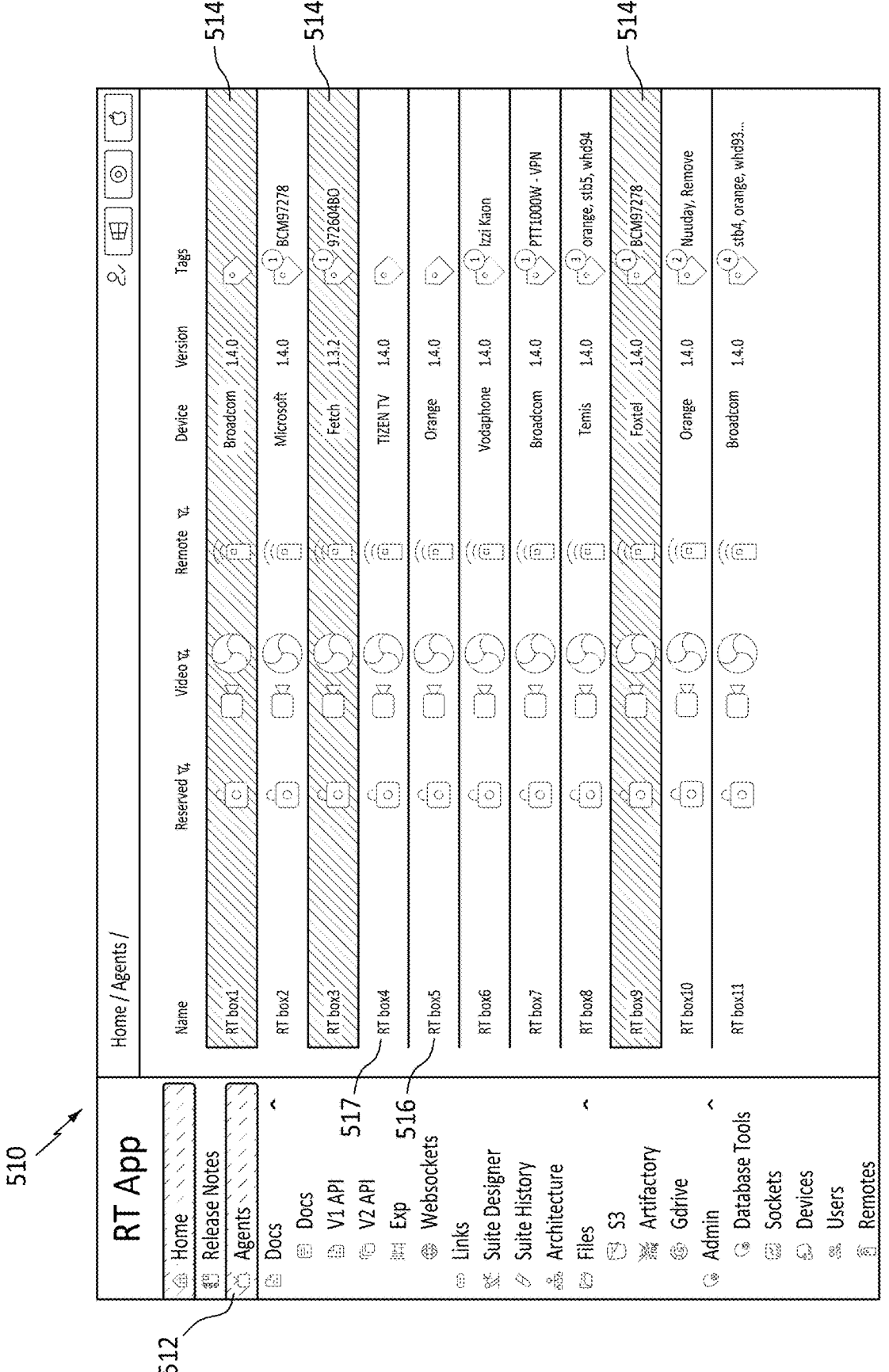
FIG. 5B is a screen illustration of an Agents listing page of the RT App user interface, in accordance with embodiments of the present disclosure.

In some embodiments, the RT Service logic may continually poll all the RT boxes 26 in the system 10 to see their status and may update a table or database with the lasts information about RT box status, and related information that may be provided to the user device(s) via the RT App 16 for display to the users 18,62, such as the data shown in an RT box agent listing table of FIG. 5B.

Each of the RT boxes 30A,30B,30C receives IR Commands from the RT Service Logic 24 on lines 40A,40B,40B respectively, and provides IR commands to corresponding set top boxes (STB1,STB2,STBN) 32A,32B,32C connected to the respective RT boxes 30A,30B,30C. The RT boxes 30A,30B,30C each receives Video Out signal on lines 29A, 29B,29C, from the set top boxes (STB1,STB2,STBN) 32A, 32B,32C, respectively, in response to the IR commands from the RT Boxes 30A,30B,30C, respectively.

The set top boxes (STB1,STB2,STBN) 32A,32B,32C, each receives a video signal on a line 33A,33B,33C, from a corresponding video source 34A,34B,34C, respectively, such as a video streaming service or platform, and provides a corresponding video/data output signal on lines 29A,29B, 29C to the corresponding RT boxes 30A,30B,30C in response to the IR commands on lines 31A,31B,31C.

The RT boxes 30A,30B,30C each provide a corresponding video/data output signal on lines 42A,42B,42C, respectively to the RT Service Logic 24, in response to the IR commands on lines 40A,40B,40C. Also, the video/data signal from each of the RT Boxes 30A,30B,30C is also provided directly to the User Device 12, as shown by lines 44A, 44B, 44C, e.g., via a Web RTC network connection (discussed more hereinafter).

The RT Service Logic 24 also communicates with a MySQL Server 50 and an Amazon S3 Server 52, which, in some embodiments, may be used to store data and videos, e.g., using cloud storage. In particular, the MySQL Server 50 may be used to store agent/RT box configuration settings, RT box status and activity, IR command codes and the like. The Amazon S3 Server (or S3 bucket) 52 may, in some embodiments, be used to store playbacks, artifacts and results from test automation runs (e.g., by Automated Test Runner Logic or ATR Logic), and post processing (or image/object verification) test runs (e.g., by Image Verification Logic), including logs, images, videos, and related data or metadata, and the like.

The MySQL server (or database) 50 may be a known open-source client/server relational database management system (RDBMS) that may include a multithreaded SQL server that supports different back ends, several different client programs and libraries, administrative tools, and a wide range of application-programming interfaces (APIs). The MySQL server 50 may be used to store data in tables that map to objects, where each table may have a schema defining what columns each row of the table will have. Also, the MySQL Server 50 can store and retrieve many data types, including text, numbers, dates, times, and JSON, as is known. Other types of servers or SQL (Structured Query Language) servers for the server 50 may be used if desired. Also, the Amazon S3 (Simple Storage Service) Server 52 may be a known storage service offering industry-leading scalability, data availability, security, and performance. Other types of servers for the server 52 may be used if desired.

The RT Service Logic 24 may also communicate with and provide commands on a line 56A to Image Verification Logic 54 (or Object Verification Logic or IV Logic) and may also receive status and data on a line 56B from the Image Verification Logic 108 relating to the test being run (discussed more hereinafter). The Image Verification Logic 54 may be used to perform image verification or other AI based image recognition and validation or testing.

The RT Service Logic 24 may also communicate with Other Logic 58 that receives commands from the RT Service Logic 24, which may be any other logic or software application (which may be API based or not) for performing testing or automation on a media player device, such as an OTT box, an STB, or a living room device or other digital device that can be controlled by a remote control device, which is in proximity to (or collocated with) the RT box. The Other Logic 58 may receive commands on a line 60A and may provide output status and data on a line 60B similar to the Image Verification Logic 54. This illustrates the modular design of the system of the present disclosure by allowing other test or automation logics to "plug in" to the existing system through the RT Service Logic 24, which may be configured as a "hub" for connecting or interacting with the system of the present disclosure, as described herein.

Figure 2A:
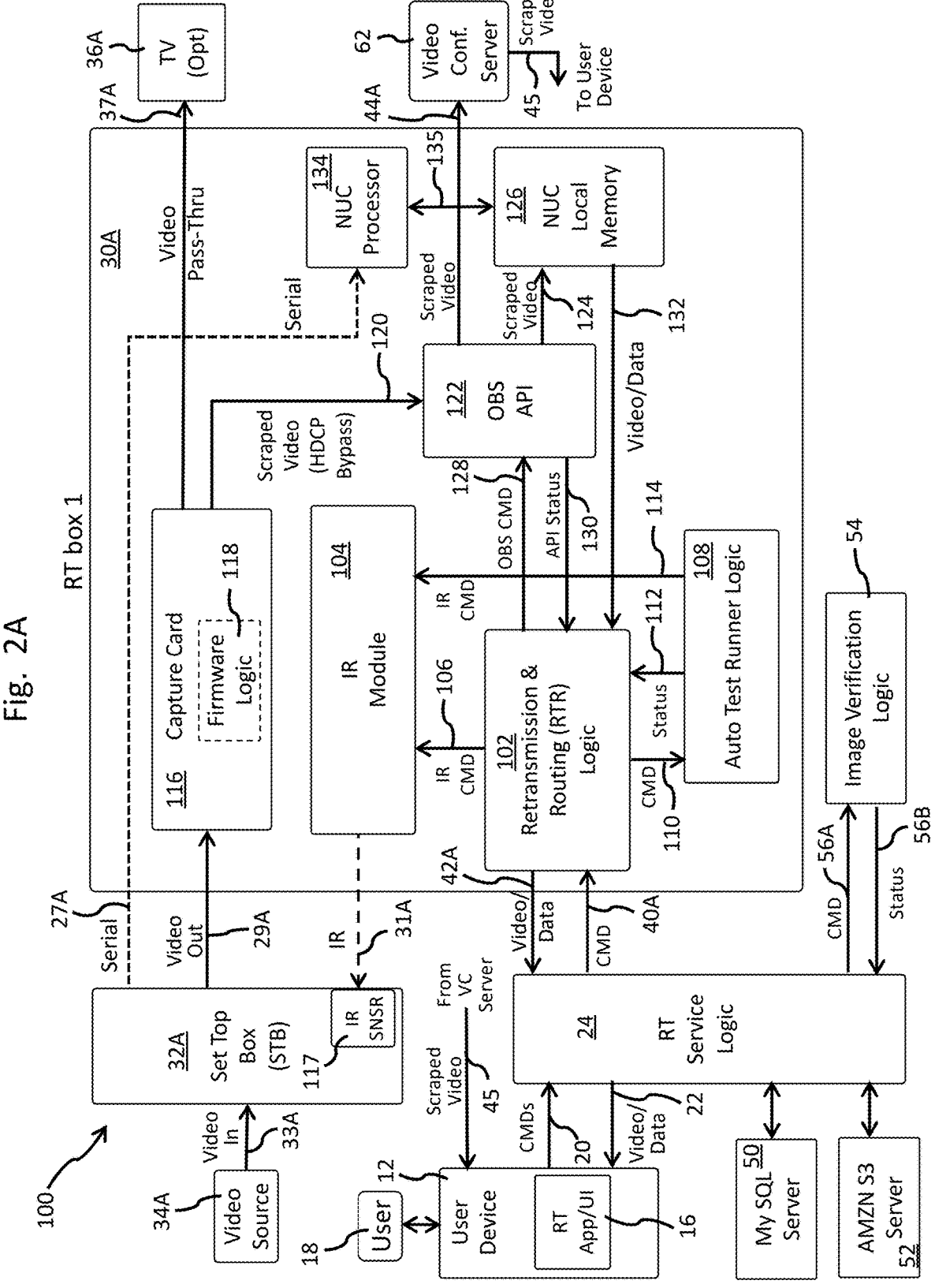
FIG. 2A is a block diagram of a portion of FIG. 1, showing components of a system and method to remotely control and test media player devices, in accordance with embodiments of the present disclosure.

Referring to FIG. 2A, components of the remote testing device or box 1 (or RT device or RT box) 30A are shown, in accordance with embodiments of the present disclosure. In particular, the testing box 30A may include Re-Transmission & Routing Logic (RTR Logic or RTR Application or Retransmission Application) 102, which receives commands (CMDs) from the RT Service Logic 24 on the line 40A and provides the Video and Data output on the line 42A.

The hardware architecture of the RT box 30A may be based on an Intel NUC chassis, which is an ultra-compact PC for running modern software applications having a NUC processor 134, e.g., INTEL 15 NUC, BNUC11TNHi50001, Mini PC Barebone System, Intel Core i5-1135G7 CPU processor (including 8M Cache and up to 4.20 GHz processor speed), and having 8 GB RAM, e.g., model CT2K4G4SFS824A, DDR4 SDRAM, made by Crucial Technology, and solid state drive (SSD) memory, e.g., 256 GB Solid State Drive flash memory, made by Kingshark Gamer. The NUC processor 134 may be used to perform the logics described herein for the RT box 30A. The NUC processor 134 may also communicate with a NUC local memory 126, e.g., solid state memory or SSD or any other on-board memory that has the storage capacity, response time, and other functional and performance characteristics needed to perform the functions described herein.

The operating system (OS) for the RT box 30A may be a Windows® OS by Microsoft, so it is easily configurable and compatible with most applications. Other operating systems for the RT box 30A may be used if desired, e.g., Linux, or others. The RT box 30A may have a very small form factor (e.g., about 4.25″ on all dimensions), e.g., no larger than a standard-sized STB. It also has a sturdy metal chassis, which works well for cooling and shipping. The main board may have an M.2 bus powered by a PCI-e that makes it possible to use a miniature capture card with up to 4K video capability. In addition, the NUC chassis for the RT box 30A allows for additional physical space and additional CPU power for additional diagnostic and capture applications, such as Zoom, Charles, Wireshark, Putty and the like.

The RTR Logic 102 provides infrared (IR) commands on a line 106 to an IR Module 104, e.g., Global Cache, Model #iTach IP2IR, made by Gefen, which includes an RJ45 network connector, 100/10 Mbits Ethernet protocol, and adheres to TCP, DHCP and HTTP standards, has 3 independent selectable IR outputs or sensor inputs, 3 IR emitters, and 1 IR blaster.

Referring to FIG. 2B, a table 200 of the IR Commands is shown which are based on standard digital remote commands corresponding to remote control buttons on a hand held remote control device, such as those listed (in alphabetical order), and also listed below: back, blue, chan_down, chan_up, clear, dot, down, eight, exit, fast_forward, five, four, green, guide, home, info, left, menu, next, nine, one, pause, play, play_pause, power, prev, red, return, rewind, right, select, seven, six, stop, three, two, up, vol_down, vol_up, yellow, zero. Each of these commands corresponds to a predetermined digital IR code or IR command, per known IR remote standards, shown as a hexadecimal command code or sequence in the table 200, which corresponds to a particular frequency band, baud rate, IR burst time, and other relevant parameters, each of which may be unique for each STB make and model. The table (or SQL database) 200 may be stored in the My SQL server 50. Any given STB may accept IR commands from a subset of the above list of buttons, depending on the manufacturer and model # of the STB. Also, once the make (or manufacturer or mfgr) and model of the STB is identified, the table shows which commands are accepted by a given STB.

For example, the number of global STB makes and models supported by the system of the present disclosure is quite extensive. A small sample of STBs from Australia, EU, and Latin America is shown below: Make: Fetch, Models: H671T, HY4424; Make: Orange, Models: Whd93, Whd94, Whd95; Make: Claro, Models: S4kw2, S4kw3, K4cw51; Make: Polsat, Models: D61, D63, D64; Make: Virgin Media, Models: EOSv1 1008c, Apollo vip5002w, Apollo vip7002w; Make: Vodafone, Models: Dxlw393, Dx384, Dx1362; Make: Nuuda, Models: YS-4000, YS-5000; Make: Deutsche Telekom, Models: G4, G5; Make: Foxtel, Models: i03, i04, i05. Each of the above may have different IR command codes and different remote-control commands supported by a given device.

The RTR Logic 102 also provides commands to a known OBS (Open Broadcaster Software) API 122 (discussed more hereinafter) on a line 128 and receives Status and data from the OBS API on a line 130. Also, the RTR Logic 102 receives video and data from a NUC local memory 126, e.g., solid state memory or SSD or any other on-board memory that has the storage capacity, response time, and other functional and performance characteristics needed to perform the functions described herein. The NUC local memory 126 communicates with and may be controlled by a NUC processor 134, which may perform the software applications and logic of the remote testing box (or RT box) 30 as described herein. In some embodiments, the NUC processor 134 may communicate with external memory having the necessary function and performance to perform the functions described herein.

The RTR Logic 102 may also provide commands to Automated Test Runner (ATR) Logic 108 (or Auto Test Runner Logic) on a line 110 and may receive status and data on a line 112 from the ATR Logic 108 relating to the remote test being run (discussed more hereinafter). The ATR Logic 108 may also provide IR Commands (CMD) to the IR Module 104 on a line 114.

The IR Module 104 receives IR commands on the lines 106, 114, as discussed herein above, and provides an IR signal, shown as a dashed line 31A onto a corresponding STB 32A. The STB having an IR Sensor (or IR Receiver) 102 within the STB which senses the infrared (IR) signal emitted from the IR Module and responds to same. In some embodiments, the IR signal may be provided by an LED (IR light emitting diode) at the end of an electrical lead (or pigtail), having one end electrically attached to the IR module 104 and having the opposite end with the LED attached near the IR sensor of the STB device. In some embodiments, other communication protocols may be used to communicate with the STB, such as non-IR digital signal, e.g., CEC (Consumer Electronics Control), Bluetooth, or other protocols, if desired.

The STB 32A receives the IR command signal on the line 31A at the IR Sensor 117 and converts it to known commands and responds by providing an output video signal on a line 29A to the Capture Card 116 in the RT box 30A. The Capture Card 116 receives the input video signal on the line 29A from the STB 32A and passes through the video, unaltered, on a line 37A, which is a video output port of the RT box 30. In some embodiments, the video output signal may be provided to a TV (optional) 36A. The Capture Card 116 also "scrapes" the input video signal on the line 29A and provides an HDCP (high-bandwidth digital content protection) bypass or "scraped" video signal (discussed more hereinafter) on a line 120 to the OBS API as discussed herein. In some embodiments, the Capture Card 116 may have Firmware Logic 118 which scrapes the video signal and preserves the HDCP (discussed more with FIG. 3).

The OBS API (or OBS Studio) 122 is a known free and open-source, cross-platform screen-casting and streaming app, which may be a standard REST API which receives REST commands. The OBS API 122 receives commands on the line 128 and provides status and data on the line 130 and receives a video signal on a line 120 from the Capture Card 116 and stores the video to the NUC local memory 126 as shown by a line 124. It then retrieves the video on the line 124 and sends the video (and associated metadata) to the User Device 12 as shown by a line 44A using a known WebRTC communication.

WebRTC (Web Real-Time Communication) or consumer WebRTC client is a known open-source software package that provides web browsers and mobile applications with real-time communication (RTC) via application programming interfaces (APIs). It allows audio and video communication to work inside web pages by allowing direct peer-to-peer communication, eliminating the need to install plugins or download native apps. More information about WebRTC may be found at https://www.w3.org/TR/webrtc/.

In some embodiments, the system of the present disclosure, e.g., the test runner (or Automated Test Runner Logic or ATR Logic), may use a scripting dictionary including the following schema for writing configuration files, which may be based on a known "YAML" (or YAML syntax) human readable data serialization language, and may be referred to herein as a "Willowscript" schema. The following schema also shows sample values along with example variables. Such a schema may be used to create automated pre-set or predetermined scripted tests comprising a set of instructions (e.g., used by the ATR Logic) that cause the STB or media device to perform a series of instructions (or actions or commands) that may be stored on a server, e.g., the S3 Server 52 (FIGS. 1, 2A) and retrieved by the user through the RT App 16 and RT Service Logic 24 to run a single test or a plurality of tests (or test suite), as discussed hereinafter. In some embodiments, the user may create their own scripted test using the Willowscript schema described herein. Other schemas and languages may be used if desired provided they provide the function and performance described herein.

An "initial_page" is the initial page that a test should start on. A homing algorithm is used to reach this page. Sample values for "initial_page" are: home, search, whos_watching, movies, series, watchlist, originals, settings. Other values may be used if desired. Examples for "initial_page": initial_page: search; initial_page: home; initial_page: whos_watching.

An "stb_input" command requests the device to issue one or a sequence of Remote Control (IR or Bluetooth) button or key presses. This is the main supported way of navigation in scripted tests. Sample values for "stb_input" are: back, blue, chan_down, chan_up, clear, dot, down, eight, exit, fast_forward, five, four, green, guide, home, info, left, menu, next, nine, one, pause, play, play_pause, power, prev, red, return, rewind, right, select, seven, six, stop, three, two, up, vol_down, vol_up, yellow, zero (as discussed herein with FIG. 2B for the remote control commands).

Some examples for "stb_input" are as follows. Issues a single select key with a delay of 500 ms: {cmd: stb_input, key: select}. Issues a single back key after a delay of 1 second: {cmd: stb_input, key: back, count: 1, delay_s: 1}. Issues a single back key after a delay of 1 second, with a timeout of 1 second for this command: Total timeout for the device reply is 2 seconds: {cmd: stb_input, key: back, count: 1, delay_s: 1, timeout_s: 1}. Issues 5 rights in a row, with a 100 ms delay between each: {cmd: stb_input, key: right, count: 5, delay_ms: 100}. Issues a sequence of down, then right, and the select with a 200 ms delay in between each key: {cmd: stb_input, keys: [down, right, select], delay_ms: 200}. {cmd: stb_input, keys: [{key: down, delay_ms: 200}, {key: right, delay_ms: 200}, {key: select, delay_ms: 200}]}. Issues a sequence of 4 rights with a 50 ms delay followed by a select after a 1 second delay: {cmd: stb_input, keys: [{key: right, count: 4, delay_ms: 50}, select], delay_s: 1}. Different ways to issue one down key: {cmd: stb_input, key: down}; {cmd: stb_input, keys: [{key: down, count: 1}]}; {cmd: stb_input, keys: [{key: down, delay_ms: 100}]}. Different ways to issue 2 down keys: {cmd: stb_input, key: down, count: 2}; {cmd: stb_input, keys: [down, down]}; {cmd: stb_input, keys: [{key: down, count: 2}]}; {cmd: stb_input, keys: [{key: down}, {key: down}]}.

An "event" is a check by the test runner to ensure that some event happens to verify test correctness. It is the main way in which tests can pass/fail. Typically, events come from the device under test and each event is a check (or verification) that the event is received in a reasonable amount of time. If the specified event is not received within a predetermined timeout time, the test will fail. Timeouts ("timeout_s") are specified in each event type and are applied after "pre-actions" are carried out. Specific events are specified via the event field. Every event contains this field, and the presence of the field in a map implies it is an event. Based on the value of the event field, the rest of the event will be treated as an instance of that specific event. Sample values for "event" are: page_ready, media_player_seek_amount, media_player_seek_to, media_player_status, media_player_text_disabled, media_player_text_enabled, media_player_audio_updated.

The "page_ready" event will wait for a page ready event from a specified page to be received in the event stream within the application logs from the device under test. The "page_ready" event is important because it indicates when the requested page is fully loaded, allowing the next set of instructions in the test to be sent. Otherwise, if the system sends instructions (e.g., remote commands, such as up, down, left, right, select/OK, and the like) to the STB before a page is fully loaded, those instructions may potentially get dropped by the STB because the STB was not ready to begin navigating the application running on the STB. Sample values for the "page_ready" event are: account_settings, app_settings, brand_collection, collection, debug_tools, dialog_logout, email, help, home, legal, media_player, movie_detail, movies, originals, password, search, series, series_detail, settings, watchlist, welcome, whos_watching.

Some examples for "page_ready" event are as follows. Waits for a page ready event from the home page: {event: page_ready, page: home}; Waits up to 15 seconds for a page ready event from the home page: {event: page_ready, page: home, timeout_s: 15}.

The "media_player_seek_amount" event waits for a seek event from the media player of the device under test specifying a seek of a specific amount has been completed. For example, during playback of a movie, the test may want to make sure that something specific happens at a certain time, e.g., 10 minutes or 1 hour into a movie, by reading the media player logs, which is metadata embedded in the streaming digital video signal, which may include time stamps and other metadata about the video. The metadata includes a log trace (or app log events) including images that are loading, connections, authentication, playback, are all part of the video output from the STB.

Value is media_player_seek_amount, "amount". "Amount" is a float value. Value is the difference in end and start times in seconds. Negative values will be interpreted as backwards seeks (rewind, back jumps, etc). "Epsilon" is a positive float value, Value is in seconds. The test runner will search for a seek event such that end_position−start_position is within amount+/−epsilon. Default value is 1.0 second. "cause"—If specified, the test runner will only look for seek events with this cause. If unspecified, the test runner will look for any seek events that satisfy the seek amount. "timeout"—Default value is 30 seconds.

Some examples for "media_player_seek_amount" are as follows. Issues a skip forwards and verifies that 10.0 seconds passed: pre: {cmd: stb_input, key: right}; expect: {event: media_player_seek_amount, amount: 10.0}. Issues a skip backwards and verifies that 10.0 seconds passed: pre: {cmd: stb_input, key: left}; expect: {event: media_player_seek_amount, amount: −10.0}. Checks that a fast forward resulted in a desired amount of time being skipped 100.0+/−20.0 seconds: {event: media_player_seek_amount, amount: 100.0, epsilon: 20.0}.

The "media_player_seek_to" event waits for a seek event from the media player of the device under test specifying a seek to a specific location has been completed. Value is media_player_seek_to. Value is the desired normalized position in seconds. "Epsilon" is a positive float value. Value is in seconds. The test runner will search for a seek event to position +/−epsilon. Default value is 1.0 second. For "cause", if specified, the test runner will only look for seek events with this cause. If unspecified, the test runner will look for any seek events to the specified position timeout. Default value is 30 seconds.

Some examples for "media_player_seek_to" are as follows. Waits for a seek event to 26.0 seconds with an epsilon of 5.0 seconds: {event: media_player_seek_to, position: 26.0, epsilon: 5.0}.

The "media_player_status" will wait for a media player status update from the integrated media player on the device under test. Value is "media_player_status", status. The status to wait for is one of: idle, initialized, prepared, playing, paused, complete, error, and timeout. Default value is 30 seconds.

Some examples for "media_player_status" are as follows. Waits for a media player to report a playing status: {event: media_player_status, status: playing}. Waits for a media player to report a paused status: {event: media_player_status, status: paused}.

The "media_player_audio_updated" event will wait for an audio track update from the integrated media player on the device under test specifying that a specific track has been enabled.

Some examples for "media_player_audio_updated" are as follows. Waits for a media player to report that an English audio track has been enabled: {event: media_player_audio_updated, name: English}. Waits for a media player to report that a Spanish audio track has been enabled: {event: media_player_audio_updated, name: Español}. Waits for a media player to report that any new audio track has been enabled: {event: media_player_audio_updated, name: .*}.

Figure 3:
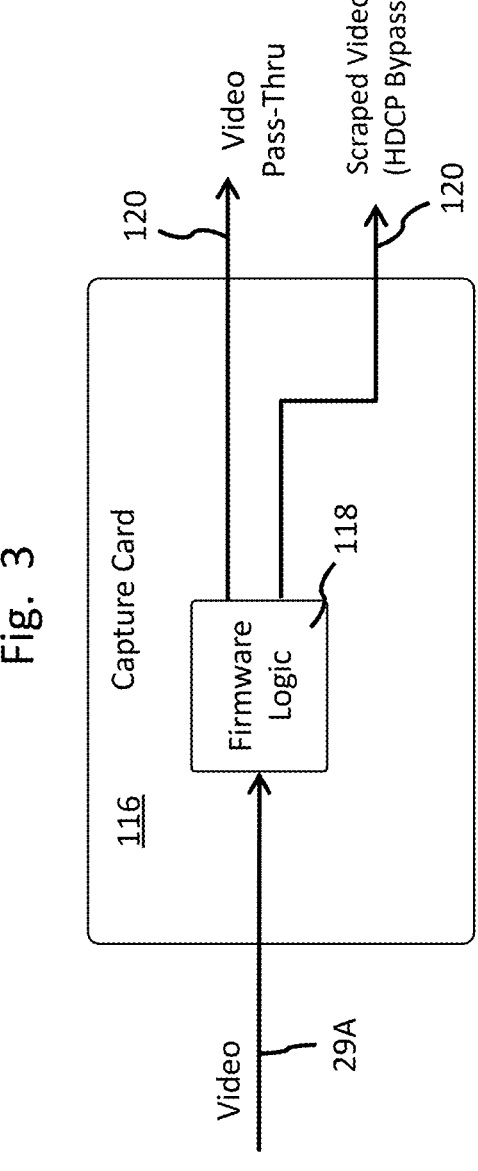
FIG. 3 is a block diagram of an embodiment of a capture card of FIG. 2A with firmware, in accordance with embodiments of the present disclosure.

Referring to FIG. 3, components of the Capture Card 116 are shown, in accordance with embodiments of the present disclosure. In particular, the Capture Card 116 may include a video splitter 302, e.g., 4K HDMI Splitter 1×2 HDR D-o-l-b-y Vision Atmos Down Scaler—HDMI Scaler 4K 1080P Sync, 4K 60 Hz 4:4:4 HDMI Splitter 1 in 2 Out HDCP2.2, EDID 4K5.1/4K7.1/Copy, for Game Xbox PS5 1080p120 Hz Roku SP12H2, made by EZCOOTECH, Model #EZ-SP12H2. The splitter 302 receives the video signal on the line 29A from the STB and provides the video pass-thru signal on the line 37A and also scrapes a 4kUHD signal and down-converts it to a 1080p, negating the requirement for HDCP, and provides the scraped video signal on the line 120.

Referring to FIG. 3, in some embodiments, the Capture Card 116 may be, e.g., Avermedia GC5551 G2 capture card which is included with the SimplyNUC manufactured box and is HDCP compliant. Also, the capture card in the NUC provides firmware which may be customized for a specific application. In the system of the present disclosure, the firmware is customized to provide the desired handling and scraping of the video signal to comply with HDCP (High-bandwidth Digital Content Protection) and meet the performance requirements of the present disclosure, as discussed herein. In some embodiments, if HDCP compliance is not required, components of the Capture Card 116 may include a video splitter (not shown), e.g., 4K HDMI Splitter 1×2 HDR D-o-l-b-y Vision Atmos Down Scaler—HDMI Scaler 4K 1080P Sync, 4K 60 Hz 4:4:4 HDMI Splitter 1 in 2 Out HDCP2.2, EDID 4K5.1/4K7.1/Copy, for Game Xbox PS5 1080p120 Hz Roku SP12H2, made by EZCOOTECH, Model #EZ-SP12H2. Other splitters may be used provided they meet the desired function and performance requirements. In that case, the splitter may receive the video signal on the line 29A from the STB and provide the video pass-thru signal on the line 37A and may also scrape a 4kUHD signal and down-convert it to a 1080p, and may provide the scraped video signal on the line 120.

In particular, EDID (Extended Display Identification Data) is editable to change video input properties, video input is captured via UVC in any format, down-converted to 1080p/SDR and re-encoded as a WEBRTC stream and sent via network to a central server and direct to user. Also, audio input is captured in any format and down-converted to StereoPCM. In addition, the capture card has custom firmware with HDCP flag enabled, which allows the capture of content for testing purposes. Where UVC (Universal Video Class) is a driver that is commonly used with USB video devices such as webcams or capture cards; EDID (Extended Display Identification Data) is metadata that is contained within the HDMI feed that promotes a negotiation of commonality between the source and destination of content; WEBRTC (Web Real-Time Communication) is a protocol that allows the capture and direct point-to-point stream of data such as audio and video without the need for an intermediary, which promotes low latency; and HDCP (High-bandwidth Digital Content Protection) is a method of negotiation that lives within HDMI or Displayport devices, meant to eliminate the possibility of recording content between the device and display.

In some embodiments, the capture card 116 may be an Magewell Eco Capture HDMI 4K M.2 Single-Channel Capture Card. The Eco Capture HDMI 4K M.2 Single-Channel Capture Card from Magewell allows the user to connect an HDMI source to a computer and capture up to DCI 4K 4096×2160 resolution with embedded audio.

The capture card 116 scrapes a 4kUHD signal and down-converts the signal internally within the capture card, which provides a high quality video signal. The capture card has an M.2 (PCIe 2.0) computer interface and may be used in compact/thin computers and other small form factor PCs, such as the RT box. It is compatible with Windows and Linux operating systems and is capable of operating 24 hours a day, 7 days a week, and an LED indicator on the card (not shown) confirms the working state of the input while in operation (e.g., idle, input signal locked, memory failed, or FPGA configuration). The capture card also provides processing features such as resolution scaling and a high-fidelity pipeline. The card also has a native FPC input connector and a matching FPC to HDMI type A adapter and a ribbon cable for connecting an HDMI signal. Other capture cards may be used if desired provided they provide the desired function and performance described herein.

Figure 4A:
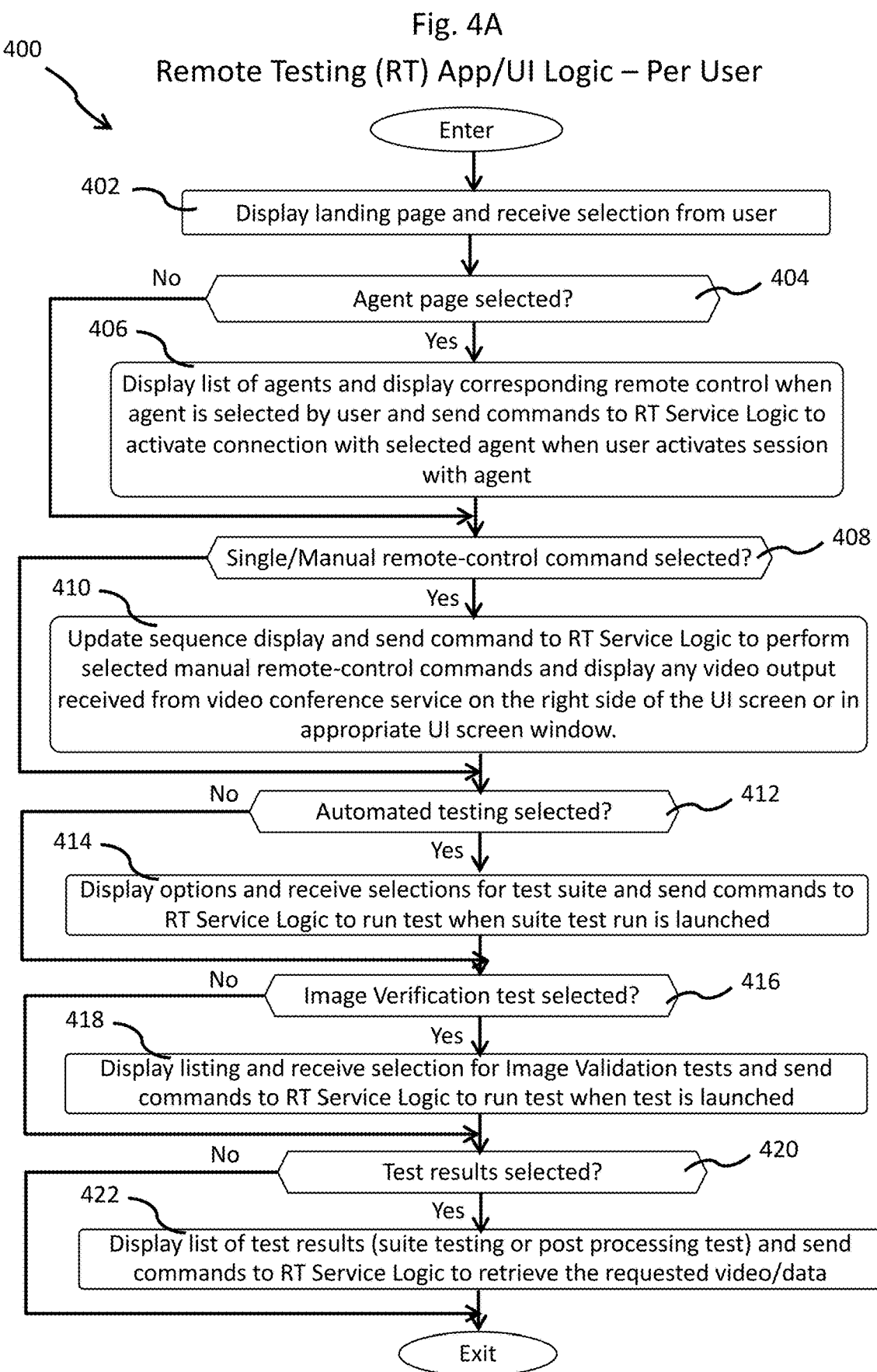
FIG. 4A is a flow diagram of an embodiment of a Remote Testing (RT) App/UI Logic (per user), in accordance with embodiments of the present disclosure.

Referring to FIG. 4A, a flow diagram 400 illustrates one embodiment of a process or logic for implementing the Remote Testing (RT) App/UI Logic 16 (per user) (FIGS. 1 and 2A), in accordance with embodiments of the present disclosure. The process 400 begins at block 402, which displays the appropriate landing page and receives a selection from the user. Next, block 404 determines whether the Agent page is selected. If Yes, block 406 displays a list of agents and, when the agent is selected by the user, displays a corresponding remote control for the selected agent and send commands to RT Service Logic 24 (FIG. 1, 2A) to activate a connection with the selected agent when user activates session with agent. Next, or if the result of block 404 is No, block 408 determines whether a single/manual remote-control command has been selected by the user. If yes, block 410 updates the sequence history display 610 (FIG. 6A) and sends a remote-control command to the RT Service Logic 24 to perform the selected manual remote-control commands and display any video output received from video conference server 62 (FIGS. 1 and 2A) on the right side 604 (FIG. 6A) of the UI screen or in an appropriate UI screen window. Next, or if the result of block 408 is No, block 412 determines whether the Automated Test Runner (or ATR) logic 108 (FIG. 2A) has been selected by the user. If yes, block 414 displays test options 803 (FIG. 8A) and receives selections from the user for the selected test suite and sends commands to the RT Service Logic 24 to run the selected tests when the Run Suite Test button 810 (FIG. 8A) is selected or clicked on by the user. Next, or if the result of block 412 is No, block 416 determines whether the Image Verification logic 54 (FIGS. 1 and 2A) has been selected by the user. If yes, block 418 displays options and receives selections (if any) for image verification tests (post processing) and sends commands to RT Service Logic 24 to run an image verification test. Next, or if the result of block 416 is No, block 420 determines whether the test results has been selected by the user. If yes, the system will display a list of test results (suite testing or post processing test) and send commands to RT Service Logic 24 to retrieve the requested video/data results. Next, or if the result of block 420 is No, the logic exits.

Referring to FIG. 4B, a flow diagram 430 illustrates one embodiment of a process or logic for implementing the Remote Testing (RT) Service Logic 24 (for all users) (FIGS. 1 and 2A), which interacts with all user devices in the system, in accordance with embodiments of the present disclosure. The process 430 begins at block 432, which determines whether an Agent (or RT box) Selected command has been received from a user device RT App. Next, block 433 sends commands to the selected RT box/agent to activate a connection between selected RT box and the requesting user device RT App. Next, or if the result of block 432 is No, block 434 determines whether a command to perform a selected manual/single remote-control command has been selected by the user. If yes, block 435 sends the received manual/single remote-control commands to the selected RT box. Next, or if the result of block 434 is No, block 436 determines whether a command to perform an automated test has been selected by the user. If yes, block 437 sends the received manual/single remote-control commands to the RTR logic of the selected agent to run an automated test suite selected by the user. Next, or if the result of block 436 is No, block 438 determines whether a command to perform an image (or object) verification test has been received by the user device RT App. If yes, block 439 sends commands to the Image Validation Logic 54 (FIGS. 1 and 2A). Next, or if the result of block 438 is No, block 440 determines whether a command to retrieve test results is received from the user device RT App. If yes, the logic retrieves requested test results including video/data from the selected agent and provides same to the associated user device RT App that requested it. Next, or if the result of block 440 is No, block 444 determines whether a command to end the RT box or Agent connection is received. If yes, block 446 sends commands to the corresponding RTR of the selected Agent or RT box to stop the connection between selected RT box and the requesting user device. Next, or if the result of block 444 is No, the logic exits.

Figure 4C:
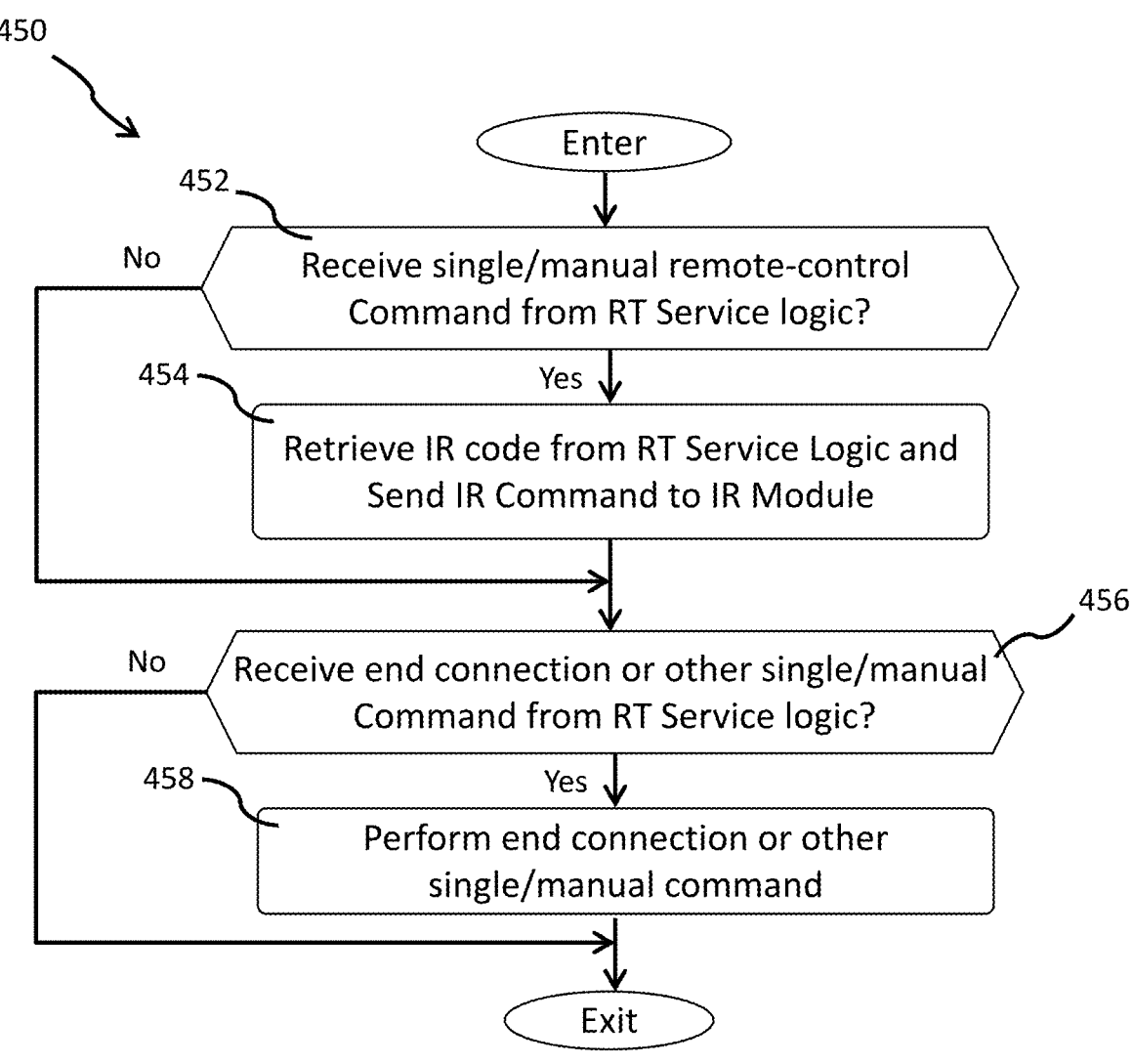
FIG. 4C is a flow diagram of an embodiment of a Retransmission & Routing (RTR) Logic, for handling single/manually entered commands, in accordance with embodiments of the present disclosure.

Referring to FIG. 4C, a flow diagram 450 illustrates one embodiment of a process or logic for implementing the Retransmission & Routing (RTR) Logic 102 (FIGS. 1 and 2A), for handling single/manually entered commands, in accordance with embodiments of the present disclosure. The process 450 begins at block 452, which determines whether the RTR has received a single/manual remote-control command from RT Service logic. If yes, the logic retrieves the IR code from RT Service Logic and sends the IR Command to the IR Module. Next, or if the result of block 452 is No, block 456 determines whether a command to end the RT box or Agent connection or another single/manual command is received from the RT Service Logic. If yes, block 458 ends the connection with the Agent or RT box or performs the other single/manual command. Next, or if the result of block 456 is No, the logic exits.

Referring to FIG. 4D, a flow diagram 460 illustrates one embodiment of a process or logic for implementing the Retransmission & Routing (RTR) Logic 102 (FIGS. 1 and 2A), in accordance with embodiments of the present disclosure. The process 460 begins at block 462, which receives a command from the RT Service Logic. Next, block 464 determines whether an automated test suite command has been received. If no, the logic proceeds to block 465 which performs the RTR single/manual command entry discussed herein with FIG. 4C and the logic exits.

If the result of block 464 is yes, an automated test has been received and block 466 sends test scripts for automated test to the Automated Test Runner Logic (or ATR logic). Next, block 467 sends OBS commands (e.g., start/stop, screen shots, OCR) to the OBS API to process the video based on the test script & receives/confirms API status from OBS API after each command. Next, block 468 determines whether the automated test is complete. If No, the logic proceeds back to block 467 which again sends OBS commands (e.g., start/stop, screen shots, OCR) to the OBS API to process the video based on the test script & receives/confirms API status from OBS API after each command. If the result of block 468 is Yes, the automated test is completed and block 469 uploads the video from local memory to S3 Server via the RT Service using a multipart upload, e.g., RT service may open a data pipe for efficient transfer of video file, and the logic exits. On completion of a test (success or failure), test results are automatically provided, as well as any screenshot and recordings, and are all uploaded to the S3 Server or other server for future use.

Referring to FIG. 4E, a flow diagram 470 illustrates one embodiment of a process or logic for implementing the Automated Test Runner Logic 108 (FIG. 2A) for performing automated testing or running of predetermined test scripts or test suites (groups of tests), in accordance with embodiments of the present disclosure. The process 470 begins at block 472, which receives a wake-up command from the Retransmission & Routing (RTR) Logic 102. Next, block 474 receives test scripts for automated test(s) from the RTR Logic 102. Next, block 476 sends IR commands to the IR Module 104 to perform automated test(s) and record test results. Next, block 478 determines whether the automated test is completed. If No, the logic proceeds back to block 476 send the next IR commands to the IR Module 104 to perform next automated test(s) and record test results. If Yes, block 479 sends a completed status to the RTR Logic 102 and the logic exits.

Referring to FIG. 4F, a flow diagram 480 illustrates one embodiment of a process or logic for implementing the Image Verification Logic 54 (FIGS. 1 and 2A), for performing image verification testing of images in selected content, in accordance with embodiments of the present disclosure. The process 480 begins at block 482, which receives commands from the RT Service Logic to run an image verification test. Next, block 484 retrieves expected images/objects for given pages. Next, block 485 retrieves actual images/objects from previously run test images. Next, block 486 compares the expected images to the actual images and determines the differences. Next, block 488 determines if the image verification test is complete. If No, the logic proceeds back to block 484 to retrieve the next expected image. If yes, the block 489 outlines the image differences between the actual and expected images from each test and provides it to RT Service Logic 24 for display by RT App UI display on the corresponding requesting user device, and the logic exits.

Referring to FIG. 5A, a screen illustration is shown of a user interface (UI) home landing page 500 of the RT App 16, showing folders 502, and showing platforms 504, controller protocols 506, and audio & video 508 that are supported by the system, in accordance with embodiments of the present disclosure.

Referring to FIG. 5B, a screen illustration is shown of an Agents listing page 510 (or RT box listing page) of the RT App user interface, in accordance with embodiments of the present disclosure. In particular, when the Agents tab 512 is selected by the user, the page 510 appears showing a selectable list of RT boxes (or Remote Testing boxes, or RT devices, or RT Agents, or Agents, or "Geppetto" boxes) connected to the system 10 of the present disclosure. Each of the RT boxes may have a plurality of attributes, features or characteristics as indicated by columns to the right of the RT box, including: "Name" (for Agent's Name or RT box Name), "Reserved" (for reserved status, indicating which RT boxes are reserved or being used by another user), which, in some embodiments, may display a lock icon where a locked state icon means the corresponding RT box is reserved and an unlocked state icon means the corresponding RT box is available for use, "Video" (for the video connection), which, in some embodiments, may display a video camera icon indicating video conferencing is active (e.g., Zoom, WebEx, Skype, or the like) for the corresponding RT box, and may also display a circle icon having three internal wavy lines next to the video camera icon, indicating an OBS (Open Broadcasting System, discussed herein) is active or being used for the scraped video feed from the STB via the RT Device to the user device, Remote (for remote control type, e.g., IR, Bluetooth, CEC or the like, as discussed herein), which, in some embodiments, may display a remote control icon for IR (shown in FIG. 5B), or in some embodiments, may simply display the words (IR, Bluetooth, CEC), Device (for device type, brand name/make), Version (for version of the software running on the RT Device), e.g., 1.4.0, "Device" manufacturer/brand name, e.g., Broadcom, Microsoft, Fetch, TIZEN TV, Orange, Vodaphone, Temis, Foxtel, and the like, and one or more Tags (for tags or labels), which, in some embodiments, may be customized by a user, for each RT box 31A-31C (FIG. 1), where the circle number indicates how many tags are associated with a given RT box. It also shows RT boxes that are offline or not in service or not accessible as shown by rows 514 having crosshatching or shading. Other columns or RT box features may be used if desired. The user may select an RT box to connect to base on the usage requirements.

Figure 5C:
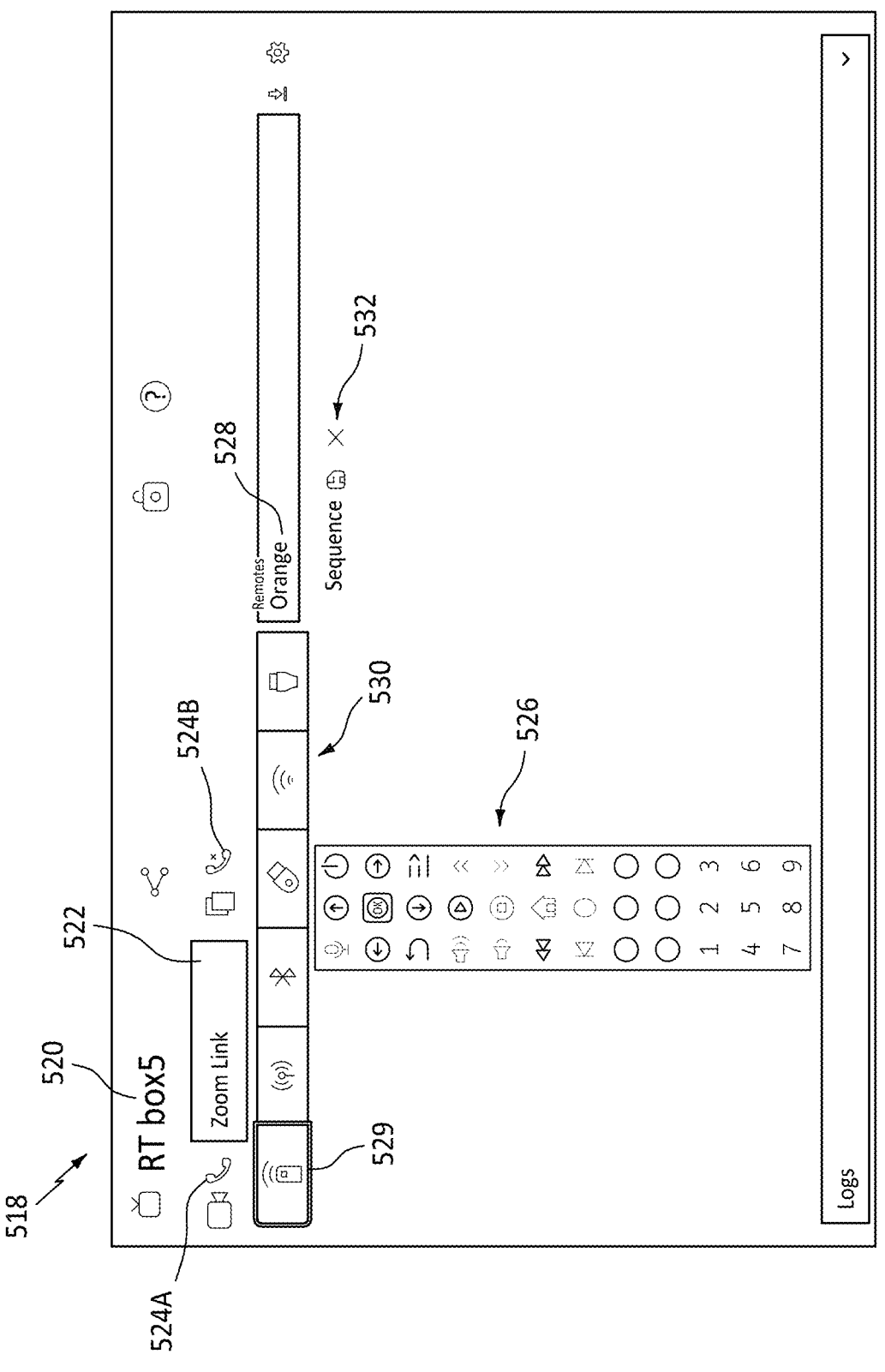
FIG. 5C is a screen illustration of a selected Agent page for the RT App user interface, in accordance with embodiments of the present disclosure.

Referring to FIG. 5C, a screen illustration is shown of a selected Agent page (for a selected RT box) 518 of the user interface for the RT App 16, in accordance with embodiments of the present disclosure. In particular, the page 518 shows Agent or RT box name 520 (e.g., RT box 4), remote control buttons (active and inactive) 526 corresponding to the STB connected to the RT box, STB (or media player device) type or make or model 528, e.g., Orange, connected to the RT box selected by the user from the agent listing screen of FIG. 5B.

Also, a field 522 displays the video conference link and a phone call icon 524A and phone hang-up icon 524B that may be clicked on by the user to initiate and terminate (or cancel or end), respectively, a video conference session with the selected RT box. There is also a series of thumbnail icon images 530 indicative of different types of connections between the RT box and the STB (or media player device), such as IR, Bluetooth, CEC, WiFi, HDMI, and the like. WIFI shown as the thumbnail icon 529 for the RT box 5 device in the example of FIG. 5C. There are various options to connect to the RT box video function. In some embodiments, the user can click on the call icon 524A and the RT box will initiate the video conference session or meeting. In that case, the RT box may create a video conference room (e.g., Zoom room or the like), and the RT box will have the user auto-join the room or session. In some embodiments, the user can have the RT box join an existing video conference room or session. In that case, the user can start a video conference call by putting the invite URL link into the meeting link box 522 and click on the call icon 524A, and the RT box will then join the user's personal video conference session. In either case, the user will be connected with the RT box's video output. Once connected audio and video and associated metadata (collectively "video") will be shared from the RT box to the RT App. Also, once connected, the user can control the STB or media player device directly using the remote control shown on the screen, where usable buttons for the selected media player device are automatically highlighted or made darker and unusable buttons are grayed-out or made dimmer than the other usable buttons.

Also, there may be a section 532 for enabling a sequence history option, to allow the user to see and record remote-control buttons pressed by the user, and allows the user to verify that the desired commands have been sent to the RT box. Also, to end the RT box session, the user may press the hang-up icon 524B in the UI which sends a command to the RT box to disconnect or end the video session.

Figure 6A:
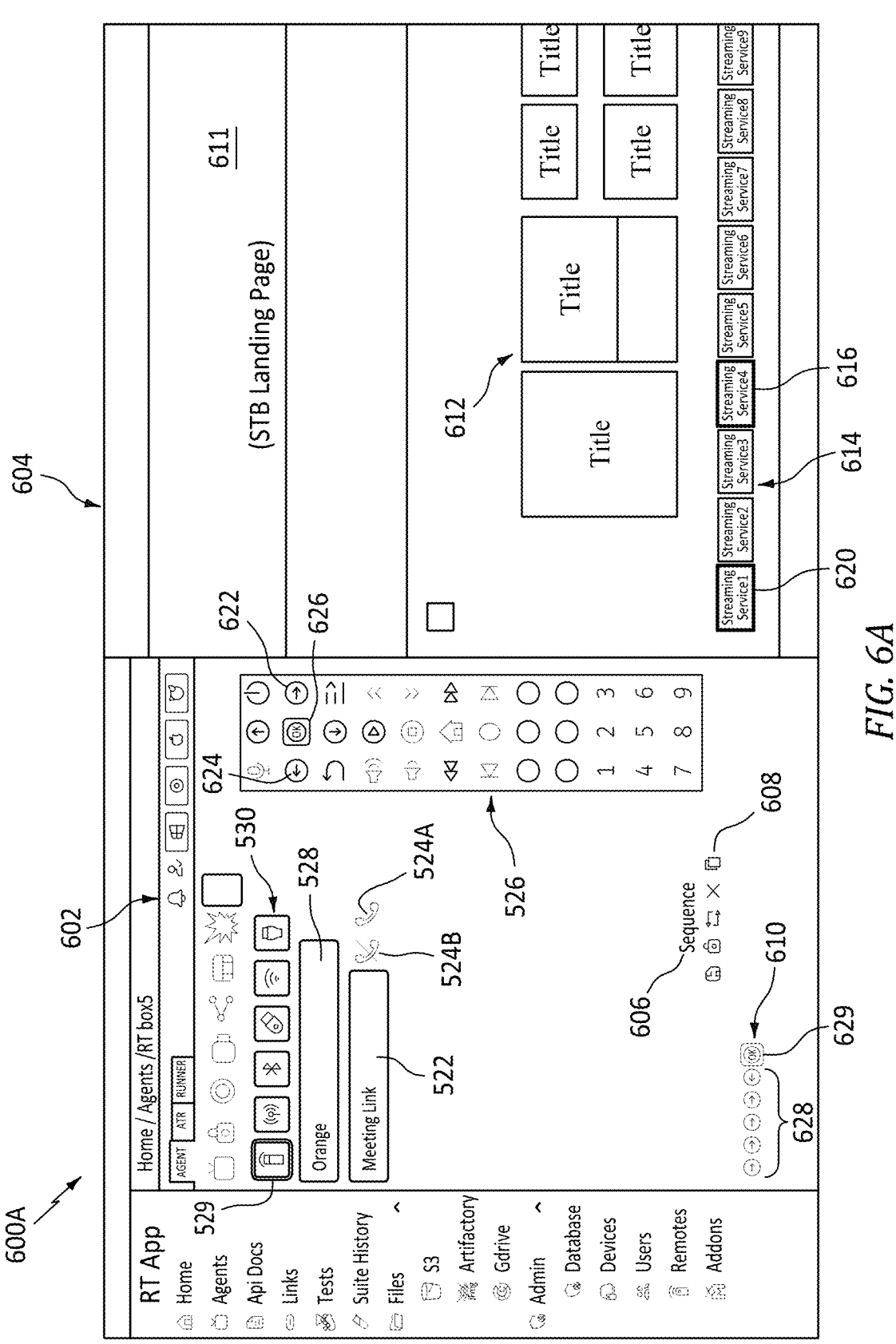
FIG. 6A is a screen illustration of a remote-control and video viewing page for the RT App user interface, in accordance with embodiments of the present disclosure.

Referring to FIG. 6A, a screen illustration is shown of a remote-control and video viewing page 600A of the user interface for the RT App 16 for the selected RT box, in accordance with embodiments of the present disclosure. In particular, on the left side or portion 602 (or remote-control portion or RT box remote control portion) of the selected remote-control and video viewing page 600A shows the RT box remote-control functions and some information about the STB box, e.g., make, communication type, and the like (as shown in FIG. 5C). The right side or portion 604 of the remote-control and video viewing page 600A shows the STB output signal (or "scraped" video signal) received from the STB via the selected Agent box, showing a landing page 611 for the STB and showing various content titles 612 and streaming service options 614. The screen portions 602, 604 may be separate portions of a common web page or UI or they may be separate windows on the display screen of the user device, which can be individually moved, arranged, or manipulated by the user.

The remote-control portion 602 of the page 600A may include a sequence section 606 which has a section 610 showing the sequence history of the remote-control buttons pressed by the user. It also provides various selectable thumbnail icon images to perform certain functions with the sequence history 610, such as Save 608A, Lock 608B, Repeat 608C, Cancel 608D, and Copy 608E.

In the example of FIG. 6A, the beginning cursor selection position for the STB landing page was at image 620 for Streaming Service 1. The user clicked the right arrow 622 remote-control command four times and then the left arrow 624 remote-control command one time, which brought the selection to image 616 for Streaming Service 4. Then, the user clicked the OK button 626 remote-control command, which launched Streaming Service 4 (see FIG. 6B). This sequence history is shown in the section 610 as a group of arrows 628 and the OK image 630, respectively.

Figure 6B:
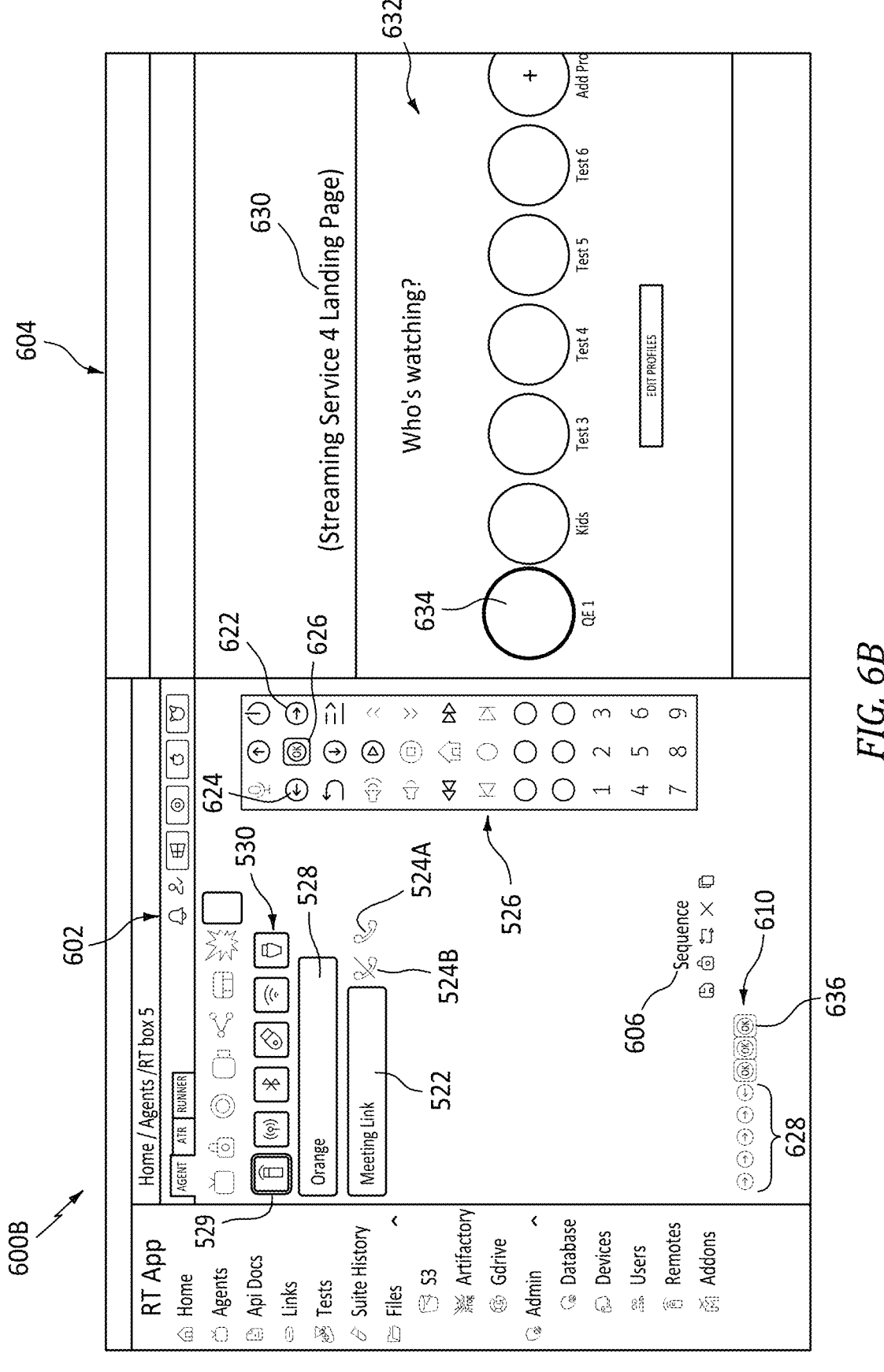
FIG. 6B is a screen illustration of a remote-control and video viewing page for the RT App user interface showing a streaming service page, in accordance with embodiments of the present disclosure.

Referring to FIG. 6B, a screen illustration is shown of the remote-control and video viewing page 600B similar to that of FIG. 6A, showing a streaming service page 630, in accordance with embodiments of the present disclosure. The page 600B includes remote command sequence information 610 in the left portion 602 of the screen and showing scraped video from the STB associated with the selected Agent (or RT box) in the right portion (or window) 604 of the display screen and showing the streaming service landing page 630 having a profile/user selection portion 632 for the selected streaming service provider (e.g., Streaming Service 1).

Figure 6C:
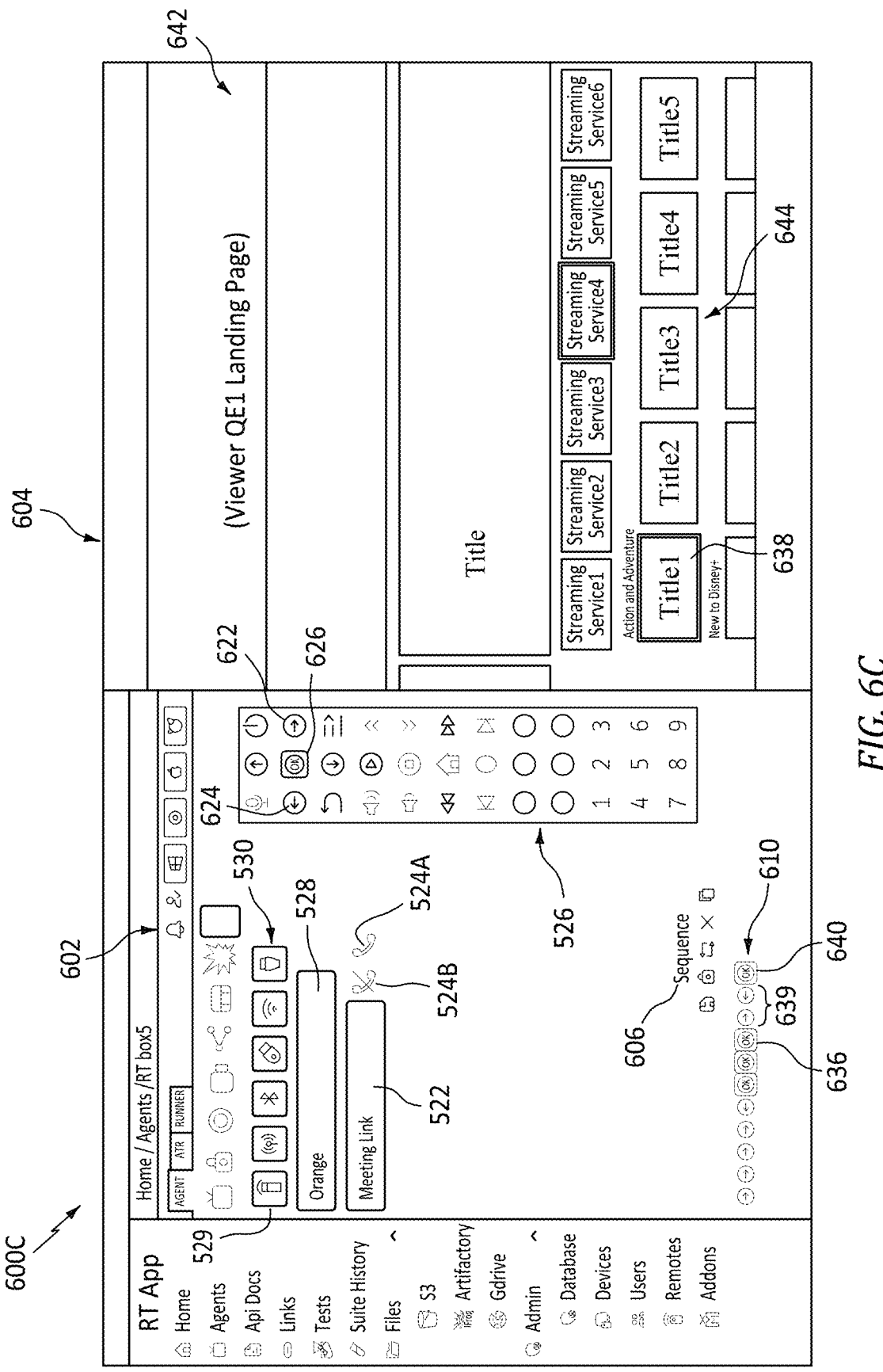
FIG. 6C is a screen illustration of a remote-control and video viewing page for the RT App user interface showing a viewer landing page, in accordance with embodiments of the present disclosure.

Referring to FIG. 6C, a screen illustration is shown of a remote-control and video viewing page 6000, similar to that of FIG. 6B, showing a viewer landing page 642, in accordance with embodiments of the present disclosure. The page 6000 includes remote command sequence information 610 in the left portion 602 of the display screen, and scraped video from the STB associated with the selected Agent (or RT box) in the right portion (or window) 604 of the display screen and showing the landing page 642 for a selected user, e.g., user QE1, and showing various content options (shown as "Titles") for the selected streaming service.

Figure 6D:
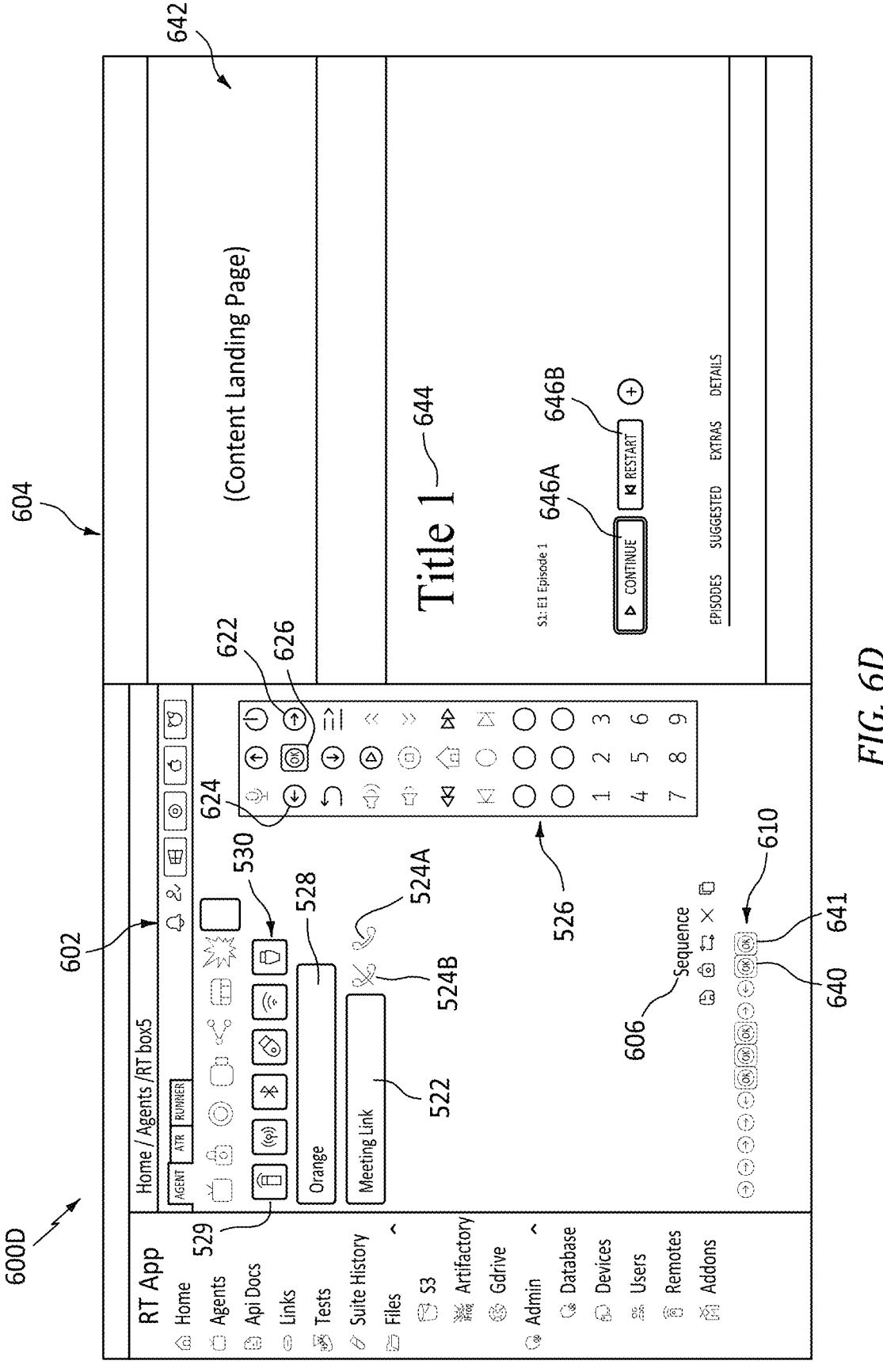
FIG. 6D is a screen illustration of a remote-control and video viewing page for the RT App user interface showing a selected content landing page, in accordance with embodiments of the present disclosure.

Referring to FIG. 6D, a screen illustration is shown of a remote-control and video viewing page 600D, showing a selected content landing page 642, in accordance with embodiments of the present disclosure. The page 600D includes remote command sequence information 610 in the left portion 602 of the display screen, and scraped video from the STB associated with the selected Agent (or RT box) in the right portion 604 of the display screen and showing the content landing page 642 for a given viewer (e.g., QE1), and showing various content options (shown as "Titles") 644 for the selected streaming service. When the user clicks on the Continue button, the content (Title 1) 644 begins playback of the content, as shown in FIG. 6E.

Figure 6E:
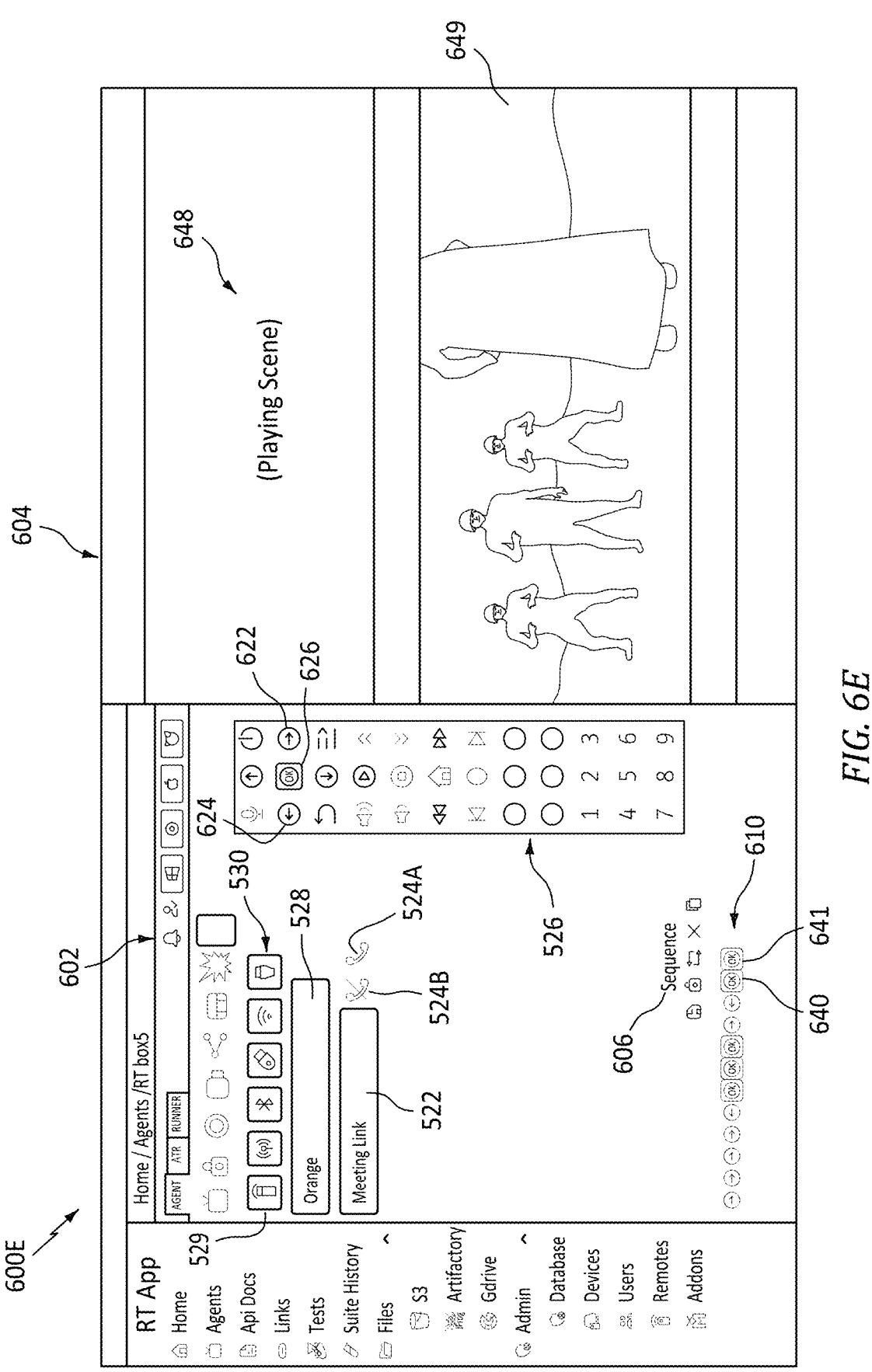
FIG. 6E is a screen illustration of a remote-control and video viewing page for the RT App user interface showing a content scene page, in accordance with embodiments of the present disclosure.

Referring to FIG. 6E, a screen illustration is shown of a remote-control and video viewing page 600E, showing a content scene page 648, in accordance with embodiments of the present disclosure. The page 600E includes remote command sequence information 610 in the left portion 602 of the display screen, and scraped video from the STB associated with the selected Agent (or RT box) in the right portion 604 of the display screen and showing the content scene page 648 having screen shot 649 of playback of the selected content/show (Title 1) 644.

Figure 7A:
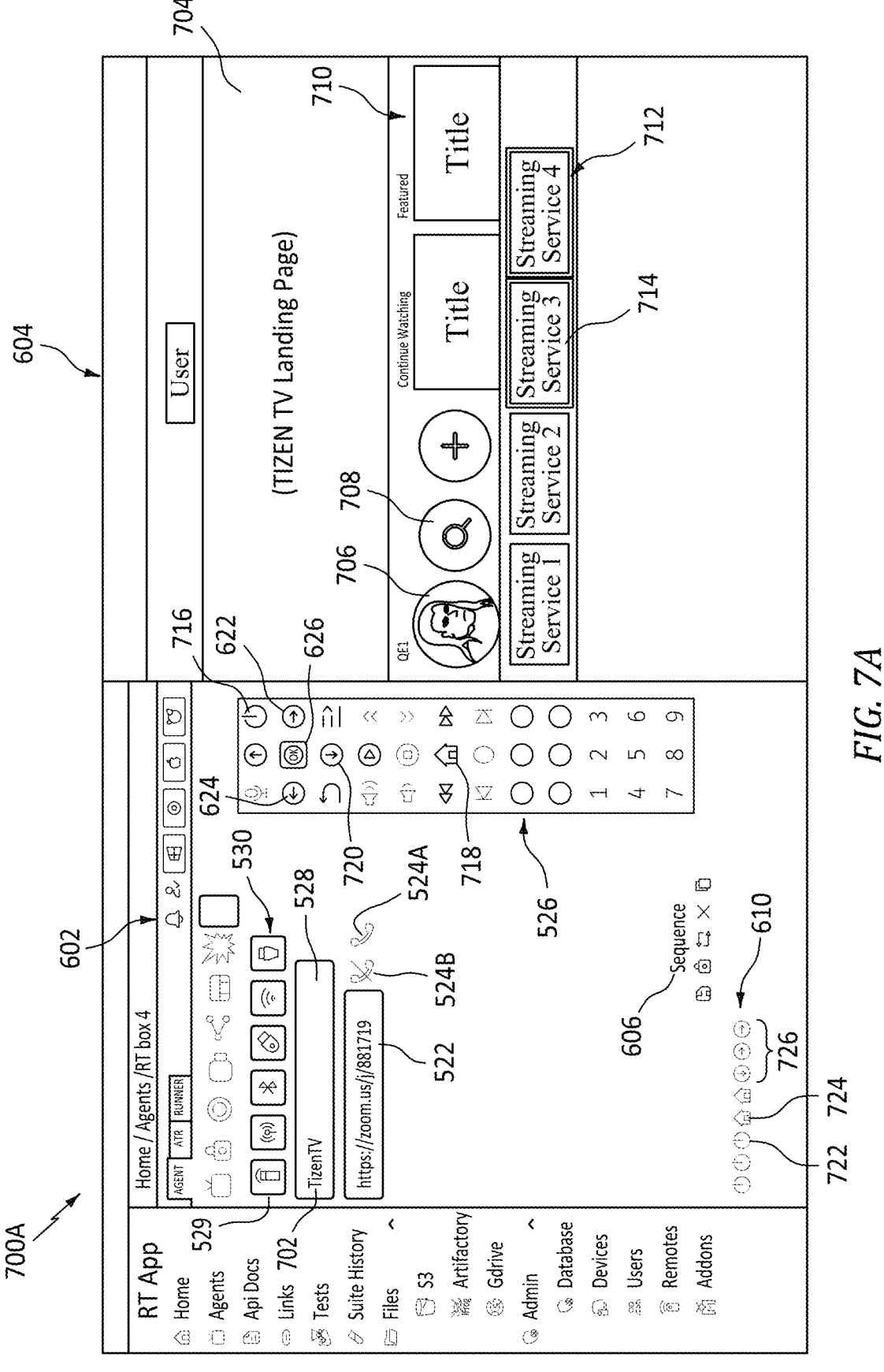
FIG. 7A is a screen illustration of a remote-control and video viewing page for the RT App user interface showing direct control of a smart TV, in accordance with embodiments of the present disclosure.

Referring to FIG. 7A, a screen illustration is shown of a remote-control and video viewing page 700A, showing direct control of a smart TV (e.g., Tizen TV) by the RT box, in accordance with embodiments of the present disclosure. The page 700A includes remote command sequence information 710 in the left portion 602 of the display screen, and scraped video from the smart TV (e.g., Tizen TV) associated with the selected Agent (or RT box) in the right portion 604 of the display screen and showing a screen shot of a landing page 704 for the smart TV showing the selected viewer/user 706 of the TV, a search feature 706, content 710 associated with the viewer/user 706, and various streaming service options 712.

In this example, the user has navigated to Streaming Service 3 shown by a box 714. In particular, the user has clicked on the power button 716 on the remote-control 526, then clicked on the home button 718, and then navigated down 720 and to the right 622 to reach Streaming Service 3 on the smart TV, e.g., Tizen TV. This sequence of commands is also displayed in the sequence section 610, as shown by the power button icon 722, home icon 724, and left/right icons 726. In this case, the power button 716 was hit three times and the home button 718 was hit two times by the user.

Figure 7B:
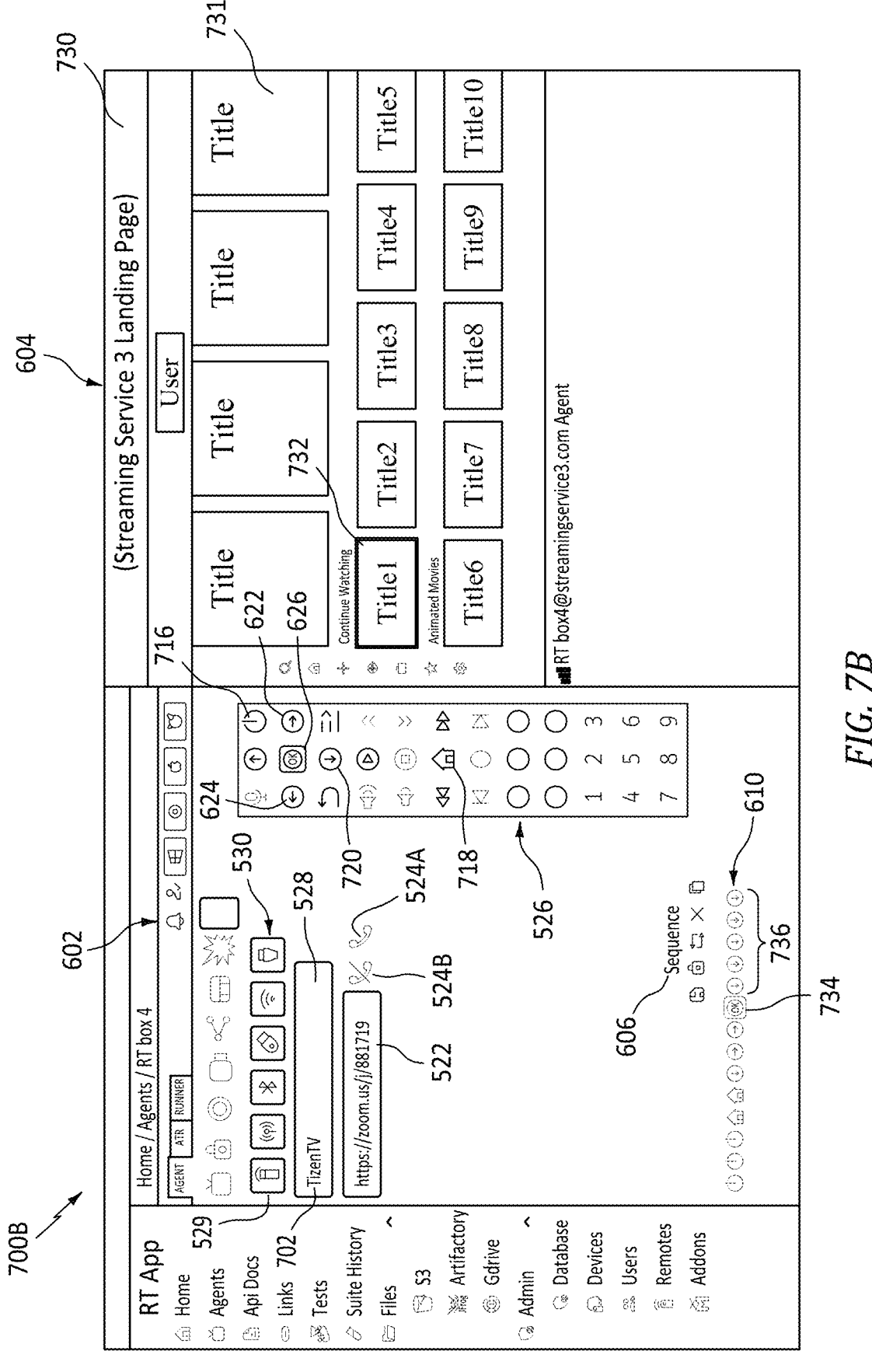
FIG. 7B is a screen illustration of a remote-control and video viewing page for the RT App user interface showing a streaming service landing page from a smart TV, in accordance with embodiments of the present disclosure.

Referring to FIG. 7B, a screen illustration is shown of a remote-control and video viewing page 700B, similar to that of FIG. 7A, showing a streaming service landing page 730, in accordance with embodiments of the present disclosure. The page 700B includes remote command sequence information 610 in the left portion 602 of the display screen, and scraped video from the smart TV (e.g., Tizen TV) associated with the selected Agent (or RT box) in the right portion 604 of the display screen and showing a screen shot of the streaming service landing page 730 for the selected streaming service (e.g., Streaming Service 3) for smart TV showing various content titles 731 and a selected content title 731 (Title1) selected by the user.

In this example, the user has launched Streaming Service 3 by clicking the OK button 626 on the remote-control display portion (or window or section) 526. Next, the user has clicked on the down arrow 720 several times to navigate the screen cursor to Title1 732. This sequence of commands is also displayed in the sequence section 610, as shown by the OK button icon 734 and down arrow icons 736.

Figure 7C:
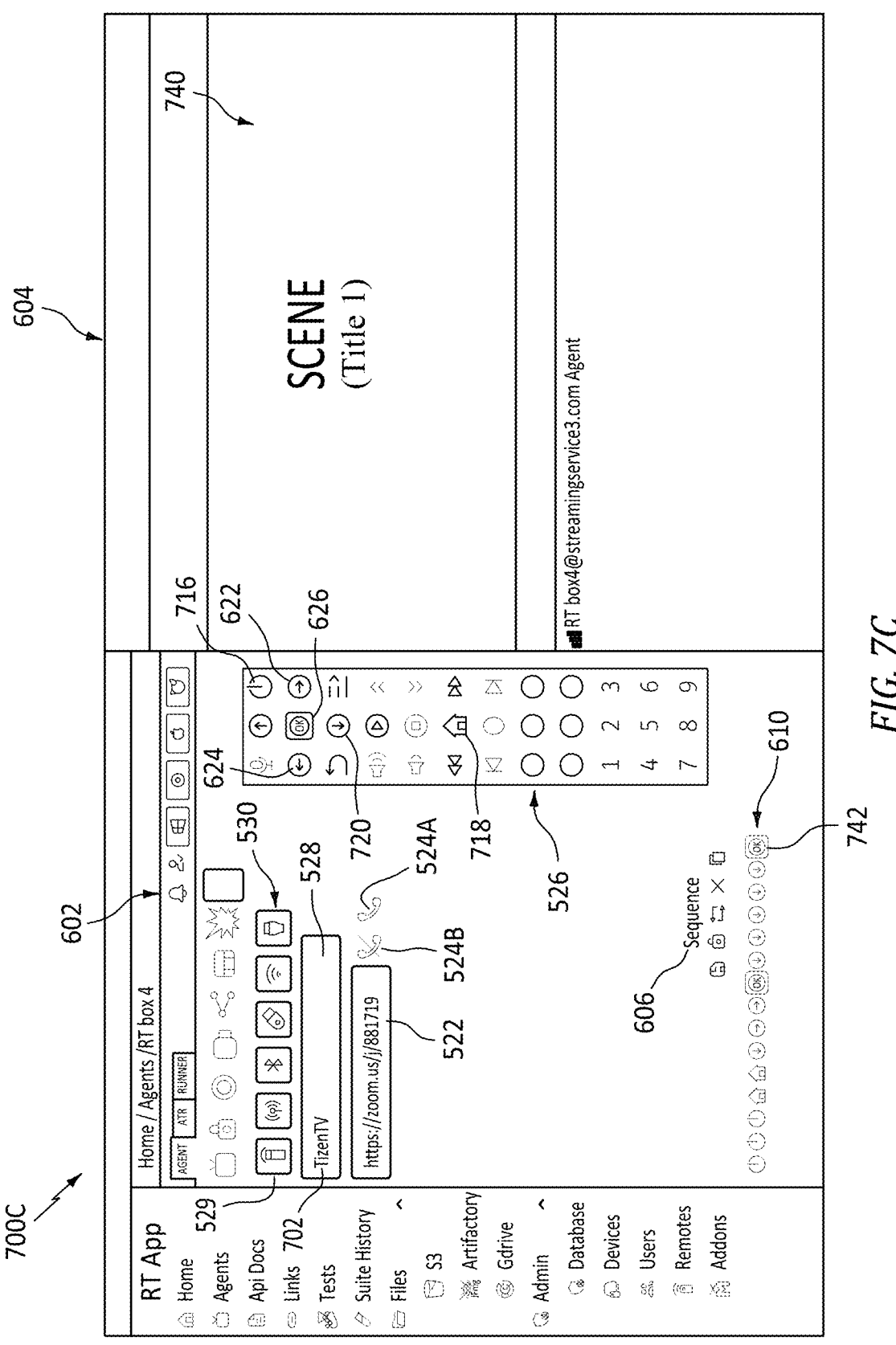
FIG. 7C is a screen illustration of a remote-control and video viewing page for the RT App user interface showing playback of a scene of a selected content directly from a smart TV, in accordance with embodiments of the present disclosure.

Referring to FIG. 7C, a screen illustration is shown of a remote-control and video viewing page 7000, similar to that of FIG. 7B, showing playback of a scene 740 of a selected content directly from a smart TV, in accordance with embodiments of the present disclosure. The page 7000 includes remote command sequence information 610 in the left portion 602 of the display screen, and scraped video from the smart TV (e.g., Tizen TV) associated with the selected Agent (or RT box) in the right portion 604 of the display screen and showing a screen shot of the playback of a scene 740 of a selected content directly from the smart TV.

In this example, the user has launched playback of content Title1 by clicking the OK button 626 on the remote-control 526. This is also displayed in the sequence section 610, as shown by the OK button icon 742.

Figure 7D:
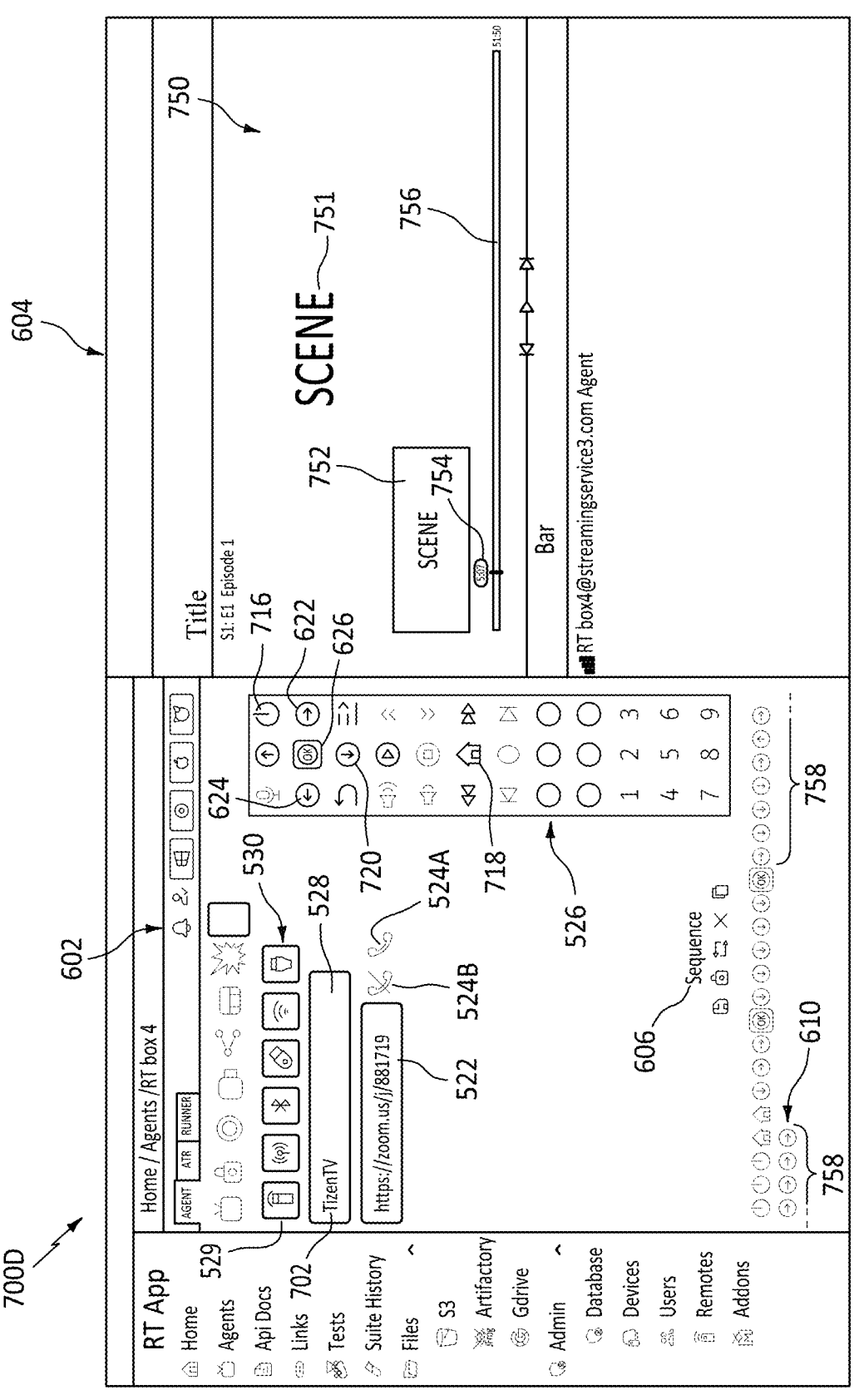
FIG. 7D is a screen illustration of a remote-control and video viewing page for the RT App user interface showing the ability to seek throughout the content asset in realtime and continue playback from a smart TV, in accordance with embodiments of the present disclosure.

Referring to FIG. 7D, a screen illustration is shown of a remote-control and video viewing page 700D, similar to that of FIG. 7C, showing the ability to seek throughout the content asset in realtime and continue playback from a smart TV, in accordance with embodiments of the present disclosure. The page 700D includes remote command sequence information 610 in the left portion 602 of the display screen, and scraped video from the smart TV (e.g., Tizen TV) associated with the selected Agent (or RT box) in the right portion 604 of the display screen. It also shows a screenshot of a scene 751 from the selected content with a thumbnail image 752 of another scene from another time in the selected content with its corresponding time stamp 754 indicated along a timeline 756, which may be shown when seeking through the selected content (or asset). Seeking may be performed by clicking on the directional (up, down, left, right) arrows on the remote control 526. This is also displayed in the sequence section 610, as shown by a series of up, down, left, right arrow icons 758. This example shows how a user can seek through an asset in real-time and then continue playback.

Figure 7E:
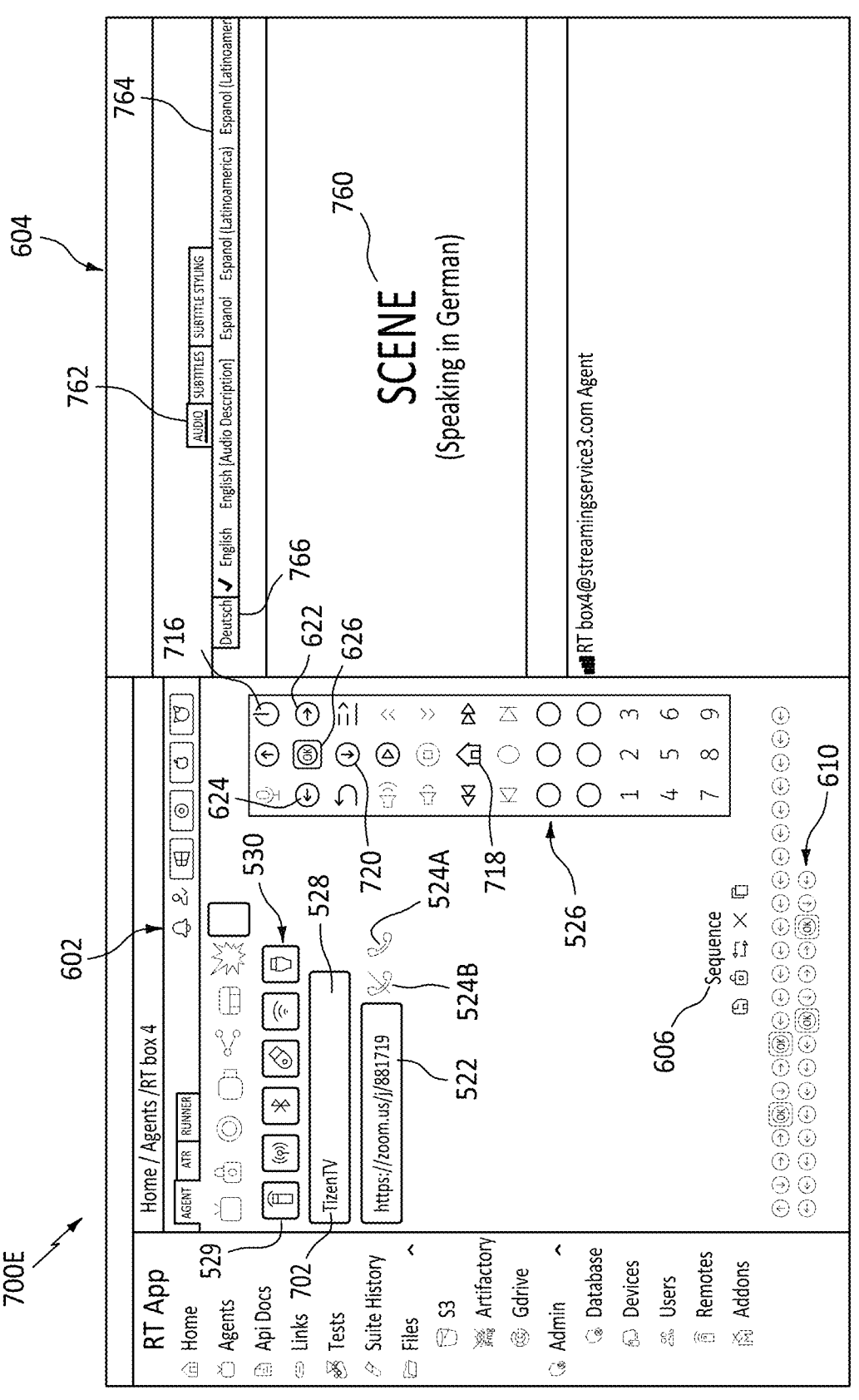
FIG. 7E is a screen illustration of a remote-control and video viewing page for the RT App user interface showing the ability to switch the audio language to another language from a smart TV, in accordance with embodiments of the present disclosure.

Referring to FIG. 7E, a screen illustration is shown of a remote-control and video viewing page 700E, similar to that of FIG. 7C, showing the ability to switch the audio language to another language, e.g., to German, in accordance with embodiments of the present disclosure. The page 700E includes remote command sequence information 610 in the left portion 602 of the display screen, and scraped video from the smart TV (e.g., Tizen TV) associated with the selected Agent (or RT box) in the right portion 604 of the display screen and shows a screenshot of a scene 760 from the selected content. In this case, the user may navigate to an upper tap 762 to select Audio options which displays a list of languages 764. The user can then navigate to the desired audio language 766, e.g., Deutsch (German), and select the desired language using the directional arrow remote commands. This is also displayed in the sequence section 610, as shown by a series of up, down, left, right arrow icons 758.

Figure 8A:
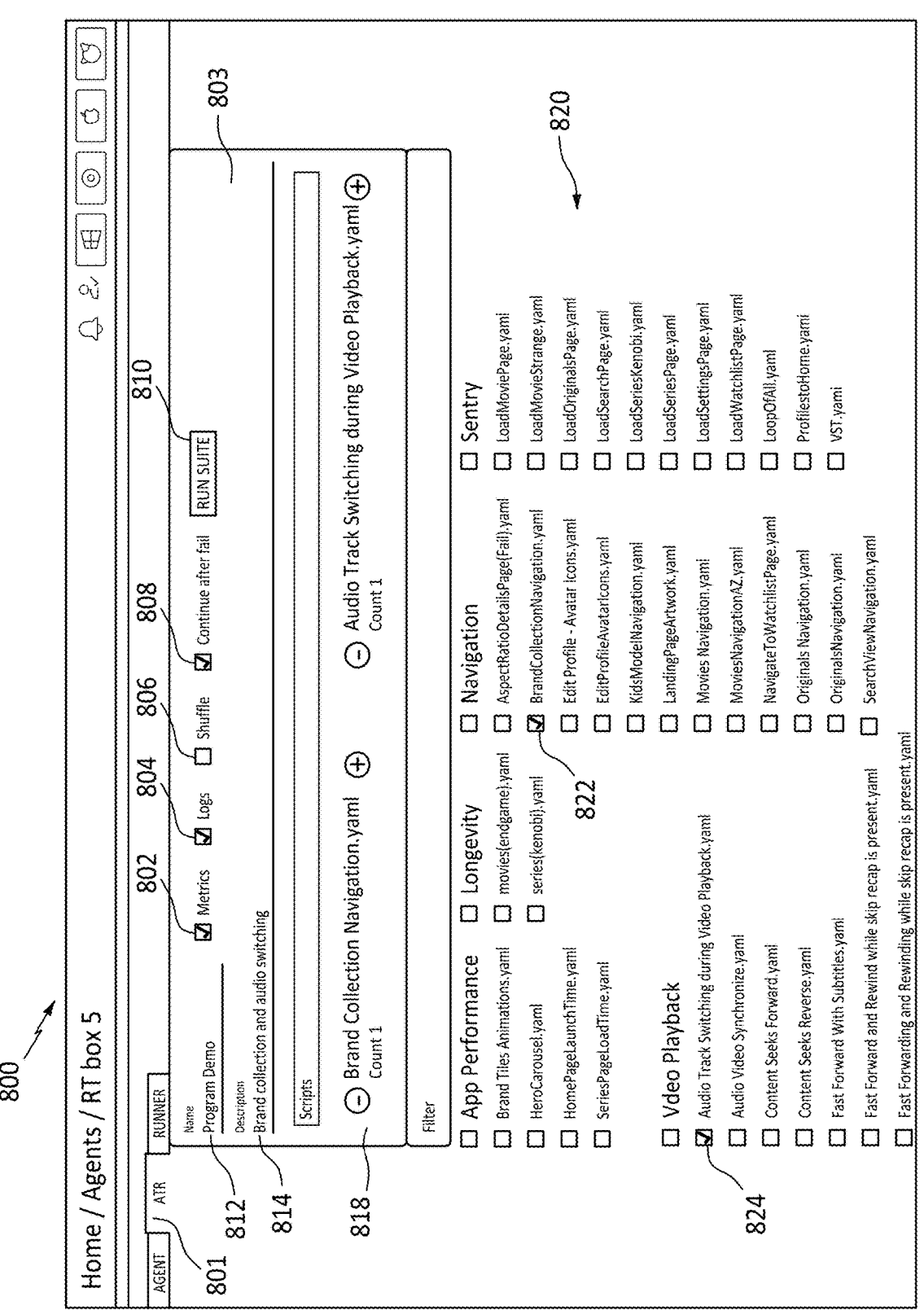
FIG. 8A is a screen illustration of an Automated Test Runner (or ATR) Logic, in accordance with embodiments of the present disclosure.

Referring to FIG. 8A, a screen illustration is shown of a landing page 800 for an Automated Test Runner (or ATR) logic or software application, showing a header 803 having fillable fields and options, and selectable tests, which can be bundled together into a testing suite or group, in accordance with embodiments of the present disclosure. The page 800 is displayed when an ATR tab 801 is selected by the user. The lower portion of the display shows listing 820 of pre-created scripted tests cover categories, such as App Performance, Longevity, Navigation, Sentry, and Video Playback. Other tests may be used or created and added to the selectable test library if desired. In some embodiments, the user may create a custom suite based on what scripts the user wants to run.

The header 803 has fillable fields for Name (or Suite Name) 812 and Description 814, has check boxes to collect Metrics 802, to collect Logs 804, to Shuffle tests 806, to Continue test after fail 808, and a selectable Run Suite button 810, which launches the suite of tests. There is also a "Scripts" section 818, that lists all the tests selected in the scripted test listing section 820, with a + and – sign on each side of each scripted test selected for this test suite. In this case, the checkboxes who tests Brand_Collection_Navigation.yaml 822 and the Audio_Track_Switching_During_Video_Playback.yaml 824 were selected, and appear in the scripts section 818.

Figure 8B:
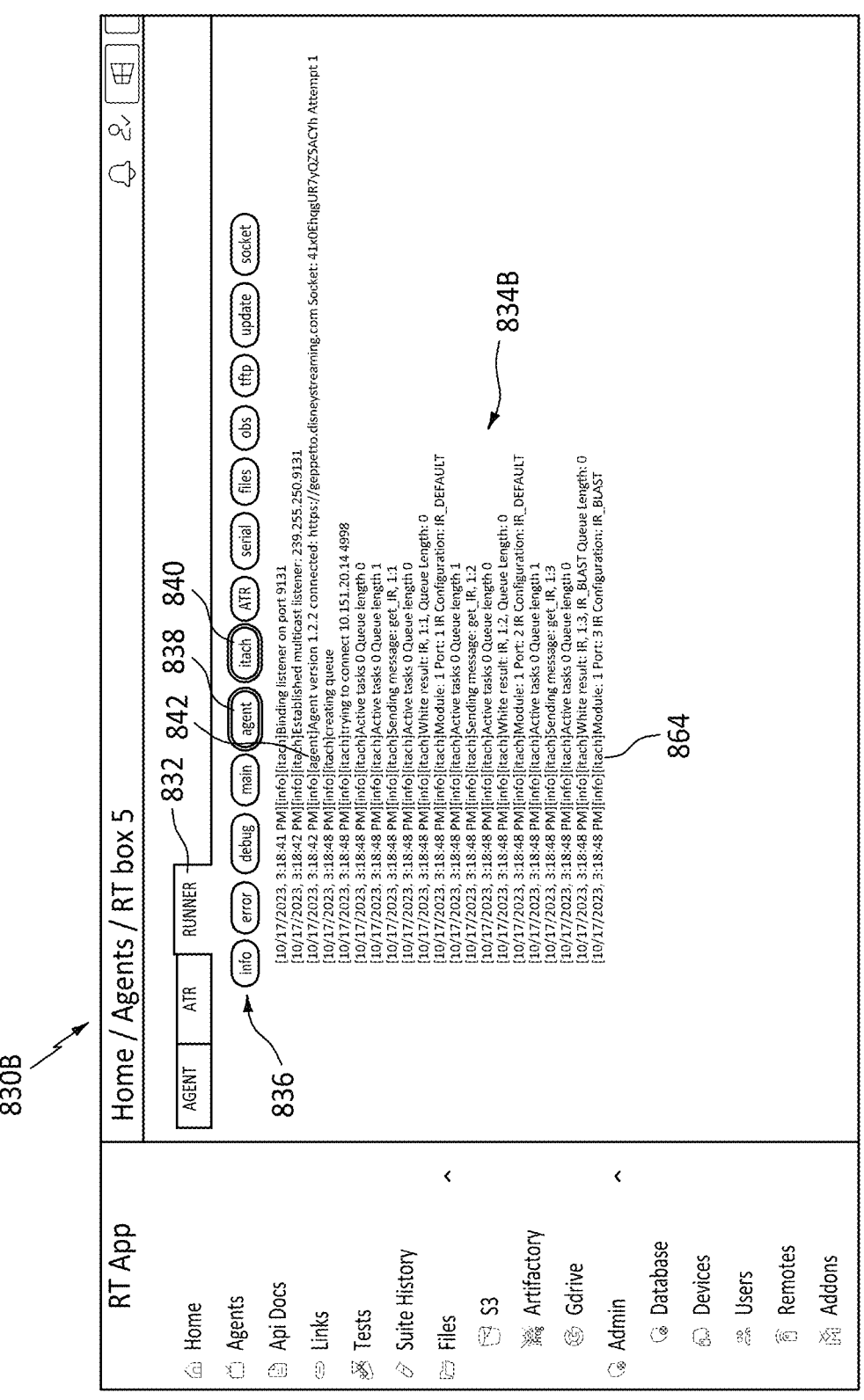

Referring to FIGS. 8B and 8C, screen illustrations are shown of "Runner" log landing pages 830B, 830C, respectively, in accordance with embodiments of the present disclosure. The page 830A,830B is displayed when a Runner tab 832 is selected by the user and shows a running log 834B, 830C, respectively, a running log of various commands being executed by various modules or logics of the system of the present disclosure during an automated test.

There are a series of filter buttons 840 across the top of the landing page 830B,830C, which allow the user to filter the log to show certain type of events or commands. The filter buttons include: info, error, debug, main, agent, itach, ATR, serial, files, obs, tftp, update, socket. Other filters may be used if desired.

In particular, the page 830B (FIG. 8B) shows the agent 838 and filter 840 filters selected, and the log listing 834B shows the log events associated with only those events. In particular, in FIG. 8B, an "[agent]" event is shown on a line 842, and an "[itach]" event is shown on a line 844. Also, the page 830C (FIG. 8C) shows the ATR 836 and serial 838 filters selected, and the log listing 834C shows the log events associated with only those events. In particular, in FIG. 8C, a "[ATR]" event is shown on a line 846, and an "[serial]" event is shown on a line 848.

Figure 8D:
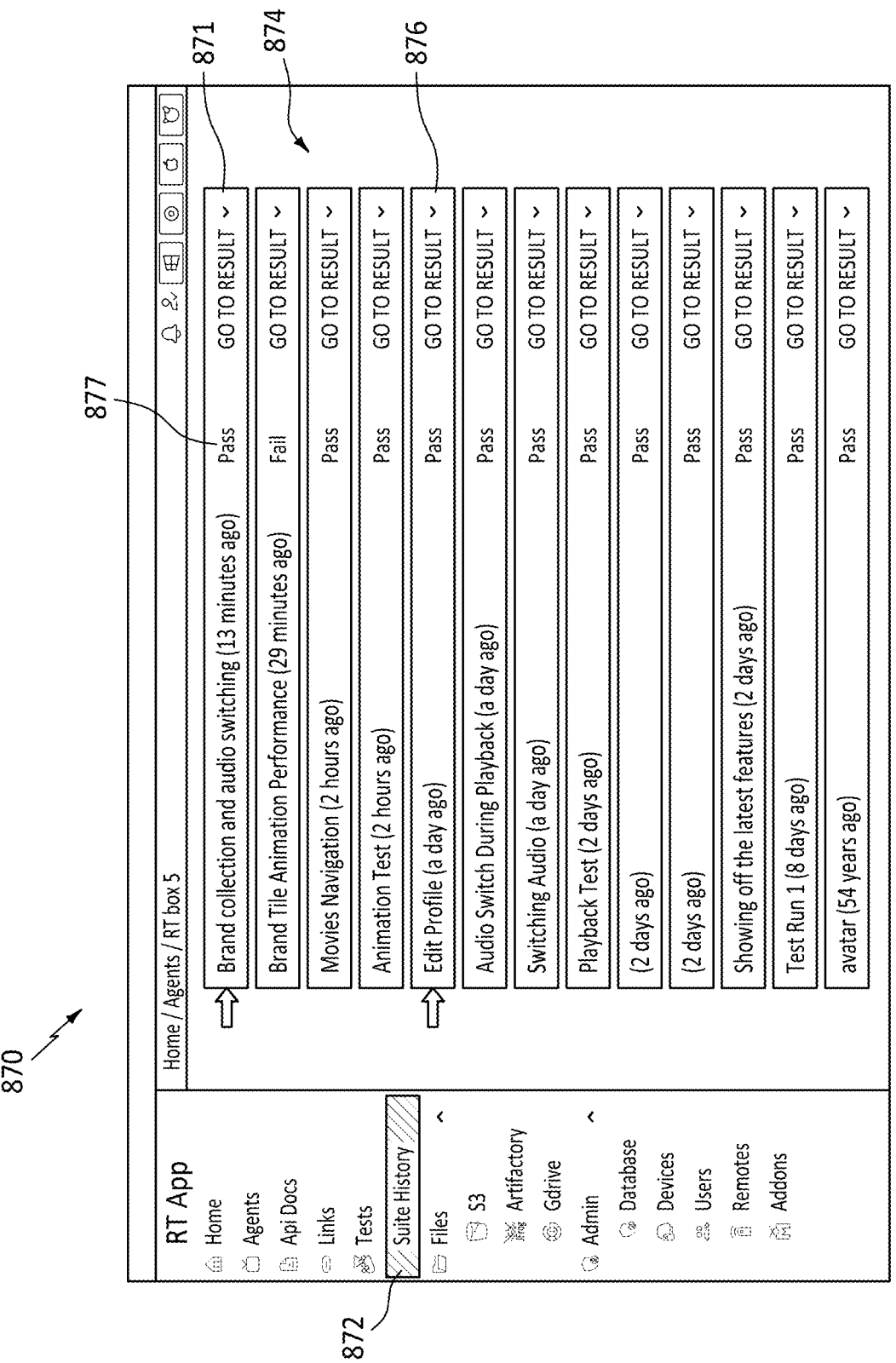
FIG. 8D is a screen illustration of a suite history listing page, in accordance with embodiments of the present disclosure.

Referring to FIG. 8D, a screen illustration is shown of a suite history listing page 870, which shows a listing 874 of results for all the suit tests stored for the selected RT box, and which is displayed when the user selects the Suite History tab file 872, in accordance with embodiments of the present disclosure. When the user selects the "GO TO RESULT" link for the test suite entitled "Brand collection and audio switching" 871, the RT App displays the results stored for that test, as discussed in FIG. 8E. The listing 874 of results for suit tests may also provide an overall Pass/Fail indication 877 for each test suite. Whether a given test has passed or failed may be determined by the test criteria specified for a given test name, such as that shown in the pass/fail test criteria table 890 shown in FIG. 8G.

Figure 8E:
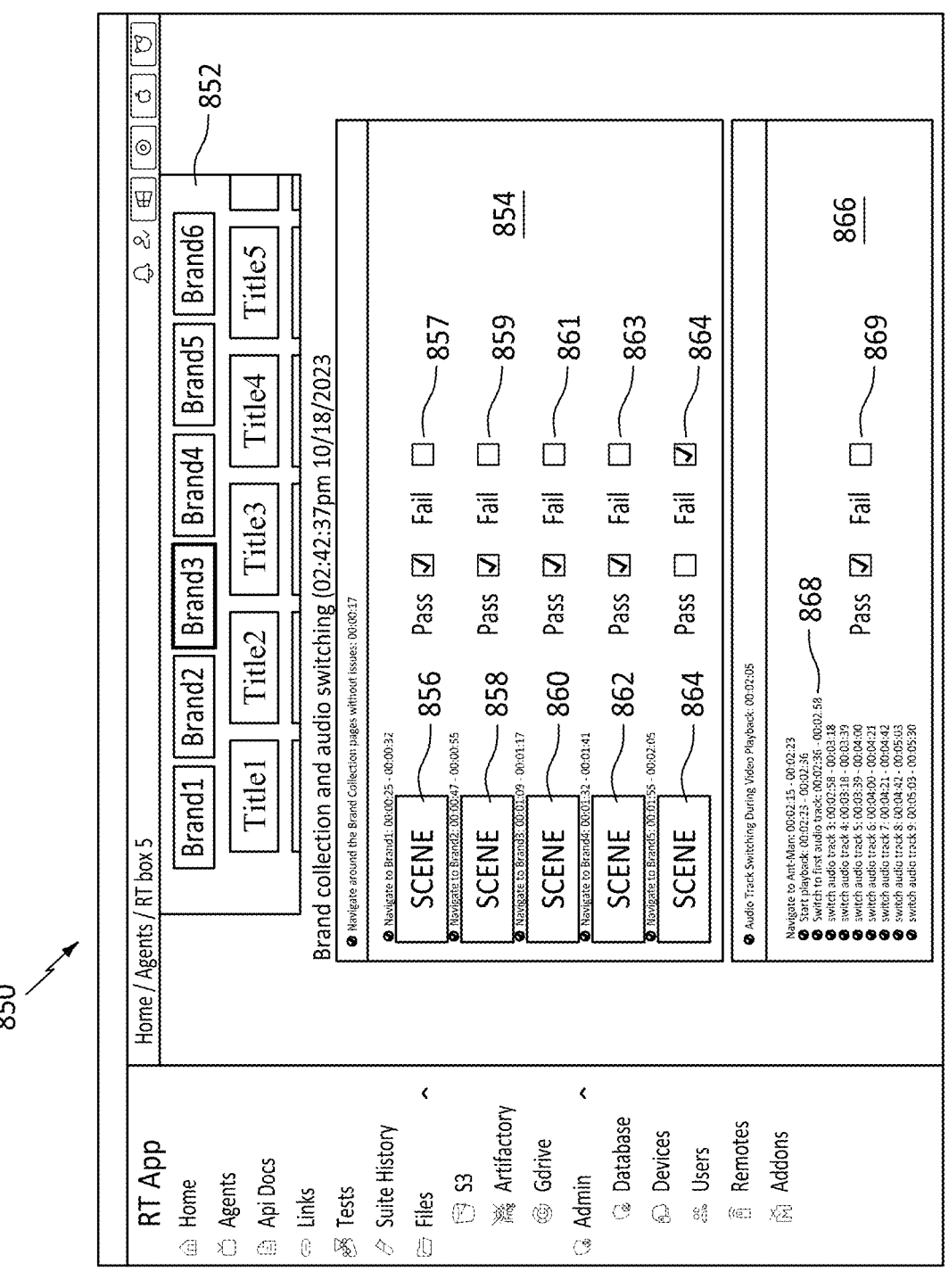
FIG. 8E is a screen illustration of a test results page, in accordance with embodiments of the present disclosure.

Referring to FIG. 8E, a screen illustration is shown of test results page 850, having two sections, an upper section 854 for a first test (Brand collection and audio switching), and a lower section 866 for a second test (Audio Track Switching During Playback Video), in accordance with embodiments of the present disclosure. The listing shows all tests and actions of the suite run, including screenshots taken during the test. A user can watch a recording of the entire suite test run by clicking on the corresponding link 853, and the test results 854 may be shown broken up by test video or video thumbnail image 856,858,860,864, e.g., for the Band Collection test, and allows the user watch specific tests and actions for validation or verification. A user can also see the pass/fail results of a given test, as shown by the pass/fail indicators 857,859,861,863,864, corresponding to each of the scenes 856, 858, 860, 862, 864. A similar set up is provided for the second test 866, e.g., Audio Track Switching During Video Playback, which may be broken up by audio clips 868. A user can also see the pass/fail results of a given test, as shown by the pass/fail indicators 869, corresponding to each of the scenes the group of tests 868.

Figure 8F:
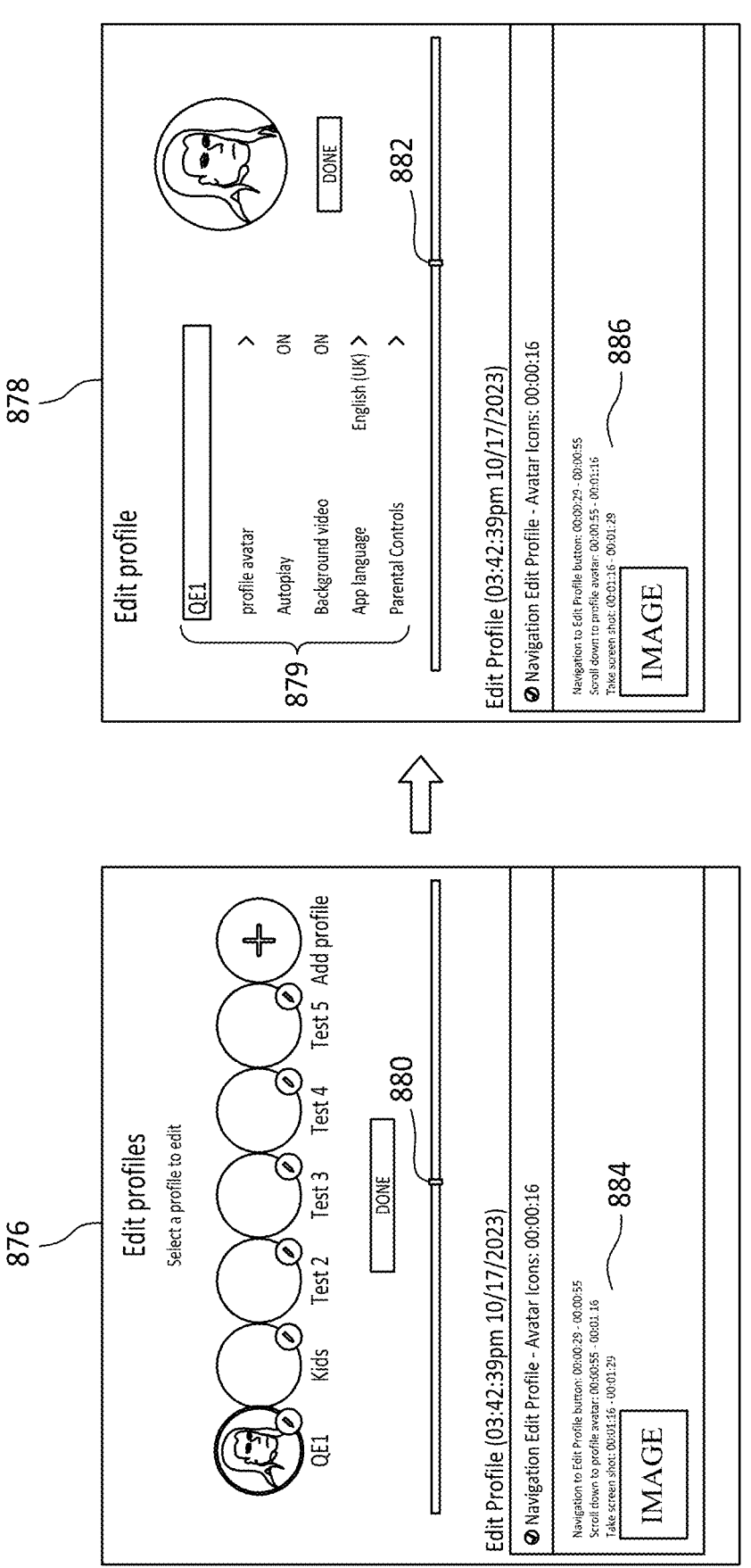
FIG. 8F is a screen illustration of results from an "Edit Profiles" test in a test suite run showing two screenshots from different times, in accordance with embodiments of the present disclosure.

Referring to FIG. 8F, a screen illustration is shown of results from an "Edit Profile" test in a test suite run showing two screenshots from different times, in accordance with embodiments of the present disclosure. The test results may be selected from the Suite History page 870 (FIG. 8D) by selecting the Edit Profile results 876. The Edit Profile suite run shows two screenshots 876, 878 from different times during the test run. A user can watch any portion of test run by clicking on the video position wiper. In the first screenshot 876, a person QE1 is selected to edit the profile, and a screen section 880 shows the details of the actions that were taken, e.g., navigate to edit profile, scroll down to profile avatar, take screen shot, and a corresponding thumbnail image. In the second screenshot 878, the profile of person QE1 is being edited as shown with various options 879 to select, such as name, profile avatar, autoplay, background video, app language, parental control, and DONE button for the user to select when completed. The lower screen section 882 shows the details of the actions that were taken, e.g., navigate to edit profile, scroll down to profile avatar, take screen shot, and a corresponding thumbnail image (similar to the screen 876).

Figure 9A:
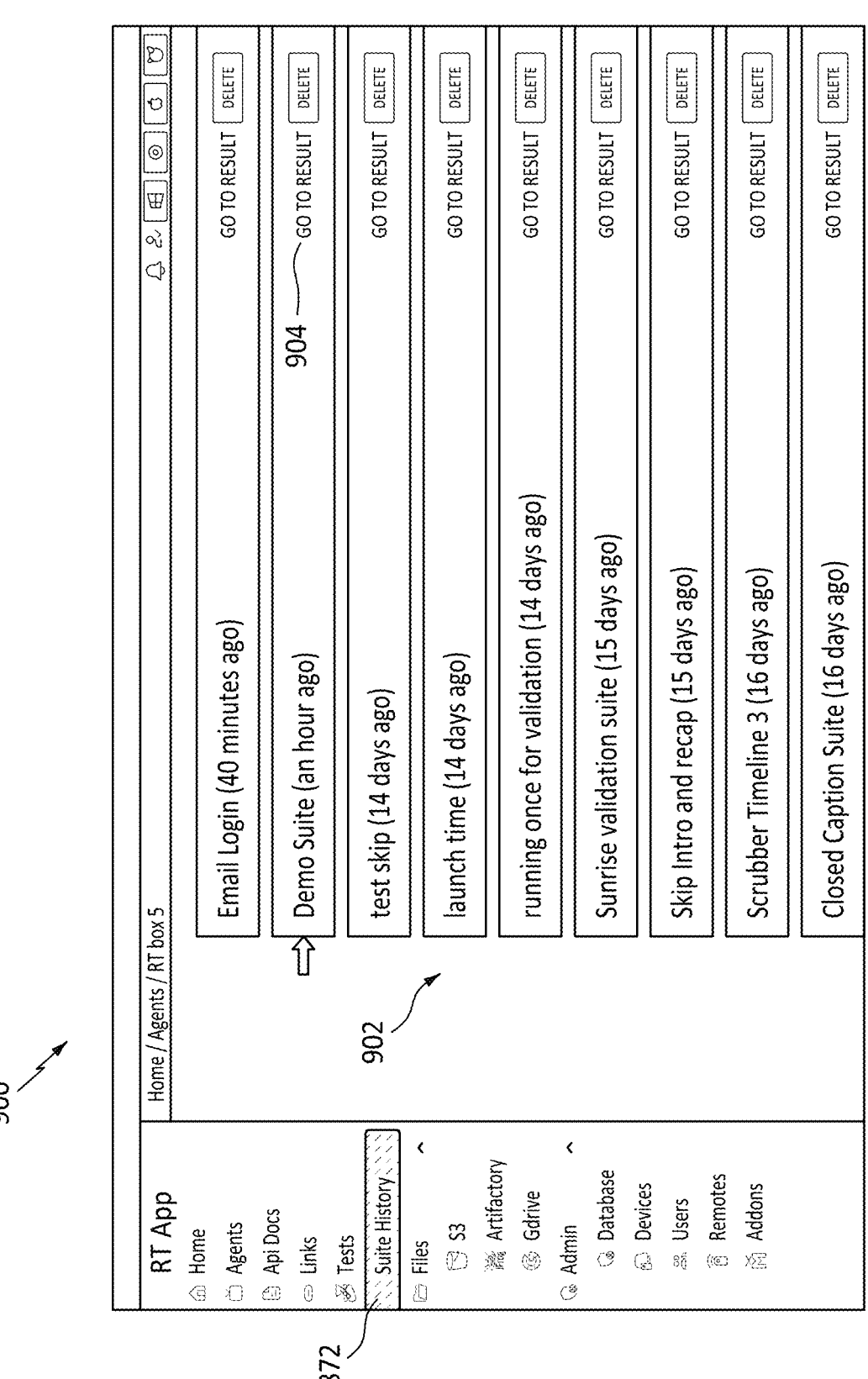
FIG. 9A is a screen illustration of a suite history page for a selected RT box when user selects suite history tab, in accordance with embodiments of the present disclosure.

Referring to FIG. 9A, a screen illustration is shown of a suite history listing page 900, which shows a listing 902 of results for all the tests stored for the selected RT box, and which is displayed when the user selects the suite history tab 872, in accordance with embodiments of the present disclosure. The page shows how post processing image (or object) validation or verification software may be used to run further testing or validation or verification on the previously obtained test results, e.g., test results for Demo Suite 904. When the user selects the "GO TO RESULT" link for the test suite entitled "Demo Suite" 904, the RT App displays the results stored for that test, as discussed in FIG. 9B. The listing 902 of results for tests may also provide an overall Pass/Fail indication (not shown) for each test. Whether a given test has passed or failed may be determined by the test criteria specified for a given test name, such as that shown in the pass/fail test criteria table 890 shown in FIG. 8G.

Figure 9B:
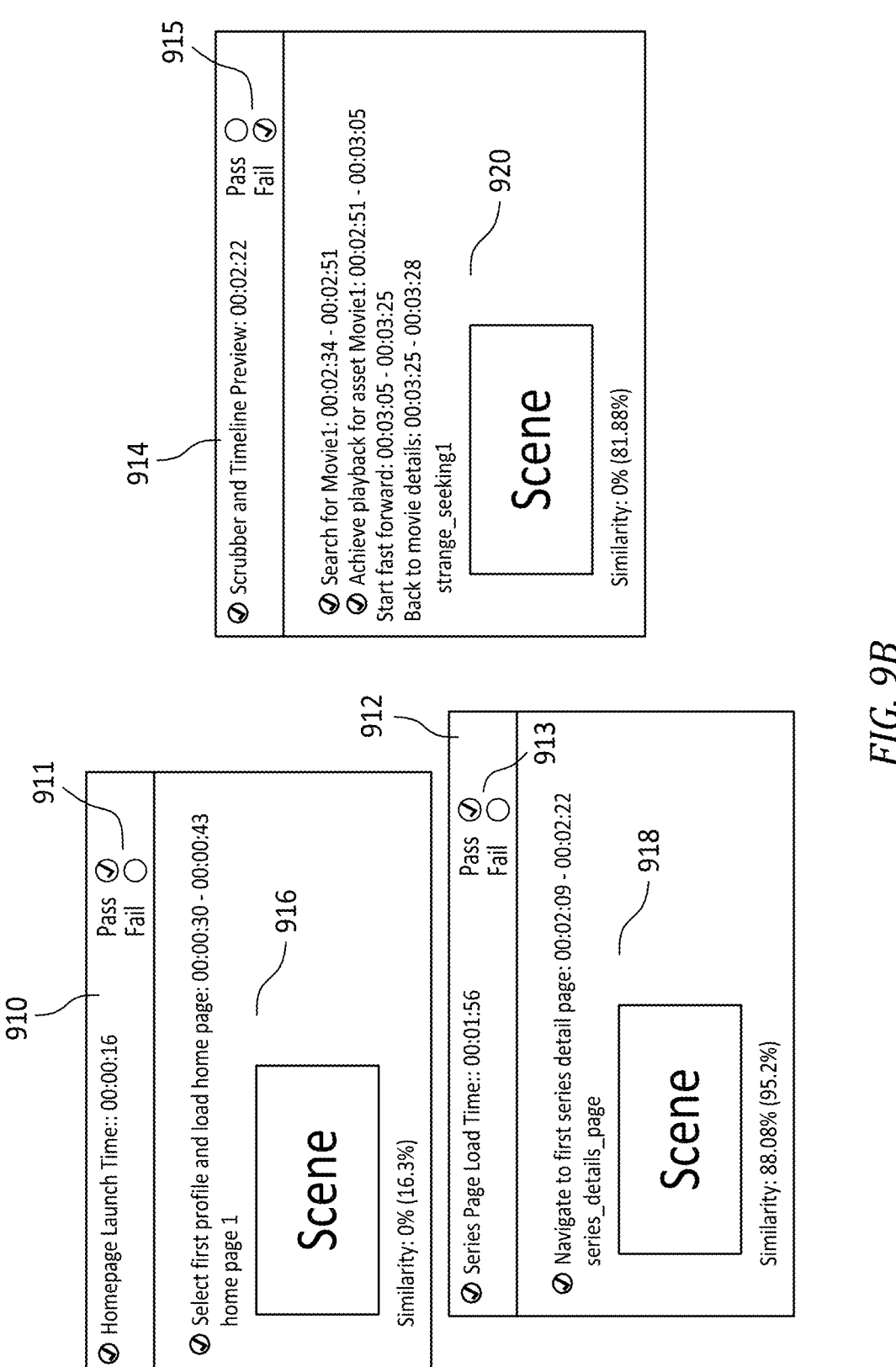
FIG. 9B is a screen illustration of three tests from "Demo Suite" test results for Image Verification Logic, in accordance with embodiments of the present disclosure.

Referring to FIG. 9B, a screen illustration is shown of three tests from "Demo Suite" 904 (FIG. 9A) test results for the Image Verification Logic and showing how Image Verification Logic may be used to run further testing or verification on the test results, in accordance with embodiments of the present disclosure. In particular, the suite consists of three tests, Homepage Launch Time 910, Series Page Load Time 912, and Scrubber and Timeline Preview 914. Each test has a summary area 916, 918, 920, respectively, which described the action taken in the test and a thumbnail screenshot for each, and a similarity percentage. Each test result panel may have an overall Pass/Fail indication 911, 913,915 for each test 910,912,914. Whether a given test has passed or failed may be determined by the test criteria specified for a given test name, such as that shown in the pass/fail test criteria table 890 shown in FIG. 8G.

Figure 9C:
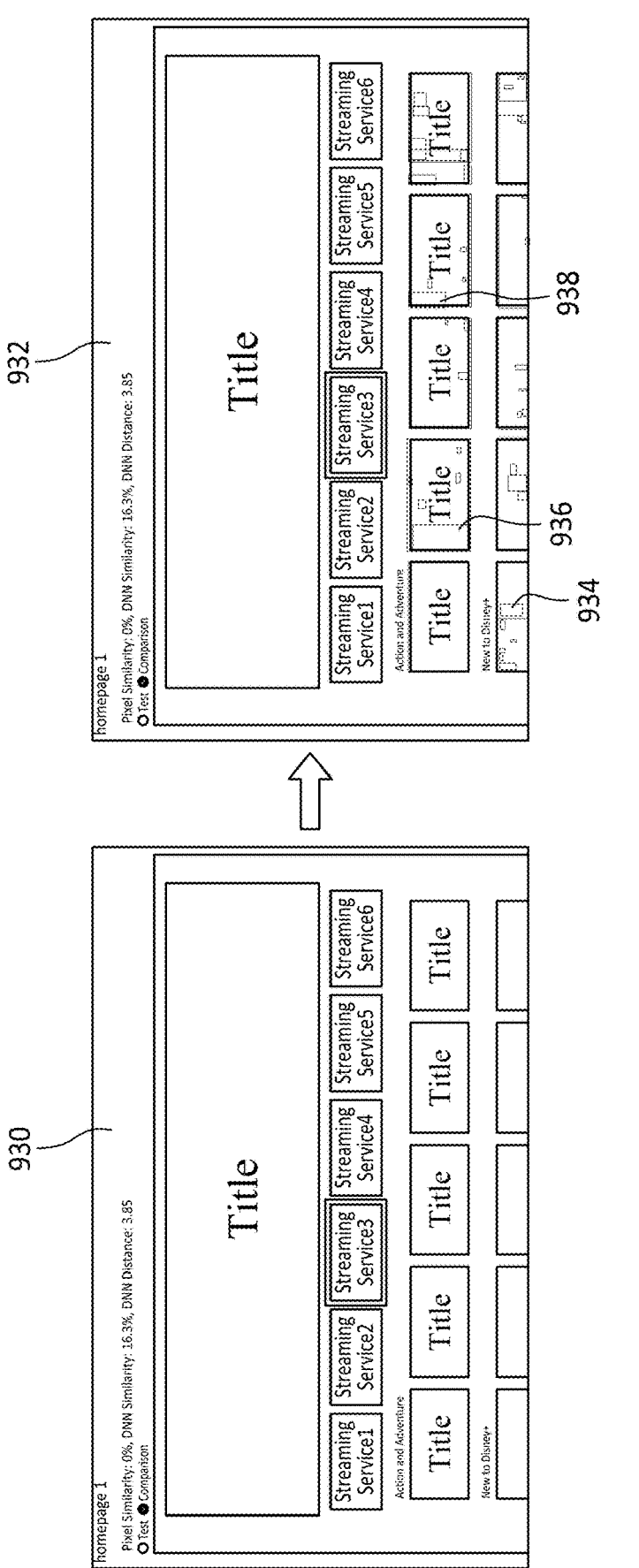
FIG. 9C is a screen illustration of a first test of FIG. 9B (Homepage Launch Time), in accordance with embodiments of the present disclosure.

Referring to FIG. 9C, a screen illustration is shown of a first test of FIG. 9B, Homepage Launch Time 910, and showing a comparison of an expected displayed homepage image (with objects) and the actual displayed homepage image, in accordance with embodiments of the present disclosure. The results provide pixel similarity, DNN similarity, and DNN distance between the two displayed images, and showing where the differences are located. In particular, the left side image 930 is the image received during the original test, and the right side image 932 is the stored expected image. The lines 934, 936, 938 show where the differences are between the two images 930,932 and the pixel similarity is 0%, DNN similarity is 16.3%, and the DNN distance is 3.85.

Figure 9D:
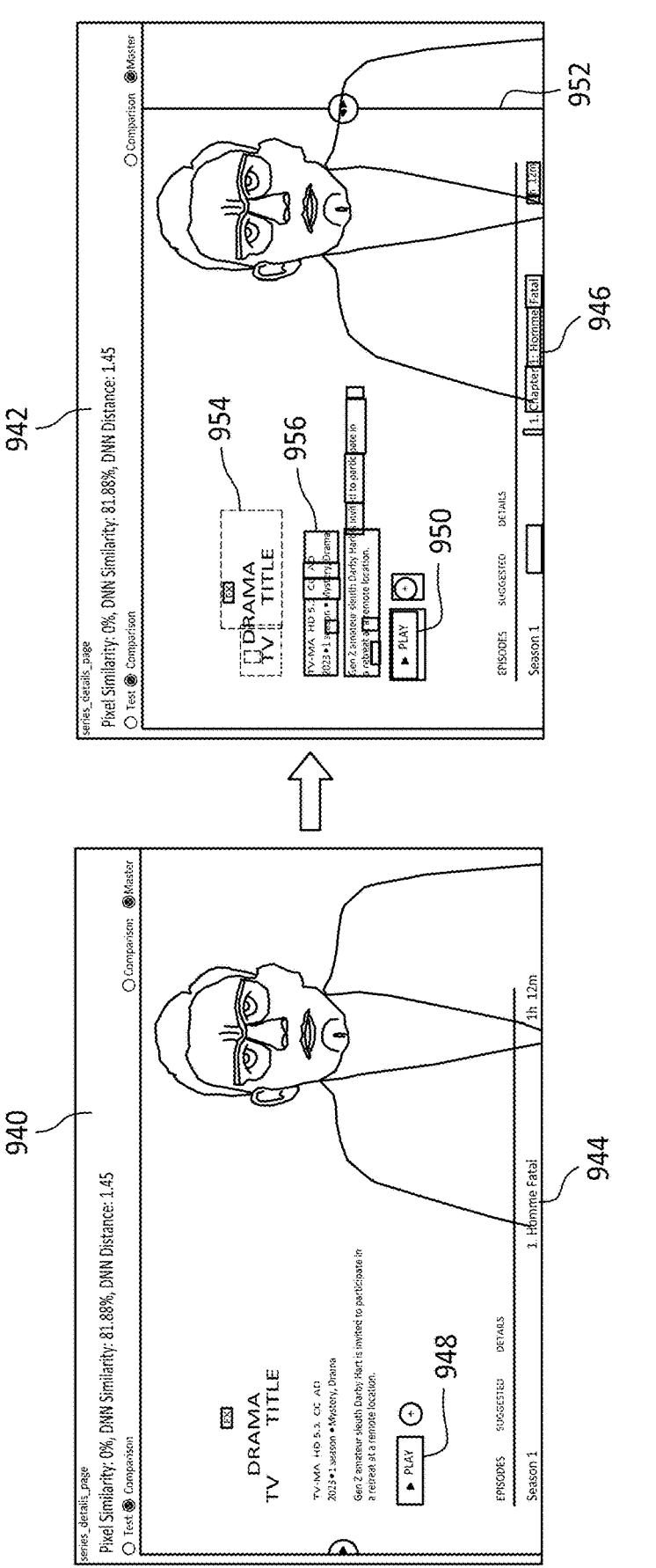
FIG. 9D is a screen illustration of a second test of FIG. 9B (Series Details Page), in accordance with embodiments of the present disclosure.

Referring to FIG. 9D, a screen illustration is shown of a second test of FIG. 9B, Series Details Page 918, and showing a comparison of an expected displayed homepage image (with objects) and the actual displayed homepage image, in accordance with embodiments of the present disclosure. The results provide pixel similarity, DNN similarity, and DNN distance between the two displayed images, and shows where the differences are located. In particular, the left-side image 940 is the actual image received during the original test, and the right-side image 942 is the stored expected image. For example, the boxes 950 (Play), 946 (Title) show where the differences are between the same information 948 (Play), 944 (Title), for the two images 940,942 and the pixel similarity is 0%, DNN similarity is 81.88%, and the DNN distance is 1.45. In that case, the title changed from "1. Homme Fatal" to "1. Chapter 1: Homme Fatal". Other differences are also shown by boxes in the image 942.

Figure 9E:
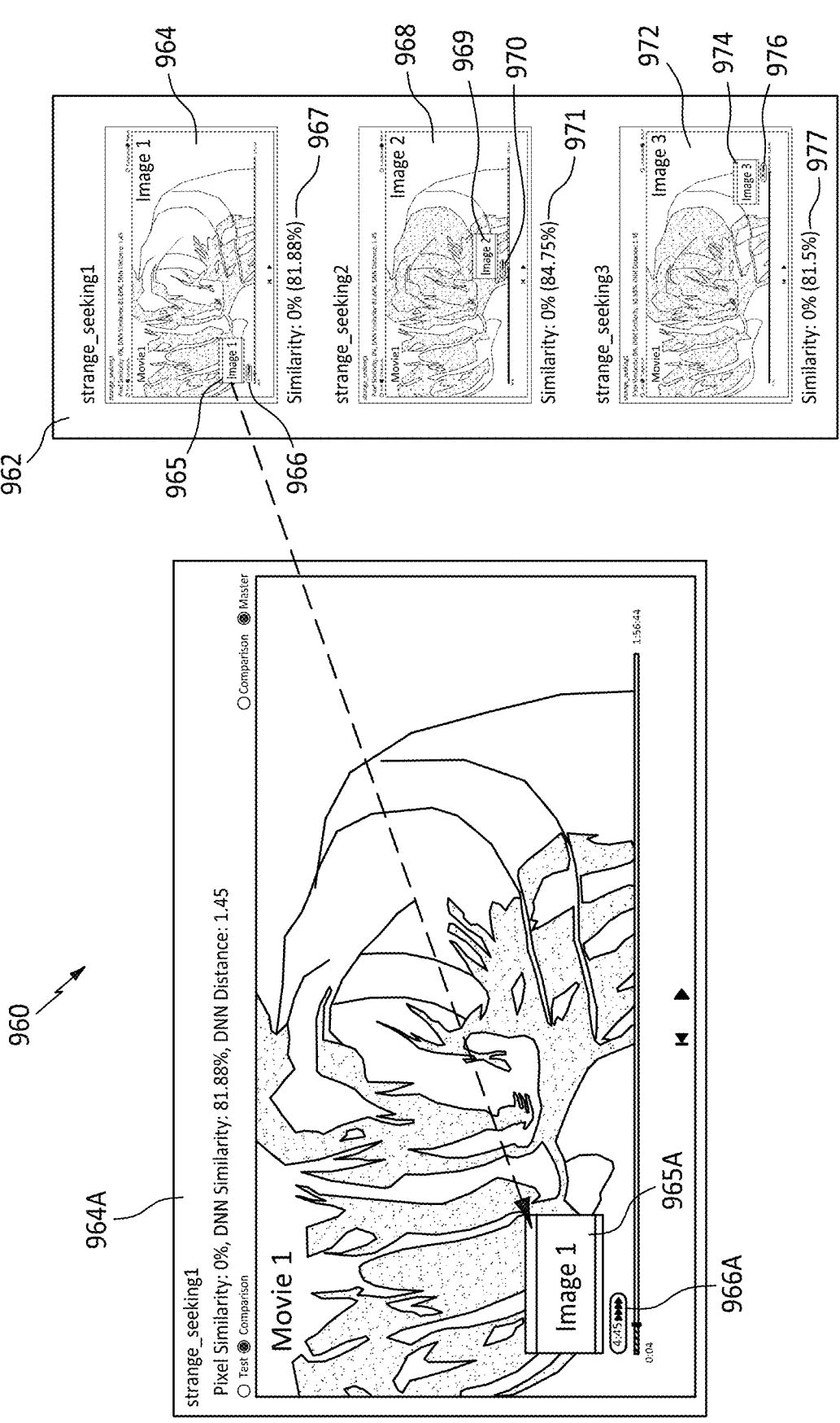
FIG. 9E is a screen illustration of a third test of FIG. 9B (Scrubber and Timeline Preview), in accordance with embodiments of the present disclosure.

Referring to FIG. 9E, a screen illustration is shown of a second test of FIG. 9B, Scrubber and Timeline Preview 914, and showing three scrubber image results 964,968,972 and a blow-up image 964A of the image 964, in accordance with embodiments of the present disclosure. In particular, this test checks specific time points in a video and verifies the thumbnail image for that specific timestamp, and verifies the image matches the stored expected image for that timestamp. For the first image 964, and the blow-up image 964A, the thumbnail image 965,965A is checked at a timestamp 966, 966A of 4:45, and shows a comparison result having a similarity 967 of 81.88%. For the next image 968, the thumbnail image 969 is checked at a time 970 near the middle of the playing content and shows a comparison result having a similarity 971 of 84.75%. For the last image 972, the thumbnail image 974 is checked at a time 976 near the middle of the playing content, shows a comparison result having a similarity 977 of 81.5%.

Figure 10:
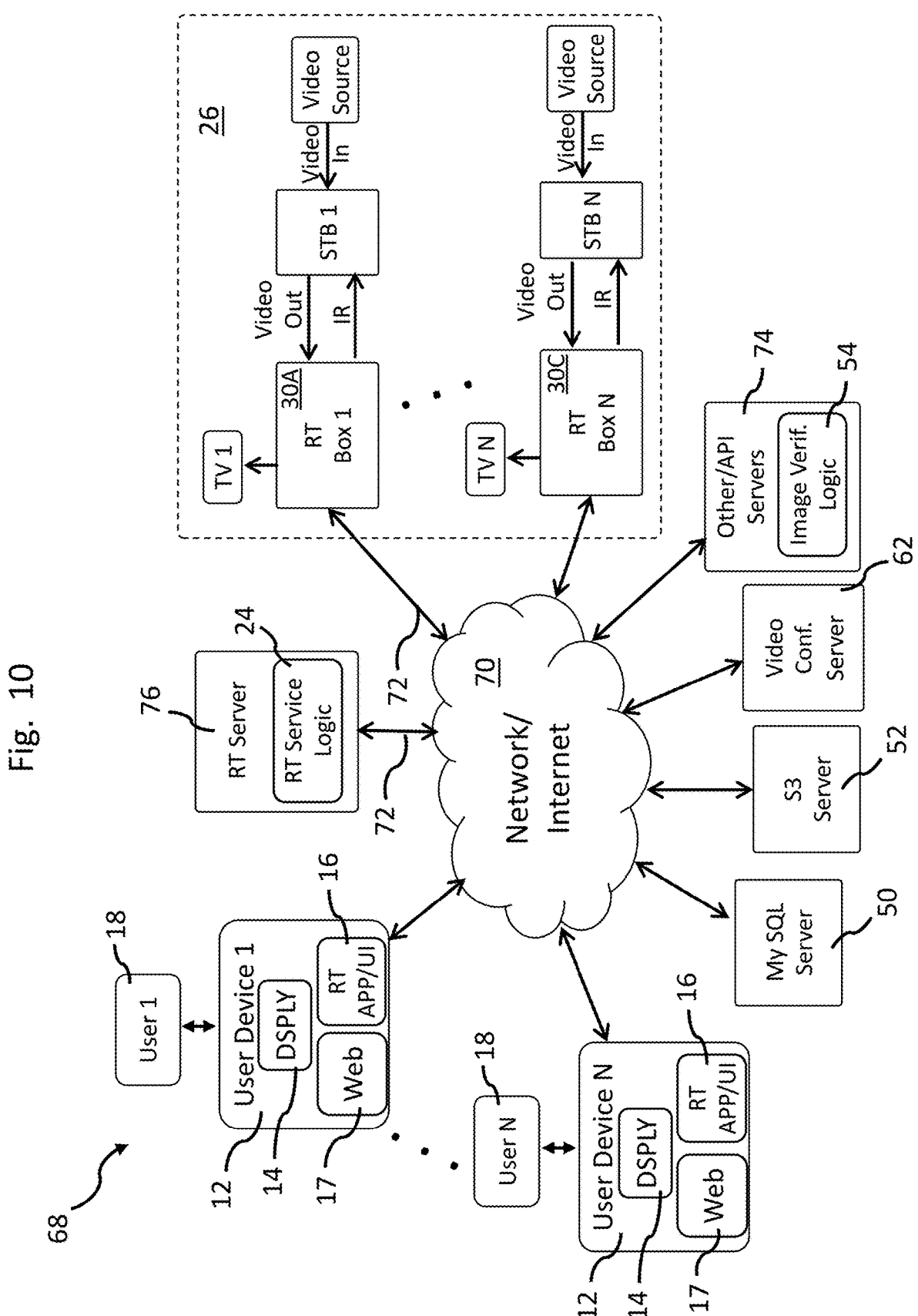
FIG. 10 is a block diagram of various components of the system of FIG. 1, connected via a network, in accordance with embodiments of the present disclosure.

Referring to FIG. 10, the present disclosure may be implemented in a network environment 68. In particular, various components of an embodiment of the system of the present disclosure include a plurality of computer-based user devices 12 (e.g., Device 1 to Device N), which may interact with respective users (User 1 to User N). A given user may be associated with one or more of the devices 12. In some embodiments, the RT App may reside on the user device 12 or on a remote server and communicate with the user device(s) 12 via the network. In particular, one or more of the user devices 12, may be connected to or communicate with each other through a communications network 70, such as a local area network (LAN), wide area network (WAN), virtual private network (VPN), peer-to-peer network, or the internet, wired or wireless, as indicated by lines 72, by sending and receiving digital data over the communications network 70. If the user devices 12 are connected via a local or private or secured network, the user devices 12 may have a separate network connection to the internet (or other network) for use by web browsers running on the devices 12. The user devices 12 may also each have a web browser 17 to connect to or communicate with the internet to obtain desired content in a standard client-server based configuration to obtain the RT App 16 or other needed files to execute the logic of the present disclosure. The user devices 12 may also have local digital storage located in the device itself (or connected directly thereto, such as an external USB connected hard drive, thumb drive or the like) for storing data, images, audio/video, documents, and the like, which may be accessed by the RT App 16 running on the user devices 12.

Also, the computer-based user devices 12 may also communicate with separate computer servers via the network 70 for the RT Server 76 (which may hold the RT Service Logic 24), My SQL Server 50, the S3 Server 52, the Video Conference Server 62, and the Other/API Servers 74. The servers 50,52,62,74,76 may be any type of computer server with the necessary software or hardware (including storage capability) for performing the functions described herein. Also, the servers 50,52,62,74,76 (or the functions performed thereby) may be located, individually or collectively, in one or more separate server(s) on the network 70, or may be located, in whole or in part, within one (or more) of the user devices 12 on the network 70. In addition, the RT boxes 30A,30C, may each communicate via the network 70 with the RT Server 12 (having the RT Service Logic) and the Other/API Servers, which may include the Image Verification Logic 54 and Other Logic 58, and with each other or any other network-enabled devices or logics as needed, to provide the functions described herein. Similarly, the user devices 12 may each also communicate via the network 70 with the logics or software applications described herein, and any other network-enabled devices or logics necessary to perform the functions described herein.

Portions of the present disclosure shown herein as being implemented outside the user device 12, may be implemented within the user device 12 by adding software or logic to the user devices 12, such as adding logic to the RT App software or installing a new/additional application software, firmware or hardware to perform some of the functions described herein, or other functions, logics, or processes described herein.

Regarding the hardware architecture of the RT box 30A-30C, there may be several hardware components and dependencies used to interact with a remote device as a physical user and to the STB. There are many different hardware embodiments that are possible to achieve the desired function and performance of the present disclosure. Below is one example of cost-effective hardware components that may be for the RT device. Other components may be used if desired, provided they meet the functional and performance requirement described herein.

In particular, the computer of the RT device may include an Intel NUC/Windows PC, which runs audio/video capture and transmission via webRTC and may be the home of the RT client and may perform network management. WebRTC, as described herein, is a known open-source project providing web browsers and mobile applications with real-time communication via application programming interfaces. WebRTC is a browser protocol that uses both TCP and UDP to establish real-time communication. It uses TCP for signaling and establishing a connection between peers and uses UDP for transmitting real-time media such as audio, video, and data.

Figure 2C:
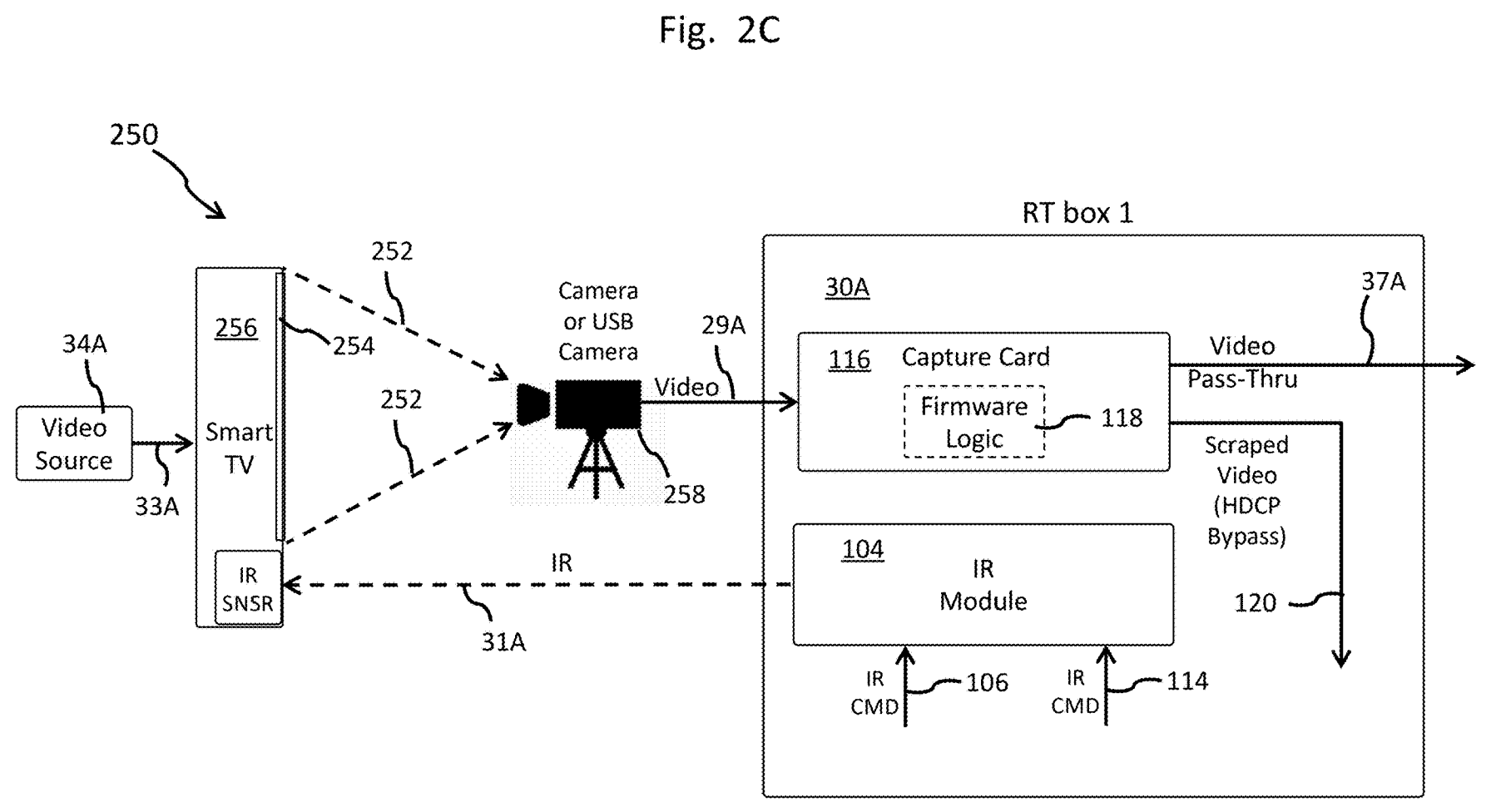

A/V capture, as discussed herein, may include: (a) Audio/Video capture via USB/PCIe using a capture card having custom firmware for HDCP negotiation (FIG. 3); or (b) audio/video via webcam/USB audio (FIG. 2C). The HDCP protocol establishes a handshake between source and input devices to make sure content has been properly authored and protected against illicit copying. As is known, devices designed for HDCP actively enter into a dialogue (or handshake) with each other and look for an HDCP security key. The HDMI handshake is the exchange of encrypted keys between the source (or player or set top box or STB) and the display (e.g., LCD TV or smart TV or the like) and the HDMI distribution equipment. Each RT box/device 30A, 30C may feature a unique set of keys which need to be accepted by the display (TV) and the source (STB) before video/audio is displayed/played.

The IR control module interface may include an IR blaster/receiver and, in some embodiments, CEC/Bluetooth interception. The chassis may include compact, high function chasses, having a custom design, and may be 3D-printed, as discussed herein.

Regarding "scraping" HDMI video, after the RT box/device is powered on and a streaming service, e.g., Disney+ or any other streaming service, is loaded, it is then connected to the RT box by having the HDMI feed out of the STB device physically plugged it into an HDMI IN port on the RT box. RT's HDMI OUT port may be plugged into a TV or other device for viewing video content, if necessary or desired, for a full pass-through. As discussed herein, within the RT box, the HDMI feed may be processed using to preserve HDCP compliance.

As discussed herein with FIG. 3, HDMI is fed directly into a capture card with modified firmware that allows HDCP negotiation natively. This capture card then down-converts and downmixes the video signal to 1080p SDR for recording and ingestion to the OBS API and webRTC service or provider. Other configurations or methods for scraping the video signal may be used if desired provided it provides the functions and performance described herein.

In some embodiments, a video camera or USB camera (shown in FIG. 2C), as discussed herein, may be used to supply the video input to the RT device instead of the STB, e.g., for devices that do not provide an HDMI output signal, such as Smart TVs, or the like. In that case, the RT box may use a USB3.x webcam to capture the video signal from the TV. Also, in that case, the video signal is obtained in the same way as from the STB, via UVC driver, but the audio signal is extracted via an additional component, which may be SPDiF or Analog, and fed directly to the RT box via a USB audio dongle, or similar device. Multimedia video input signal on the line 29A (video & audio) is processed in the same way once captured; however, the quality of the video may be lower than with the HDMI capture method.

Regarding control of the STB, an IR wire lead having an LED may be fed from the IR output of RT's iTach IR module 104 and is attached to the IR receiver 117 (FIG. 2A) on the STB for agnostic control of the STB device. IR mappings are pre-recorded (or pre-stored) on a server (e.g., the MySQL Server 50) manually or loaded as configuration files to the server 50, e.g., a RT remote control database or table, such as that shown in the table 200 of FIG. 2B. The IR commands are provided to the RT box from the RT Service logic (or remote testing service logic) 24 and are made available to use by the RT web UI or RT App 16. As discussed herein, a visualization or image of a standard remote-control panel having standard buttons in standard locations on the remote-control is displayed on the UI, which is used to emulate using a real remote in the user's hand. Click "up arrow" for up, and "ok" for ok, and the like. When a command is pressed (or clicked on the user) in the UI, the corresponding IR command is sent from RT's IR database to the RT box selected for the button press, and then passed from the RT box (as described herein) via the IR lead to the set-top-box. Once the button is pressed and the signal is sent, the user sees feedback on the UI via the HDMI video feed from the STB to the RT box, and from the RT box to the UI via the webRTC in the RT box.

For STB devices that do not use IR, a USB dongle that converts IR to USB-HID commands, may be used for ease of management of devices. Also, a similar approach may be used for controlling Bluetooth/Zwave devices; however, if they do not have "open enrollment" for using a remote, the system may need to obtain access from the device manufacturer (e.g., for a proprietary control interface).

In some embodiments, the RT box may have two internet connections, one for the RT unit itself to send the output of the STB to the RT service, and one for the IR control module to send/receive commands. The STB may have a third connection if needed, or use WIFI, if needed to operate and play multimedia.

Development STB devices and those with serial access may use a USB-Serial adapter for root access of an STB device. In some embodiments, the system may use serial access 27A (FIG. 2A) with certain model devices (e.g., Broadcom), as that may be a reference or standard for such devices. Production devices may not have means to be controlled or configured in this manner. USB-Serial access is also provided in the webUI of the RT App 16 for remote management.

In some embodiments, the size or form factor for the RT box is about 4.25" in all dimensions, making it smaller than many set-top-boxes. Other sizes may be used if desired. The RT box is a compact and cost effective and does not have many complicated components that could get lost or cause issues in the future. All components in RT box slide into place or snap, leaving only four screws on the bottom that are an original part of the Intel NUC chassis. The box uses a few m2.5 standoffs to have them reach further to make up for the extra chassis, but everything clamps in place. High quality HDMI short cables may be used internally, and HDMI 2.1 capable keystone outlets may be used to pull signal into the box and send it out of the chassis. Only a single power plug is needed, as the RT box powers all of it's peripherals.

Regarding advanced audio formats, in some embodiments, the RT box is able to play and process advanced audio formats such as Dolby 5.1, Dolby TrueHD, and ATMOS, as well as some forms of DTS. While these formats are not typically captured, or "scraped", by using down-mixers, the RT box is able to convert all bitstream channels of a Dolby codec to analog stereo for ingestion. While this is not a way to judge the quality of content, it is sufficient to be sure the STB is playing content at it's full capability for the purpose of stability and performance testing. In some embodiments, a Dolby audio down-mixer, e.g., MuxLab HDMI Audio Extractor with Dolby & DTS Downmixer, BH #MU500439, MFR #500439, may be used to provide this feature. In that case, a 1080p SDR Dolby Audio signal may be provided from an optional splitter to the Dolby Audio Down-mixer, which may provide two outputs, a 1080p SDR Dolby Audio (with no HDCP) to the capture card and a stereo analog audio signal to an analog audio capture component, both which may be provided to the video conference session.

Regarding the software architecture of the present disclosure, from an application overview, the system and its associated applications are designed to diagnose, automate, and consume streaming software without being tied to a specific protocol. It employs a modular and distributed architecture to facilitate scalability and flexibility. In some embodiments, the present disclosure may use one or more of the following known technologies to implement the present disclosure: Socket.IO, WebSockets, REST, GraphQL, WebRTC, Electron, OBS, wireless communications, and a distributed cloud system. The HDMI Audio Extractor with Dolby & DTS Downmixer from MuxLab extracts digital audio from a video source up to HDMI 2.0 and downmixes up to Dolby Atmos, DTS:X, and LPCM 7.1 channels to 2-channel analog audio via two RCA L/R jacks. It supports an HDMI input at a resolution of up to 4K at 60 Hz (4:4:4) to be looped out and extended to a local display, and supports Dolby Vision, and is HDCP 1.4 and 2.2 compliant.

Also, the software implementing the logic of the present disclosure may include the following: NX typescript monorepo with platform hosted on Kubernetes. CICD Github; Jenkins; Mariner; Spinnaker. In some embodiments, the RT UI or client may include: React 18+ Material UI Single page Application; the RT Service (or server) may include: Nodejs 20. Also, the video output signal from the STB provided to the user device may be provided over an express web server, which may include: Socket.io—websockets & longpolling, REST—Open API 3.0.5, Okta AuthN—Video Streaming Service (e.g., Disney streaming), Local AuthZ. The storage server interfaces may include one or more of the following: AWS S3, Google Drive, Bamgrid Artifactory, MySQL (AWS RDS) Backend. Also, the RT box or agent may include one or more of the following: Electron+Nodejs, Packaged One-Click installation for Windows (Ubuntu, FreeBSD, and MacOS (available if needed) exe, snap, bin, dmg. In some embodiments, the application of the present disclosure is set for auto updating itself, and addons, as well as ad-hoc, and autorun on startup.

In some embodiments, for the hub-and-spoke architecture or structure, the hub may include one or more of: central coordination, API Exposure, real-time communication (RTC), webRTC Server. For central coordination, the hub acts as the central point of coordination, managing the state of the entire system. For API exposure, the hub exposes REST and GraphQL APIs, and Socket-based endpoints and listeners to allow communication with the various spokes. For real-time communication (RTC), the hub utilizes Socket.IO for bidirectional real-time communication with spokes. Also, the hub may implement a WebRTC server to facilitate real-time video communication among different components.

In some embodiments, the spokes of the hub-and-spoke architecture or structure, may include one or more of: specialized components, communication channels, realtime updates, OBS interaction, and wireless communication. In particular, the spokes are specialized components responsible for specific tasks, such as diagnosis, automation, and consumption of streaming software. Also, the communication channels may interact with the hub through REST and GraphQL APIs for control and data exchange. Also, WebSockets may be used for real-time updates and notifications from the hub. Also, the spokes connect to the Open Broadcast Software (OBS) for controlling and monitoring streaming processes. Regarding wireless communication, the spokes interact with wireless communication protocols for connecting to devices.

In addition to the above, in some embodiments, the one or more of the following additional considerations may be used: WebRTC integration, Electron integration, OBS integration, communication, distributed cloud system. WebRTC integration may include one or more of: Simple-Peer Library, which uses a library such as simple-peer for simplifying WebRTC peer-to-peer communication, and Signaling Servers, which implements signaling servers to facilitate the exchange of metadata required for establishing WebRTC connections.

Electron Integration may include developing an Electron main process for handling server-like functionality, such as managing the hub and coordinating spokes. The main process can act as an extensible spoke, providing additional functionality, and indirect connectivity with other localized spokes. Electron integration may also include implementing Electron renderer processes for creating the user interface (UI) and interacting with users.

OBS Integration may include one or more of the following: OBS WebSocket API (e.g., use the OBS WebSocket API for programmatically controlling and monitoring Open Broadcast Software), scene switching (e.g., implements features like scene switching and source control for dynamic content creation), stream control (e.g., provides stream control features, such as starting, stopping, and pausing streams), stream monitoring (e.g., monitors stream health and provides real-time updates to users), stream recording (e.g., implements stream recording features, such as starting, stopping, and pausing recordings), and overlay control (e.g., provides overlay control features, such as starting, stopping, and pausing overlays).

Communication may include one or more of the following: Node.js libraries (e.g., integrates appropriate Node.js libraries based on the wireless technology used, such as Bluetooth or Wi-Fi), control protocols (e.g., implements communication protocols, such as Bluetooth Low Energy (BLE), Infrared (IR), Consumer Electronic Control (CEC) (serial connection), WebSocket, or Wi-Fi Direct, for connecting to or controlling STB devices as a user would through its expected manual interaction. Other connections may be used if desired.

Distributed Cloud System may include one or more of the following: cloud service (e.g., deploys the application on a cloud service like AWS, Google Cloud, or Azure for scalability and accessibility), and service discovery (e.g., implements a service manager mechanism to allow spokes to dynamically register with the hub in a distributed environment).

In addition to the above, in some embodiments, internalized abstract and explicit metrics provide focus on the unique aspects of video streaming, user interface, and overall usability. Regular monitoring and analysis of these metrics help ensure a positive user experience and drive improvements in the application's video-related functionalities and user interface. Such metrics may include one or more of: Video Quality Metrics, Interface Metrics, Usability Metrics, and Specific Video Streaming Metrics.

Regarding video quality metrics, examples of video quality metrics include resolution stability, frame rate consistency, bitrate adaptation, and video freeze rate. These metrics focus on the quality of the video stream and the application's ability to adapt to varying network conditions.

Below are definitions and details on how specific metrics may be associated with video quality for the system of the present disclosure:

Resolution Stability definition: The stability of the video resolution during streaming. Associated metric: Variability in resolution (e.g., 720p, 1080p) over time.

Frame Rate Consistence definition: Consistency in the number of frames per second during video streaming. Associated metric: Variability in frame rates over time.

Bitrate Adaptation definition: The application's ability to adapt the bitrate based on network conditions. Associated metric: Bitrate changes in response to varying network conditions.

Video Freeze Rate definition: The frequency of video freezes or buffering events. Associated metric: Number of times video freezes per minute.

Regarding interface metrics, examples of interface metrics include UI responsiveness, visual consistency, error message clarity, and navigation efficiency. These metrics focus on the user interface (UI or GUI) and the application's ability to provide a seamless and intuitive experience. Below are definitions and details on how specific metrics may be associated with the user interface (UI) for the system of the present disclosure.

UI Responsiveness definition: The speed at which the user interface responds to user interactions. Associated metric: Average time for UI components to respond to user input.

Visual Consistency definition: Consistency in the appearance of UI elements across different screens. Associated metric: UI element alignment and styling consistency.

Error Message Clarity definition: How clear and informative error messages are to users. Associated metric: Readability and helpfulness of error messages.

Navigation Efficiency definition: The efficiency of user navigation within the application. Associated metric: Average time taken to navigate between different sections/screens.

Regarding usability metrics, examples of usability metrics include task success rate, learnability, error prevention, and user satisfaction. These metrics focus on the overall usability of the application and the user's perception of the experience. Below are definitions and details on how specific metrics can be associated with usability.

Task Success Rate definition: The percentage of successfully completed tasks by users. Associated metric: Successful completion of key user tasks.

Learnability definition: The ease with which new users can learn and use the application. Associated metric: Time taken by new users to complete basic tasks.

Error Prevention definition: The effectiveness of the application in preventing user errors. Associated metric: Frequency of user errors and their impact on usability.

User Satisfaction definition: User perception of satisfaction with the application. Associated metric: Surveys or feedback mechanisms to gather user satisfaction ratings.

Regarding specific video streaming metrics, examples of video streaming metrics include streaming startup time, playback continuity, and quality degradation events. These metrics focus on the video streaming experience and the application's ability to provide a seamless and immersive experience. Below are definitions and details on how specific metrics can be associated with video streaming for the system of the present disclosure.

Streaming Startup Time definition: The time it takes for the video stream to start playing after initiation. Associated metric: Average time for the video to start streaming.

Playback Continuity definition: The smoothness of video playback without interruptions. Associated metric: Number of playback interruptions or buffering events.

Quality Degradation Events definition: Occurrences of noticeable quality degradation during streaming. Associated metric: Number of times users experience a noticeable drop in video quality.

In some embodiments, the RTR Logic 102, ATR Logic 108, RT App Logic 16, the RT Service Logic 24, the Image Verification Logic 54, and the like, as well as the OBS API 122, may function and communicate like a standard API (Application Programming Interface), e.g., a REST (REpresentational State Transfer) API. Other API types may be used if desired. In some embodiments, the user device 12 and the RT Service Logic 24 may also receive API responses comprising content (or data) or instructions (or rules or results or responses) from the various App APIs regarding how to interact with the App APIs (App API call rules), success/failure of the request (e.g., via known codes), and how to access desired content/data (e.g., web address). The software code for the API's may be located on a common server or may be on separate servers. Also, each of the APIs may have their own URL address. Also, each API may provide multiple services (or respond to multiple requests or queries), such as a configuration service, which provides information or rules for the API calls (or requests or queries) in a configuration (or config or JSON) file, and may also provide other services associated with the API, such as API Request services, e.g., GET, PUT, POST, and DELETE, for a REST API.

In some embodiments, the system and method of the present disclosure may use artificial intelligence (AI), machine learning or supervised machine learning models to provide image comparison results for the Image Certification Logic (described herein) or to provide output test data or determine whether the results or output data for any test or test logic described herein should indicate pass or fail. Such a model may include one or more known neural networks, Bayesian networks (such as Hidden Markov models), expert systems, decision trees, collections of decision trees, random forest, support vector machines, or other systems or methods known in the art for identifying or solving problems with a large number of variables or large amounts of data (or big data). In that case, known "correct" data (e.g., for comparison tests) or past examples and outcomes may be used to train the model to make accurate future predictions or indicate accurate test results. After training, the model learns what the correct or appropriate image, data or test result should look like and can provide results, data output, pass/fail indications, analytics or statistics (such as those shown herein) regarding same.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-based method for controlling and testing at least one remote media player device using a corresponding remote testing (RT) device and at least one user device not collocated with the remote testing (RT) device, comprising:

displaying on the user device selectable available remote testing (RT) devices and corresponding remote media player devices;

receiving from a user a selection of at least one of the available remote testing devices as a selected remote testing device;

displaying on the user device a remote-control image having selectable remote-control commands corresponding to the selected remote testing device and its associated remote media player device;

receiving from the user a selection of one of the remote-control commands, as a selected remote command;

sending the selected remote command to the selected remote testing device;

receiving from the selected remote testing (RT) device, a video output signal indicative of a media player video output signal from the remote media player device in response to the selected remote command, wherein the video output signal is scraped from the media player video output signal by the RT device; and displaying a video image of the received video output signal on the user device simultaneously with the displaying of the remote-control image, in separate portions of a display on the user device, while simultaneously performing the receiving and the sending of the selected remote commands.

2. The method of claim 1, wherein the commands comprise at least one of: IR commands, Bluetooth, Bluetooth Low Energy (BLE), WI-FI direct commands and CEC (Consumer Electronic Control), WebSocket, commands.

3. The method of claim 1, wherein the remote media player device comprises at least one of: a set-top box, a cable box, an over-the-top (OTT) box, a television, and a smart TV.

4. The method of claim 1, wherein the receiving the selected remote commands comprises receiving a plurality of remote commands to perform an automated test and further comprising reviewing the video output signal from the remote media player device and determining a test result and displaying the test result on the user device.

5. The method of claim 1, wherein the video output signal from the remote media player device comprises at least one of video, audio, and metadata.

6. The method of claim 1, further comprising sending the commands to a testing service logic which determines the availability of the remote testing devices and receives commands and routs the commands to the selected remote testing box for a given user device.

7. The method of claim 1, wherein the video output signal from the remote media player device is obtained from a video conference server which receives the video output signal from the remote testing device.

8. The method of claim 1, wherein the video output signal is HDCP compliant.

9. The method of claim 1, wherein the displaying the remote media player device video output signal comprises displaying at least one of: a landing page, playback of content, a listing of test results.

10. The method of claim 1, wherein the command comprises a command to perform an image verification test.

11. The method of claim 1, wherein the command comprises a command to perform an image verification test is performed on data from a previously run test.

12. The method of claim 1, wherein the command comprises a command to perform a suite of automated tests, wherein each automated test comprises a set of commands.

13. The method of claim 12, wherein at least one of the automated tests comprises at least one of: App Performance, Longevity, Navigation, Sentry, and Video Playback.

14. The method of claim 12, wherein the at least one of the automated tests comprises confirming expected content loads in a predetermined time.

15. A computer-based method for controlling and testing at least one remote media player device using a corresponding remote testing device and at least one user device not collocated with the remote testing (RT) device, comprising:

displaying on the user device selectable available remote testing devices and corresponding media player devices;

receiving from a user a selection of at least one of the available remote testing devices as a selected remote testing device;

displaying on the user device at least one of a selectable remote-control image and a selectable list of automated tests, corresponding to the selected remote testing device and its associated remote media player device;

receiving from the user a selection of one of: a single remote-control command and an automated test command, as a selected remote command;

sending the selected remote command to the selected remote testing device;

receiving from the selected remote testing (RT) device, a video output signal indicative of a media player video output signal from the remote media player device in response to the selected remote command, wherein the video output signal is scraped from the media player video output signal by the RT device;

when the selected remote command comprises a single remote-control command, displaying a video image of the received video output signal on the user device simultaneously with the displaying of the remote-control image, in separate portions of a display on the user device, while simultaneously performing the receiving and the sending of the selected remote commands; and when the selected remote command comprises an automated test command, displaying a video image of the received video output signal on the user device simultaneously with the displaying of a selectable list of test results from the automated test on the user device, in separate portions of a display on the user device, while simultaneously performing the receiving and the sending of the selected remote commands.

16. The method of claim 15, wherein the commands comprise at least one of: IR commands, Bluetooth, Bluetooth Low Energy (BLE), WI-FI direct commands and CEC (Consumer Electronic Control), WebSocket, commands.

17. The method of claim 15, wherein the remote media player device comprises at least one of: a set-top box, a cable box, an over-the-top (OTT) box, a television, and a smart TV.

18. The method of claim 15, wherein the video output signal from the remote media player device comprises at least one of video, audio, and metadata.

19. The method of claim 15, wherein the video output signal is HDCP compliant.

20. The method of claim 15, wherein the displaying the remote media player device video output signal comprises displaying at least one of: a landing page, playback of content, a listing of test results.

21. The method of claim 15, wherein the command comprises a command to perform an image verification test.

22. The method of claim 15, wherein at least one of the automated tests comprises at least one of: App Performance, Longevity, Navigation, Sentry, and Video Playback.

23. A computer-based method for controlling and testing at least one remote media player device using a corresponding remote testing (RT) device and at least one user device not collocated with the remote testing device, comprising:

receiving from a user a selection of an available one of the remote testing devices;

displaying on the user device a remote-control image or a list of automated tests;

receiving from the user a selection of one of a remote-control command or an automated test as the selected remote command;

sending the selected remote command to the selected remote testing device;

receiving from the selected remote testing (RT) device a video output signal indicative of a media player video output signal from the remote media player device in response to the selected remote command, wherein the video output signal is scraped from the media player video output signal by the RT device; and displaying the received video output signal on the user device simultaneously with the displaying of the remote-control image while simultaneously performing the receiving and the sending of the selected remote commands.

24. The method of claim 23, wherein the command signal comprises at least one of: infrared (IR), Bluetooth, Bluetooth Low Energy (BLE), WI-FI direct commands, and CEC (Consumer Electronic Control) and WebSocket commands.

25. The method of claim 23, wherein there are a plurality of user devices communicating with a plurality of RT boxes, and further comprising sending the commands to a remote testing service logic which determines the availability of the remote testing devices and receives commands from the plurality of user devices and routs the commands to the selected remote testing box for each user device.

26. The method of claim 23, wherein the computer-based method is performed using a system comprising at least one of: dynamic protocol detection, configurable physical communication protocol, protocol-specific spokes, media transformation, configurable API endpoints, and real-time adaptation.

27. A computer-based method for controlling and testing at least one remote media player device using a corresponding remote testing (RT) device, comprising:

receiving a remote-control command from a user device;

providing a command signal to the remote media player device, the command signal indicative of the remote-control command;

receiving a media player video output signal from the remote media player device in response to the remote-control command; and scraping the media player video output signal as a scraped video signal; and providing the scraped video signal for use by the user device as the RT box video output signal, which is an unprotected video signal for transmission to the user device, not collocated with the RT device.

28. The method of claim 27, further comprising providing the RT box video output signal to a video conference service for use by the user device.

29. The method of claim 27, further comprising providing a pass-through video signal which is unaltered from the media player video output signal.

30. The method of claim 27, further comprising providing an IR command corresponding to the remote-control command, to an IR Module, which provides an IR command to the remote media player device as the command signal to the remote media player device.

31. The method of claim 27, wherein the scraping is performed by a capture card, which provides the scraped video signal.

32. The method of claim 27, wherein the scraping is performed by a capture card, which provides the scraped video signal and provides a pass-through video signal which is unaltered from the media player video output signal.

33. The method of claim 27, further comprising storing the scraped video in a local memory to the RT device.

34. The method of claim 27, wherein the remote-control command comprises a single remote-control command or an automated test command.

35. The method of claim 27, wherein the remote-control command comprises an automated test command to perform an automated test; and further comprising performing the automated test on the scraped video.

36. The method of claim 27, further comprising performing at least one of: starting or stopping the scraped video, taking screen shots of the scraped video, and performing optical character recognition (OCR) on the scraped video.

37. The method of claim 1, wherein the video output signal is provided by a video camera or USB camera viewing a screen of the remote media player device.

38. The method of claim 15, wherein the video output signal is provided by a video camera or USB camera viewing a screen of the remote media player device.

39. The method of claim 23, wherein the video output signal is provided by a video camera or USB camera viewing a screen of the remote media player device.

* * * * *